(12) United States Patent  
Xu et al.

(10) Patent No.: US 11,876,662 B2  
(45) Date of Patent: Jan. 16, 2024

(54) SIGNAL DEMODULATION METHOD, SIGNAL TRANSMISSION METHOD, AND RELATED APPARATUS

(71) Applicant: HUAWEI TECHNOLOGIES CO., LTD., Shenzhen (CN)

(72) Inventors: Zijie Xu, Shanghai (CN); Yu Gao, Shanghai (CN); Guohua Zhou, Shanghai (CN); Jinlin Peng, Shanghai (CN); Shengyue Dou, Shanghai (CN); Yubo Yang, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/886,727

(22) Filed: Aug. 12, 2022

(65) Prior Publication Data

US 2022/0393928 A1 Dec. 8, 2022

Related U.S. Application Data

(63) Continuation of application No. PCT/CN2021/075897, filed on Feb. 7, 2021.

(30) Foreign Application Priority Data

Feb. 14, 2020 (CN) .......................... 202010094009.9

(51) Int. Cl.
  *H04L 27/26* (2006.01)
  *H04L 5/00* (2006.01)
(52) U.S. Cl.
  CPC ........ *H04L 27/2649* (2013.01); *H04L 5/0051* (2013.01)
(58) Field of Classification Search
  CPC .................. H04L 27/2649; H04L 5/0051
  See application file for complete search history.

(56) References Cited

U.S. PATENT DOCUMENTS 9,308,377 B1 * 4/2016 Schaefer ................. H02J 50/10  
10,944,530 B2 * 3/2021 Noh ....................... H04L 5/0048  
(Continued)

FOREIGN PATENT DOCUMENTS

CN 107409348 A 11/2017  
CN 109219982 A 1/2019  
(Continued)

OTHER PUBLICATIONS

Intel Corporation, "Views on the demodulation requirements for NR HST-SFN scenario", 3GPP TSG-RAN WG4 Meeting #92bis, Chongqing, China, Oct. 14-18, 2019, R4-1911003, 12 pages.

*Primary Examiner* — Janice N Tieu  
(74) *Attorney, Agent, or Firm* — Maier & Maier, PLLC

(57) ABSTRACT

A signal demodulation method, a signal transmission method, and a related apparatus. The signal demodulation method includes: a terminal device receives a first tracking reference signal from a first transmission reception apparatus of a single frequency network cell; a second tracking reference signal occupying different time-frequency from the first tracking reference signal from a second transmission reception apparatus of the single frequency network cell; and receives indication information indicating tracking reference signals from the first transmission reception apparatus or the second transmission reception apparatus; determines, based on the one or more tracking reference signals for receiving the downlink signal, a first carrier frequency on which the downlink signal is to be received; receives the demodulation reference signal and the downlink data based on the first carrier frequency; and demodulates the downlink data based on the demodulation signal.

20 Claims, 19 Drawing Sheets

(56) References Cited

U.S. PATENT DOCUMENTS

| | | | |
|---|---|---|---|
| 11,652,595 B2 * | 5/2023 | Chuang | H04L 5/005 |
| | | | 370/330 |
| 2016/0226654 A1 * | 8/2016 | Sinibaldi | H04L 27/2665 |
| 2018/0323918 A1 * | 11/2018 | Chuang | H04B 7/024 |
| 2019/0165880 A1 * | 5/2019 | Hakola | H04L 1/1854 |
| 2020/0052950 A1 | 2/2020 | Manolakos et al. | |
| 2020/0287678 A1 * | 9/2020 | Li | H04L 27/2613 |
| 2023/0064231 A1 * | 3/2023 | Haghighat | H04W 72/23 |
| 2023/0069352 A1 * | 3/2023 | Yuan | H04W 72/23 |

FOREIGN PATENT DOCUMENTS

| | | |
|---|---|---|
| CN | 109391391 A | 2/2019 |
| CN | 109587771 A | 4/2019 |
| CN | 110536433 A | 12/2019 |
| WO | 2018145104 A1 | 8/2018 |
| WO | 2019067925 A1 | 4/2019 |
| WO | 2019074742 A2 | 4/2019 |
| WO | 2022135566 A1 | 6/2022 |

* cited by examiner

SIGNAL DEMODULATION METHOD, SIGNAL TRANSMISSION METHOD, AND RELATED APPARATUS

CROSS-REFERENCE TO RELATED APPLICATIONS

This application is a continuation of International Application No. PCT/CN2021/075897, filed on Feb. 7, 2021, which claims priority to Chinese Patent Application No. 202010094009.9, filed on Feb. 14, 2020. The disclosures of the aforementioned applications are hereby incorporated by reference in their entireties.

TECHNICAL FIELD

The embodiments relate to the field of mobile network technologies, a signal demodulation method, a signal transmission method, and a related apparatus.

BACKGROUND

A physical cell is also referred to as an L1 physical cell and is a unique identification cell identified by a processing baseband resource in a baseband processing unit. Each physical cell needs to consume one demodulation resource of the baseband processing unit, that is, corresponds to one carrier resource (CR). A cell is a basic logical unit that provides a complete communication service for user equipment in a radio network. The cell is logical division of carrier resources, and therefore is also referred to as a logical cell. At an air interface layer, the UE distinguishes between different logical cells by using physical cell identifiers (PCIs). One logical cell may include one or more physical cells.

A single frequency network (SFN) allows a plurality of physical cells working on a same frequency band to be combined into one logical cell in a geographic area. All physical cells in the logical cell have a same PCI, so that no handover is required between all the physical cells in the logical cell.

When the UE receives and demodulates a physical downlink shared channel (PDSCH) from a network device, the UE first needs to perform carrier frequency tracking based on a tracking reference signal sent by the network device, then receives a demodulation reference signal (DM-RS) and the PDSCH on a tracked carrier frequency, and demodulates the PDSCH by using the demodulation reference signal. Therefore, demodulation performance of the UE is related to the TRS and the DM-RS.

In an SFN scenario, after the UE accesses a logical cell in the SFN scenario and completes initial frequency synchronization, the UE performs carrier frequency tracking based on tracking reference signals (TRSs) sent by a plurality of transmission reception points (TRPs) corresponding to the logical cell. However, sometimes, performance of receiving the DM-RS and the PDSCH by the UE is poor.

SUMMARY

The embodiments may provide a signal demodulation method, an information transmission method, and a related apparatus. This can improve data receiving performance of a terminal device.

According to a first aspect, an implementation may provide a signal demodulation method. The method includes: A terminal device receives a first tracking reference signal from a first transmission reception apparatus of a single frequency network cell; the terminal device receives a second tracking reference signal from a second transmission reception apparatus of the single frequency network cell, where the first tracking reference signal and the second tracking reference signal occupy different time-frequency resources; the terminal device receives indication information from the first transmission reception apparatus or the second transmission reception apparatus, where the indication information indicates one or more tracking reference signals for receiving a downlink signal, the one or more tracking reference signals for receiving the downlink signal are at least one of the first tracking reference signal and the second tracking reference signal, and the downlink signal includes a demodulation reference signal and downlink data; the terminal device determines, based on the one or more tracking reference signals for receiving the downlink signal, a first carrier frequency on which the downlink signal is to be received; the terminal device receives the demodulation reference signal and the downlink data based on the first carrier frequency; and the terminal device demodulates the downlink data based on the demodulation signal.

In this way, the terminal device can obtain a plurality of received tracking reference signals on different time-frequency resources. The terminal device can obtain, based on the one or more tracking reference signals that are for demodulation and that are indicated by the indication information, one appropriate carrier frequency on which the downlink signal is to be received, and demodulate the downlink data in the downlink signal by using the demodulation reference signal in the downlink signal. However, in a conventional technology, each TRP sends a tracking reference signal to UE on a same time-frequency resource. In other words, each TRP sends the same tracking reference signal to the UE. In this case, the UE can receive a demodulation reference signal and downlink data based only on the tracking reference signal. It can be understood that, in the demodulation method in this embodiment, the terminal device can receive the plurality of tracking reference signals, and obtain, based on the plurality of tracking reference signals, one appropriate carrier frequency on which the downlink signal is to be received, but does not determine, based only on one tracking reference signal, a carrier frequency on which the downlink signal is to be received. This helps improve performance of receiving and demodulating the downlink data by the terminal device.

In some embodiments, the tracking reference signals for receiving the downlink signal are the first tracking reference signal and the second tracking reference signal. That the terminal device determines, based on the one or more tracking reference signals for receiving the downlink signal, a first carrier frequency on which the downlink signal is to be received includes: The terminal device determines the first carrier frequency based on the first tracking reference signal and the second tracking reference signal. In this way, the terminal device can obtain an appropriate first carrier frequency based on the first tracking reference signal and the second tracking reference signal, so that the terminal device can better receive the downlink signal and demodulate the downlink data in the downlink signal by using the demodulation reference signal in the downlink signal.

In some embodiments, that the terminal device determines the first carrier frequency based on the first tracking reference signal and the second tracking reference signal includes: The terminal device determines a second carrier frequency corresponding to the first tracking reference signal; the terminal device determines a third carrier frequency corresponding to the second tracking reference signal; and the terminal device determines the first carrier frequency based on the second carrier frequency and the third carrier frequency. In this way, the first carrier frequency is obtained based on the second carrier frequency corresponding to the first tracking reference signal and the third carrier frequency corresponding to the second tracking reference signal, and the first carrier frequency can more accurately reflect a frequency offset between the terminal device and the first transmission reception apparatus and a frequency offset between the terminal device and the second transmission reception apparatus. The terminal device receives the demodulation reference signal and the downlink data based on the first carrier frequency, so that the performance of receiving and demodulating the downlink data can be improved.

In some embodiments, that the terminal device determines the first carrier frequency based on the second carrier frequency and the third carrier frequency includes: When an absolute value of a difference between the second carrier frequency and the third carrier frequency is less than or equal to a frequency offset threshold, the terminal device determines the first carrier frequency based on the second carrier frequency and the third carrier frequency. It may be understood that, when the absolute value of the difference between the second carrier frequency and the third carrier frequency is less than the frequency offset threshold, a difference between the frequency offset between the terminal device and the first transmission reception apparatus and the frequency offset between the terminal device and the second transmission reception apparatus is not large. In this case, the terminal device may determine, based on the second carrier frequency corresponding to the first tracking reference signal sent by the first transmission reception apparatus and the third carrier frequency corresponding to the second tracking reference signal sent by the second transmission reception apparatus, the first carrier frequency on which the downlink signal is to be received. In this way, the first carrier frequency is determined by comprehensively considering the second carrier frequency corresponding to the first tracking reference signal sent by the first transmission reception apparatus and the third carrier frequency corresponding to the second tracking reference signal sent by the second transmission reception apparatus. The terminal device receives the demodulation reference signal and the downlink data on the first carrier frequency and demodulates the downlink data by using the received demodulation reference signal, so that the performance of receiving and demodulating the downlink data can be improved.

In some embodiments, that the terminal device determines the first carrier frequency based on the first tracking reference signal and the second tracking reference signal includes: The terminal device determines a first signal to interference plus noise ratio corresponding to the first tracking reference signal;

the terminal device determines a second signal to interference plus noise ratio corresponding to the second tracking reference signal; and the terminal device determines the first carrier frequency based on the first signal to interference plus noise ratio and the second signal to interference plus noise ratio, where the first carrier frequency is a second carrier frequency corresponding to the first tracking reference signal or a third carrier frequency corresponding to the second tracking reference signal. A signal to interference plus noise ratio reflects quality of a signal sent by a transmission reception apparatus corresponding to each tracking reference signal to the terminal device. The terminal device selects, from the first tracking reference signal and the second tracking reference signal based on the first signal to interference plus noise ratio of the first tracking reference signal and the second signal to interference plus noise ratio of the second tracking reference signal, one first carrier frequency as the first carrier frequency on which the downlink signal is to be received, so that the terminal device can select a carrier frequency, with appropriate signal quality, on which the demodulation reference signal and the downlink data are to be received.

In some embodiments, that the terminal device determines the first carrier frequency based on the first signal to interference plus noise ratio and the second signal to interference plus noise ratio includes: The terminal device determines the second carrier frequency corresponding to the first tracking reference signal; the terminal device determines the third carrier frequency corresponding to the second tracking reference signal; and when an absolute value of a difference between the second carrier frequency and the third carrier frequency is greater than or equal to a frequency offset threshold, the terminal device determines the first carrier frequency based on the first signal to interference plus noise ratio and the second signal to interference plus noise ratio. When the absolute value of the difference between the second carrier frequency and the third carrier frequency is greater than the frequency offset threshold, a difference between a frequency offset between the terminal device and the first transmission reception apparatus and a frequency offset between the terminal device and the second transmission reception apparatus is large. The terminal device selects one carrier frequency on which the downlink signal is to be received, so that it can be ensured that the terminal device better receives the demodulation reference signal and the downlink data that are sent by one transmission reception apparatus.

In some embodiments, the method further includes: The terminal device receives a first transmission configuration indicator state TCI-state from the first transmission reception apparatus or the second transmission reception apparatus, where the first TCI-state indicates a first correspondence between a first tracking reference signal and a demodulation reference signal and a second correspondence between a second tracking reference signal and a demodulation reference signal, or the first TCI-state indicates a first correspondence between a first tracking reference signal and downlink data and a second correspondence between a second tracking reference signal and downlink data; and the indication information is information indicating the first TCI-state. In this way, one TCI-state indicates the tracking reference signals for receiving the downlink signal, so that a network resource can be saved, and information transmission efficiency can be improved.

In some embodiments, the method further includes: The terminal device receives a first TCI-state and a second TCI-state from the first transmission reception apparatus or the second transmission reception apparatus, where the first TCI-state indicates a first correspondence between a first tracking reference signal and a demodulation reference signal, and the second TCI-state indicates a second correspondence between a second tracking reference signal and a demodulation reference signal; or the first TCI-state indicates a first correspondence between a first tracking reference signal and downlink data, and the second TCI-state indicates a second correspondence between a second tracking reference signal and downlink data; and the indication information is information indicating the first TCI-state and the second TCI-state. In this way, a plurality of TCI-states is configured, so that a network processing device can flexibly indicate the tracking reference signals for receiving the downlink signal.

In some embodiments, the tracking reference signal for receiving the downlink signal is either of the first tracking reference signal and the second tracking reference signal. That the terminal device determines, based on the one or more tracking reference signals for demodulation, a first carrier frequency on which the downlink signal is to be received includes: The terminal device determines, based on the first tracking reference signal or the second tracking reference signal, the first carrier frequency on which the downlink signal is to be received.

In some embodiments, the method further includes: The terminal device sends an uplink reference signal, where reference signal received power of the uplink reference signal at the first transmission reception apparatus and reference signal received power of the uplink reference signal at the second transmission reception apparatus are for determining the tracking reference signal for receiving the downlink signal. In this way, the terminal device can obtain an appropriate first carrier frequency based on the first tracking reference signal and the second tracking reference signal, so that the terminal device can better receive the downlink signal and demodulate the downlink data in the downlink signal by using the demodulation reference signal in the downlink signal. Transmit power of uplink reference signals received by the transmission reception apparatuses is the same. However, a path loss is caused in a transmission process of uplink power. Positions of the transmission reception apparatuses are different. Transmission paths and path losses of the uplink reference signals received by the transmission reception apparatuses are different. Therefore, receive power of the uplink reference signals received by the transmission reception apparatuses is different. In this case, a BBU may determine, based on the receive power of the uplink reference signals received by the transmission reception apparatuses, to use the tracking reference signal sent by the first transmission reception apparatus or the tracking reference signal sent by the second transmission reception apparatus as the tracking reference signal for receiving the downlink signal. For example, the BBU may select, as the tracking reference signal for receiving the downlink signal, a tracking reference signal sent by a transmission reception apparatus that receives an uplink reference signal with highest receive power. In this way, a transmission reception apparatus can be selected, where a path loss between the transmission reception apparatus and the terminal device is the smallest. A tracking reference signal sent by the transmission reception apparatus is used as the tracking reference signal for receiving the downlink signal. A smaller path loss indicates higher signal strength. In this way, the terminal device can receive the demodulation reference signal and the downlink data on a carrier frequency with highest signal strength.

In some embodiments, the method further includes: The terminal device sends an uplink reference signal, where a frequency offset value of the uplink reference signal at the first transmission reception apparatus and a frequency offset value of the uplink reference signal at the second transmission reception apparatus are for determining the tracking reference signal for receiving the downlink signal. In this way, a network processing device may specify a tracking reference signal with a smaller frequency offset as the tracking reference signal for receiving the downlink signal, to improve the performance of receiving the downlink data.

In some embodiments, a distance between the terminal device and the first transmission reception apparatus and a distance between the terminal device and the second transmission reception apparatus are for determining the tracking reference signal for receiving the downlink signal. In this way, a network processing device may select a tracking reference signal sent by a transmission reception apparatus closer to the terminal device as the tracking reference signal for receiving the downlink signal, to improve the performance of receiving the downlink data.

In some embodiments, the method further includes: The terminal device receives a first TCI-state and a second TCI-state from the first transmission reception apparatus or the second transmission reception apparatus, where the first TCI-state indicates a first correspondence between a first tracking reference signal and a demodulation reference signal, and the second TCI-state indicates a second correspondence between a second tracking reference signal and a demodulation reference signal; or the first TCI-state indicates a first correspondence between a first tracking reference signal and downlink data, and the second TCI-state indicates a second correspondence between a second tracking reference signal and downlink data; and the indication information is information indicating the first TCI-state or the second TCI-state. In this way, a plurality of TCI-states is configured, so that the network processing device can flexibly indicate the tracking reference signals for receiving the downlink signal.

In some embodiments, that the terminal device receives indication information from the first transmission reception apparatus or the second transmission reception apparatus includes: The terminal device receives media access control control element (MAC CE) signaling and/or downlink control information (DCI) signaling from the first transmission reception apparatus or the second transmission reception apparatus, where the MAC CE signaling and/or the DCI signaling include/includes the indication information.

According to a second aspect, an embodiment may further provide a demodulation method. The method includes:

A terminal device receives a first demodulation reference signal and first downlink data from a first transmission reception apparatus of a single frequency network cell; the terminal device receives a second demodulation reference signal and the first downlink data from a second transmission reception apparatus of the single frequency network cell, where the first demodulation reference signal and the second demodulation reference signal occupy a same time-frequency resource and are code-division-based or space-division-based; and the terminal device demodulates the first downlink data based on the first demodulation reference signal and the second demodulation reference signal.

In this embodiment, the first transmission reception apparatus sends the first demodulation reference signal and the first downlink data, and the second transmission reception apparatus sends the second demodulation reference signal and the first downlink data. In this way, the terminal device can demodulate the first downlink data based on a plurality of demodulation reference signals, to improve performance of demodulating the downlink data by the terminal device.

In some embodiments, the method further includes: The terminal device receives first information from the first transmission reception apparatus or the second transmission reception apparatus, where the first information is for indicating to demodulate the first downlink data based on the first demodulation reference signal and the second demodulation reference signal. In this way, the terminal device can demodulate, according to an indication of the first information, the downlink data by using the first demodulation reference signal and the second demodulation reference signal.

In some embodiments, the first information is information indicating that the first downlink data is associated with the first demodulation reference signal and the second demodulation reference signal. In this way, the first downlink data is associated with both the first demodulation reference signal and the second demodulation reference signal. In this case, the terminal device demodulates, based on an association relationship indicated by the first information, the first downlink data by using the first demodulation reference signal and the second demodulation reference signal that are associated with the first downlink data.

In some embodiments, the first information is information for indicating to receive the first downlink data at a layer at which the first demodulation reference signal is located and receive the first downlink data at a layer at which the second demodulation reference signal is located. In this way, the terminal device can demodulate the first downlink data by using the first demodulation reference signal at the same layer as the first downlink data and the second demodulation reference signal at the another same layer as the first downlink data.

In some embodiments, that the terminal device receives first information from the first transmission reception apparatus or the second transmission reception apparatus includes: The terminal device receives radio resource control signaling, MAC CE signaling, or DCI signaling from the first transmission reception apparatus or the second transmission reception apparatus, where the radio resource control signaling, the MAC CE signaling, or the DCI signaling includes the first information.

In some embodiments, that the terminal device demodulates the first downlink data based on the first demodulation reference signal and the second demodulation reference signal includes: The terminal device obtains channel information based on the first demodulation reference signal and the second demodulation reference signal; and the terminal device demodulates the first downlink data based on the channel information. In this way, the terminal device can obtain channel information of a channel between the terminal device and each transmission reception apparatus, to obtain a plurality of pieces of channel information. Then, the plurality of pieces of channel information is integrated into one piece of channel information, and the downlink data is demodulated based on the channel information, to effectively improve the performance of demodulating the downlink data by the terminal device.

According to a third aspect, an embodiment may further provide a signal transmission method. The method includes: A network processing device of a single frequency network cell sends a first tracking reference signal to a terminal device through a first transmission reception apparatus; the network processing device sends a second tracking reference signal to the terminal device through a second transmission reception apparatus, where the first tracking reference signal and the second tracking reference signal occupy different time-frequency resources; and the network processing device sends indication information to the terminal device, where the indication information indicates one or more tracking reference signals for receiving a downlink signal, the one or more tracking reference signals for receiving the downlink signal are at least one of the first tracking reference signal and the second tracking reference signal, the downlink signal includes a demodulation reference signal and downlink data, and the demodulation reference signal is for demodulating the downlink data.

In this way, the terminal device can obtain a plurality of received tracking reference signals on different time-frequency resources. The terminal device can obtain, based on the one or more tracking reference signals that are for demodulation and that are indicated by the indication information, one appropriate carrier frequency on which the downlink signal is to be received, and demodulate the downlink data in the downlink signal by using the demodulation reference signal in the downlink signal. However, in a conventional technology, each TRP sends a tracking reference signal to UE on a same time-frequency resource. In other words, each TRP sends the same tracking reference signal to the UE. In this case, the UE can receive a demodulation reference signal and a PDSCH based only on the tracking reference signal. It can be understood that, in the demodulation method in this embodiment, the terminal device can receive the plurality of tracking reference signals, and obtain, based on the plurality of tracking reference signals, one appropriate carrier frequency on which the downlink signal is to be received, but does not determine, based only on one tracking reference signal, a carrier frequency on which the downlink signal is to be received. This helps improve performance of receiving and demodulating the downlink data by the terminal device.

In some embodiments, the tracking reference signals for receiving the downlink signal are the first tracking reference signal and the second tracking reference signal. The method further includes:

The network processing device sends a first transmission configuration indicator state TCI-state to the terminal device, where the first TCI-state indicates a first correspondence between a first tracking reference signal and a demodulation reference signal and a second correspondence between a second tracking reference signal and a demodulation reference signal, or the first TCI-state indicates a first correspondence between a first tracking reference signal and downlink data and a second correspondence between a second tracking reference signal and downlink data; and the indication information is information indicating the first TCI-state.

In some embodiments, the method further includes:

The network processing device sends a first TCI-state and a second TCI-state to the terminal device, where the first TCI-state indicates a first correspondence between a first tracking reference signal and a demodulation reference signal, and the second TCI-state indicates a second correspondence between a second tracking reference signal and a demodulation reference signal; or the first TCI-state indicates a first correspondence between a first tracking reference signal and downlink data, and the second TCI-state indicates a second correspondence between a second tracking reference signal and downlink data; and the indication information is information indicating the first TCI-state and the second TCI-state.

In some embodiments, the tracking reference signal for receiving the downlink signal is either of the first tracking reference signal and the second tracking reference signal. The method includes: The network processing device receives an uplink reference signal from the terminal device, where reference signal received power of the uplink reference signal at the first transmission reception apparatus and reference signal received power of the uplink reference signal at the second transmission reception apparatus are for determining the tracking reference signal for receiving the downlink signal.

In some embodiments, the tracking reference signal for receiving the downlink signal is either of the first tracking reference signal and the second tracking reference signal. The method further includes:

The network processing device receives an uplink reference signal from the terminal device, where a frequency offset value of the uplink reference signal at the first transmission reception apparatus and a frequency offset value of the uplink reference signal at the second transmission reception apparatus are for determining the tracking reference signal for receiving the downlink signal.

In some embodiments, the tracking reference signal for receiving the downlink signal is either of the first tracking reference signal and the second tracking reference signal. A distance between the terminal device and the first transmission reception apparatus and a distance between the terminal device and the second transmission reception apparatus are for determining the tracking reference signal for receiving the downlink signal.

In some embodiments, the method further includes:

The network processing device sends a first TCI-state and a second TCI-state to the terminal device, where the first TCI-state indicates a first correspondence between a first tracking reference signal and a demodulation reference signal, and the second TCI-state indicates a second correspondence between a second tracking reference signal and a demodulation reference signal; or the first TCI-state indicates a first correspondence between a first tracking reference signal and downlink data, and the second TCI-state indicates a second correspondence between a second tracking reference signal and downlink data; and the indication information is information indicating the first TCI-state or the second TCI-state.

In some embodiments, that the network processing device sends indication information to the terminal device includes:

The network processing device sends MAC CE signaling and/or DCI signaling to the terminal device, where the MAC CE signaling and/or the DCI signaling include/includes the indication information.

It should be noted that, for the embodiments of the signal transmission method, refer to the signal demodulation method in the first aspect. Details are not described herein again.

According to a fourth aspect, an embodiment may further provide a signal transmission method. A network processing device of a single frequency network cell sends a first demodulation reference signal and first downlink data to a terminal device through a first transmission reception apparatus; and the network processing device sends a second demodulation reference signal and the first downlink data to the terminal device through a second transmission reception apparatus, where the first demodulation reference signal and the second demodulation reference signal occupy a same time-frequency resource and are code-division-based or space-division-based; and the first demodulation reference signal and the second demodulation reference signal are for demodulating the first downlink data.

In this embodiment, the first transmission reception apparatus sends the first demodulation reference signal and the first downlink data, and the second transmission reception apparatus sends the second demodulation reference signal and the first downlink data. In this way, the terminal device can demodulate the first downlink data based on a plurality of demodulation reference signals, to improve performance of demodulating the downlink data by the terminal device.

In some embodiments, the method further includes: The network processing device sends first information to the terminal device, where the first information is for indicating to demodulate the first downlink data based on the first demodulation reference signal and the second demodulation reference signal.

In some embodiments, the first information is information indicating that the first downlink data is associated with the first demodulation reference signal and the second demodulation reference signal.

In some embodiments, the first information is information for indicating to receive the first downlink data at a layer at which the first demodulation reference signal is located and receive the first downlink data at a layer at which the second demodulation reference signal is located.

In some embodiments, that the network processing device sends first information to the terminal device includes:

The network processing device sends radio resource control signaling, MAC CE signaling, or DCI signaling to the terminal device, where the radio resource control signaling, the MAC CE signaling, or the DCI signaling includes the first information.

It should be noted that, for the embodiments of the signal transmission method, refer to the signal demodulation method in the first aspect. Details are not described herein again.

According to a fifth aspect, an embodiment may further provide a terminal device. The terminal device includes a transceiver unit and a processing unit.

The transceiver unit is configured to:
receive a first tracking reference signal from a first transmission reception apparatus of a single frequency network cell;
receive a second tracking reference signal from a second transmission reception apparatus of the single frequency network cell, where the first tracking reference signal and the second tracking reference signal occupy different time-frequency resources; and receive indication information from the first transmission reception apparatus or the second transmission reception apparatus, where the indication information indicates one or more tracking reference signals for receiving a downlink signal, the one or more tracking reference signals for receiving the downlink signal are at least one of the first tracking reference signal and the second tracking reference signal, and the downlink signal includes a demodulation reference signal and downlink data.

The processing unit is configured to determine, based on the one or more tracking reference signals for receiving the downlink signal, a first carrier frequency on which the downlink signal is to be received.

The transceiver unit is further configured to receive the demodulation reference signal and the downlink data based on the first carrier frequency.

The processing unit is further configured to demodulate the downlink data based on the demodulation signal.

In some embodiments, the tracking reference signals for receiving the downlink signal are the first tracking reference signal and the second tracking reference signal.

In terms of determining, by the terminal device, based on the tracking reference signals for receiving the downlink signal, the first carrier frequency on which the downlink signal is to be received, the processing unit is configured to:

determine the first carrier frequency based on the first tracking reference signal and the second tracking reference signal.

In some embodiments, in terms of determining, by the terminal device, the first carrier frequency based on the first tracking reference signal and the second tracking reference signal, the processing unit is configured to:
- determine a second carrier frequency corresponding to the first tracking reference signal;
- determine a third carrier frequency corresponding to the second tracking reference signal; and
- determine the first carrier frequency based on the second carrier frequency and the third carrier frequency.

In some embodiments, in terms of determining, by the terminal device, the first carrier frequency based on the second carrier frequency and the third carrier frequency, the processing unit is configured to:
- when an absolute value of a difference between the second carrier frequency and the third carrier frequency is less than or equal to a frequency offset threshold, determine the first carrier frequency based on the second carrier frequency and the third carrier frequency.

In some embodiments, in terms of determining, by the terminal device, the first carrier frequency based on the first tracking reference signal and the second tracking reference signal, the processing unit is configured to:
- determine a first signal to interference plus noise ratio corresponding to the first tracking reference signal;
- determine a second signal to interference plus noise ratio corresponding to the second tracking reference signal; and
- determine the first carrier frequency based on the first signal to interference plus noise ratio and the second signal to interference plus noise ratio, where the first carrier frequency is a second carrier frequency corresponding to the first tracking reference signal or a third carrier frequency corresponding to the second tracking reference signal.

In some embodiments, in terms of determining, by the terminal device, the first carrier frequency based on the first signal to interference plus noise ratio and the second signal to interference plus noise ratio, the processing unit is configured to:
- determine the second carrier frequency corresponding to the first tracking reference signal;
- determine the third carrier frequency corresponding to the second tracking reference signal; and
- when an absolute value of a difference between the second carrier frequency and the third carrier frequency is greater than or equal to a frequency offset threshold, determine the first carrier frequency based on the first signal to interference plus noise ratio and the second signal to interference plus noise ratio.

In some embodiments, the transceiver unit is further configured to:
- receive a first transmission configuration indicator state TCI-state from the first transmission reception apparatus or the second transmission reception apparatus, where the first TCI-state indicates a first correspondence between a first tracking reference signal and a demodulation reference signal and a second correspondence between a second tracking reference signal and a demodulation reference signal, or the first TCI-state indicates a first correspondence between a first tracking reference signal and downlink data and a second correspondence between a second tracking reference signal and downlink data; and
- the indication information is information indicating the first TCI-state.

In some embodiments, the transceiver unit is further configured to:
- receive a first TCI-state and a second TCI-state from the first transmission reception apparatus or the second transmission reception apparatus, where the first TCI-state indicates a first correspondence between a first tracking reference signal and a demodulation reference signal, and the second TCI-state indicates a second correspondence between a second tracking reference signal and a demodulation reference signal; or the first TCI-state indicates a first correspondence between a first tracking reference signal and downlink data, and the second TCI-state indicates a second correspondence between a second tracking reference signal and downlink data; and
- the indication information is information indicating the first TCI-state and the second TCI-state.

In some embodiments, the tracking reference signal for receiving the downlink signal is either of the first tracking reference signal and the second tracking reference signal.

In terms of determining, by the terminal device, based on the tracking reference signal for demodulation, the first carrier frequency on which the downlink signal is to be received, the processing unit is configured to:
- determine, by the terminal device, based on the first tracking reference signal or the second tracking reference signal, the first carrier frequency on which the downlink signal is to be received.

In some embodiments, the transceiver unit is further configured to:
- send an uplink reference signal.

Reference signal received power of the uplink reference signal at the first transmission reception apparatus and reference signal received power of the uplink reference signal at the second transmission reception apparatus are for determining the tracking reference signal for receiving the downlink signal.

In some embodiments, the transceiver unit is further configured to:
- send, by the terminal device, an uplink reference signal.

A frequency offset value of the uplink reference signal at the first transmission reception apparatus and a frequency offset value of the uplink reference signal at the second transmission reception apparatus are for determining the tracking reference signal for receiving the downlink signal.

In some embodiments, a distance between the terminal device and the first transmission reception apparatus and a distance between the terminal device and the second transmission reception apparatus are for determining the tracking reference signal for receiving the downlink signal.

In some embodiments, the transceiver unit is further configured to:
- receive a first TCI-state and a second TCI-state from the first transmission reception apparatus or the second transmission reception apparatus, where the first TCI-state indicates a first correspondence between a first tracking reference signal and a demodulation reference signal, and the second TCI-state indicates a second correspondence between a second tracking reference signal and a demodulation reference signal; or the first TCI-state indicates a first correspondence between a first tracking reference signal and downlink data, and the second TCI-state indicates a second correspondence between a second tracking reference signal and downlink data; and the indication information is information indicating the first TCI-state or the second TCI-state.

In some embodiments, in terms of receiving, by the terminal device, the indication information from the first transmission reception apparatus or the second transmission reception apparatus, the transceiver unit is configured to:

receive MAC CE signaling and/or DCI signaling from the first transmission reception apparatus or the second transmission reception apparatus, where the MAC CE signaling and/or the DCI signaling include/includes the indication information.

According to a sixth aspect, an embodiment may further provide a terminal device. The terminal device includes a transceiver unit and a processing unit.

The transceiver unit is configured to:

receive a first demodulation reference signal and first downlink data from a first transmission reception apparatus of a single frequency network cell; and receive a second demodulation reference signal and the first downlink data from a second transmission reception apparatus of the single frequency network cell, where the first demodulation reference signal and the second demodulation reference signal occupy a same time-frequency resource and are code-division-based or space-division-based.

The processing unit is configured to demodulate the first downlink data based on the first demodulation reference signal and the second demodulation reference signal.

In some embodiments, the transceiver unit is further configured to:

receive first information from the first transmission reception apparatus or the second transmission reception apparatus, where the first information is for indicating to demodulate the first downlink data based on the first demodulation reference signal and the second demodulation reference signal.

In some embodiments, the first information is information indicating that the first downlink data is associated with the first demodulation reference signal and the second demodulation reference signal.

In some embodiments, the first information is information for indicating to receive the first downlink data at a layer at which the first demodulation reference signal is located and receive the first downlink data at a layer at which the second demodulation reference signal is located.

In some embodiments, in terms of receiving, by the terminal device, the first information from the first transmission reception apparatus or the second transmission reception apparatus, the transceiver unit is configured to:

receive, by the terminal device, radio resource control signaling, MAC CE signaling, or DCI signaling from the first transmission reception apparatus or the second transmission reception apparatus, where the radio resource control signaling, the MAC CE signaling, or the DCI signaling includes the first information.

In some embodiments, in terms of demodulating, by the terminal device, the first downlink data based on the first demodulation reference signal and the second demodulation reference signal, the processing unit is configured to:

obtain channel information based on the first demodulation reference signal and the second demodulation reference signal; and demodulate the first downlink data based on the channel information.

According to a seventh aspect, an embodiment may further provide a network processing device. The network processing device includes a transceiver unit and a processing unit. The processing unit is configured to:

control the transceiver unit to send a first tracking reference signal to a terminal device through a first transmission reception apparatus;

control the transceiver unit to send a second tracking reference signal to the terminal device through a second transmission reception apparatus, where the first tracking reference signal and the second tracking reference signal occupy different time-frequency resources; and control the transceiver unit to send indication information to the terminal device, where the indication information indicates one or more tracking reference signals for receiving a downlink signal, the one or more tracking reference signals for receiving the downlink signal are at least one of the first tracking reference signal and the second tracking reference signal, the downlink signal includes a demodulation reference signal and downlink data, and the demodulation reference signal is for demodulating the downlink data.

In some embodiments, the tracking reference signals for receiving the downlink signal are the first tracking reference signal and the second tracking reference signal. The processing unit is further configured to:

control the transceiver unit to send a first transmission configuration indicator state TCI-state to the terminal device, where the first TCI-state indicates a first correspondence between a first tracking reference signal and a demodulation reference signal and a second correspondence between a second tracking reference signal and a demodulation reference signal, or the first TCI-state indicates a first correspondence between a first tracking reference signal and downlink data and a second correspondence between a second tracking reference signal and downlink data; and the indication information is information indicating the first TCI-state.

In some embodiments, the processing unit is further configured to:

control the transceiver unit to send a first TCI-state and a second TCI-state to the terminal device, where the first TCI-state indicates a first correspondence between a first tracking reference signal and a demodulation reference signal, and the second TCI-state indicates a second correspondence between a second tracking reference signal and a demodulation reference signal; or the first TCI-state indicates a first correspondence between a first tracking reference signal and downlink data, and the second TCI-state indicates a second correspondence between a second tracking reference signal and downlink data; and the indication information is information indicating the first TCI-state and the second TCI-state.

In some embodiments, the tracking reference signal for receiving the downlink signal is either of the first tracking reference signal and the second tracking reference signal. The processing unit is further configured to:

control the transceiver unit to receive an uplink reference signal from the terminal device, where reference signal received power of the uplink reference signal at the first transmission reception apparatus and reference signal received power of the uplink reference signal at the second transmission reception apparatus are for determining the tracking reference signal for receiving the downlink signal.

In some embodiments, the tracking reference signal for receiving the downlink signal is either of the first tracking reference signal and the second tracking reference signal. The processing unit is further configured to:

control the transceiver unit to receive an uplink reference signal from the terminal device, where a frequency offset value of the uplink reference signal at the first transmission reception apparatus and a frequency offset value of the uplink reference signal at the second transmission reception apparatus are for determining the tracking reference signal for receiving the downlink signal.

In some embodiments, the tracking reference signal for receiving the downlink signal is either of the first tracking reference signal and the second tracking reference signal. A distance between the terminal device and the first transmission reception apparatus and a distance between the terminal device and the second transmission reception apparatus are for determining the tracking reference signal for receiving the downlink signal.

In some embodiments, the processing unit is further configured to:

control the transceiver unit to send a first TCI-state and a second TCI-state to the terminal device, where the first TCI-state indicates a first correspondence between a first tracking reference signal and a demodulation reference signal, and the second TCI-state indicates a second correspondence between a second tracking reference signal and a demodulation reference signal; or the first TCI-state indicates a first correspondence between a first tracking reference signal and downlink data, and the second TCI-state indicates a second correspondence between a second tracking reference signal and downlink data; and the indication information is information indicating the first TCI-state or the second TCI-state.

In some embodiments, in terms of controlling the transceiver unit to send the indication information to the terminal device, the processing unit is configured to:

control the transceiver unit to send MAC CE signaling and/or DCI signaling to the terminal device, where the MAC CE signaling and/or the DCI signaling include/ includes the indication information.

According to an eighth aspect, an embodiment may further provide a network processing device. The network processing device includes a transceiver unit and a processing unit. The processing unit is configured to:

control the transceiver unit to send a first demodulation reference signal and first downlink data to a terminal device through a first transmission reception apparatus; and control the transceiver unit to send a second demodulation reference signal and the first downlink data to the terminal device through a second transmission reception apparatus, where the first demodulation reference signal and the second demodulation reference signal occupy a same time-frequency resource and are code-division-based or space-division-based; and the first demodulation reference signal and the second demodulation reference signal are for demodulating the first downlink data.

In some embodiments, the processing unit is further configured to:

control the transceiver unit to send first information to the terminal device, where the first information is for indicating to demodulate the first downlink data based on the first demodulation reference signal and the second demodulation reference signal.

In some embodiments, the first information is information indicating that the first downlink data is associated with the first demodulation reference signal and the second demodulation reference signal.

In some embodiments, the first information is information for indicating to receive the first downlink data at a layer at which the first demodulation reference signal is located and receive the first downlink data at a layer at which the second demodulation reference signal is located.

In some embodiments, in terms of controlling the transceiver unit to send the first information to the terminal device, the processing unit is configured to:

control the transceiver unit to send radio resource control signaling, MAC CE signaling, or DCI signaling to the terminal device, where the radio resource control signaling, the MAC CE signaling, or the DCI signaling includes the first information.

The embodiments in the first aspect to the fourth aspect are also applicable to the network processing device in the foregoing embodiments, and details are not described herein again.

According to a ninth aspect, an embodiment may further provide a terminal device. The terminal device includes a processor and a memory. The memory stores computer instructions, and the processor executes the computer instructions stored in the memory, to enable the terminal device to perform the method according to any embodiment of the first aspect or the second aspect.

According to a tenth aspect, an embodiment may further provide a network processing device. The network processing device includes a processor and a memory. The memory stores computer instructions, and the processor executes the computer instructions stored in the memory, to enable the network processing device to perform the method according to any embodiment of the third aspect or the fourth aspect.

According to an eleventh aspect, an embodiment may further provide a network device. The network device includes the network processing device according to the tenth aspect, a first transmission reception apparatus, and a second transmission reception apparatus.

According to a twelfth aspect, an implementation may provide a non-transitory computer-readable storage medium. The non-transitory computer-readable storage medium is configured to store executable program code. When the program code is executed, the method according to any implementation of the first aspect, the method according to any implementation of the second aspect, the method according to any implementation of the third aspect, or the method according to any implementation of the fourth aspect is implemented.

DETAILED DESCRIPTION OF THE EMBODIMENTS

The following describes the embodiments with reference to the accompanying drawings.

Figure 1A:
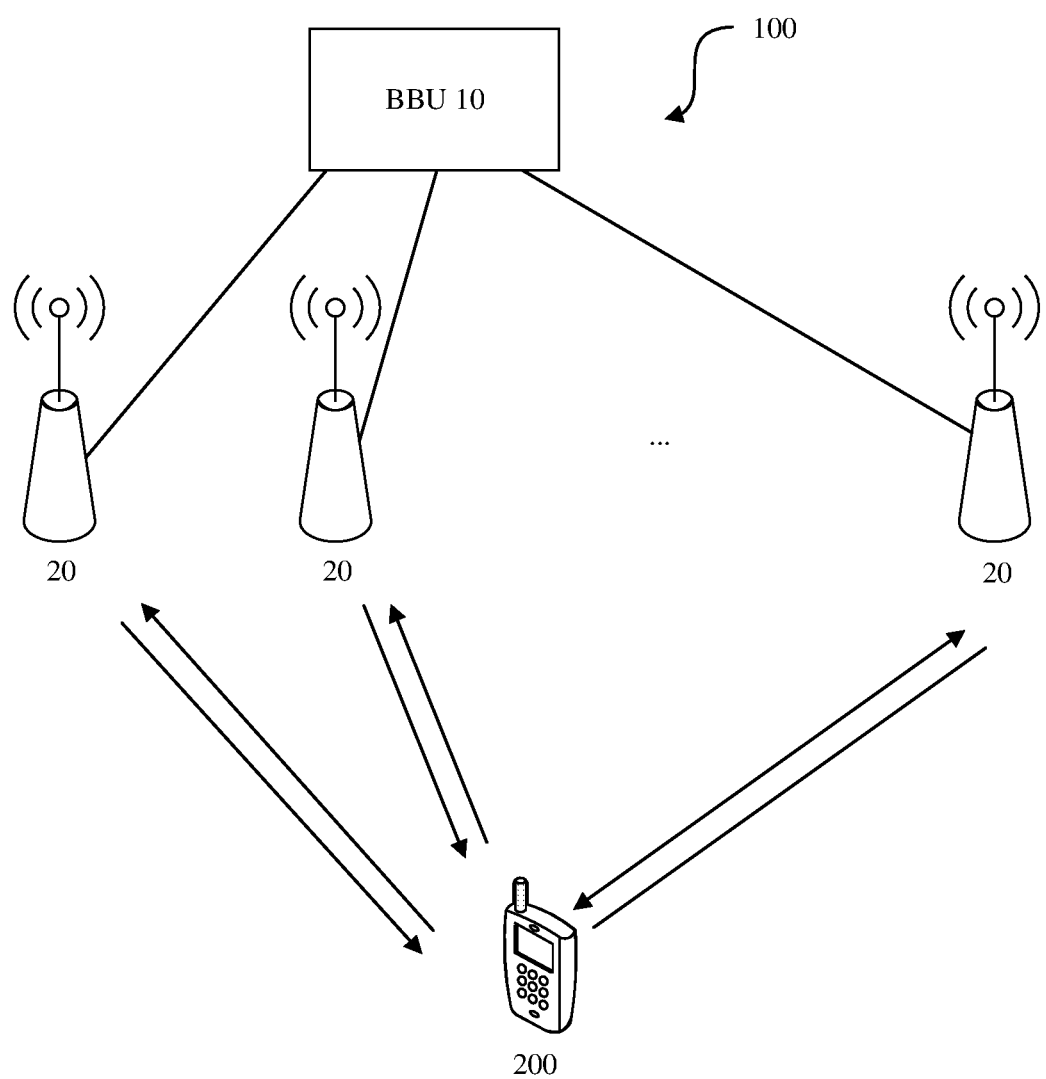
FIG. 1A is a schematic diagram of a network architecture of a communication system according to an embodiment.

FIG. 1A is a diagram of a network architecture of a communication system. The communication system includes an SFN cell 100 and a terminal device 200 accessing the SFN cell 100. The SFN cell 100 includes a baseband unit (BBU) 10 and a plurality of transmission reception apparatuses 20 connected to the BBU 10. It may be understood that the SFN cell may alternatively include two transmission reception apparatuses.

The transmission reception apparatus in the SFN cell is one or more of a remote radio unit (RRU), a remote radio head (RRH), or a TRP.

A BBU and a plurality of transmission reception apparatuses in one SFN cell may be deployed on a same network device. A BBU and a plurality of transmission reception apparatuses in one SFN cell may be deployed on different network devices. The BBU may be a network processing device.

Figure 1B:
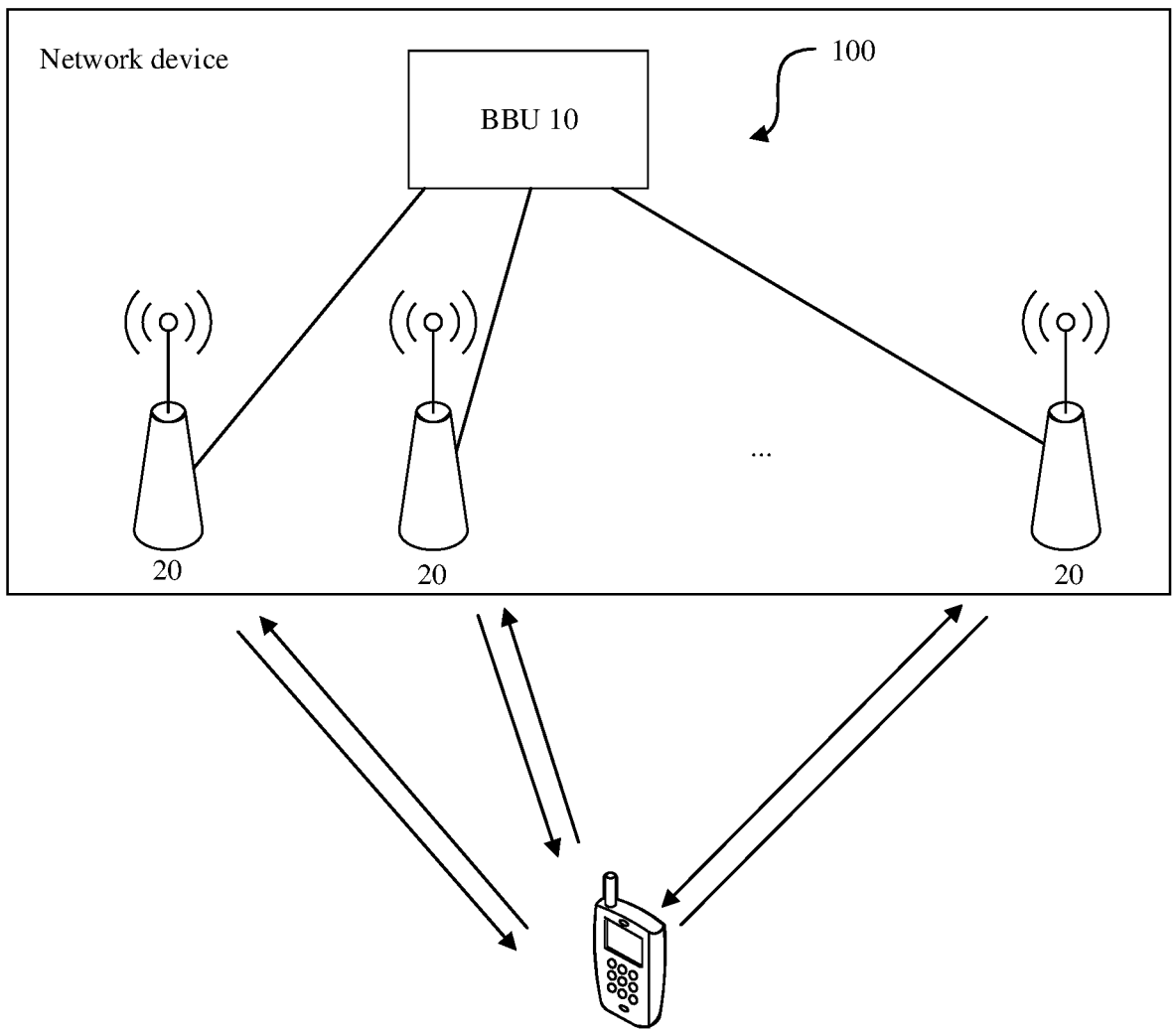
FIG. 1B is another diagram of a network architecture of a communication system according to an embodiment.
Figure 1C:
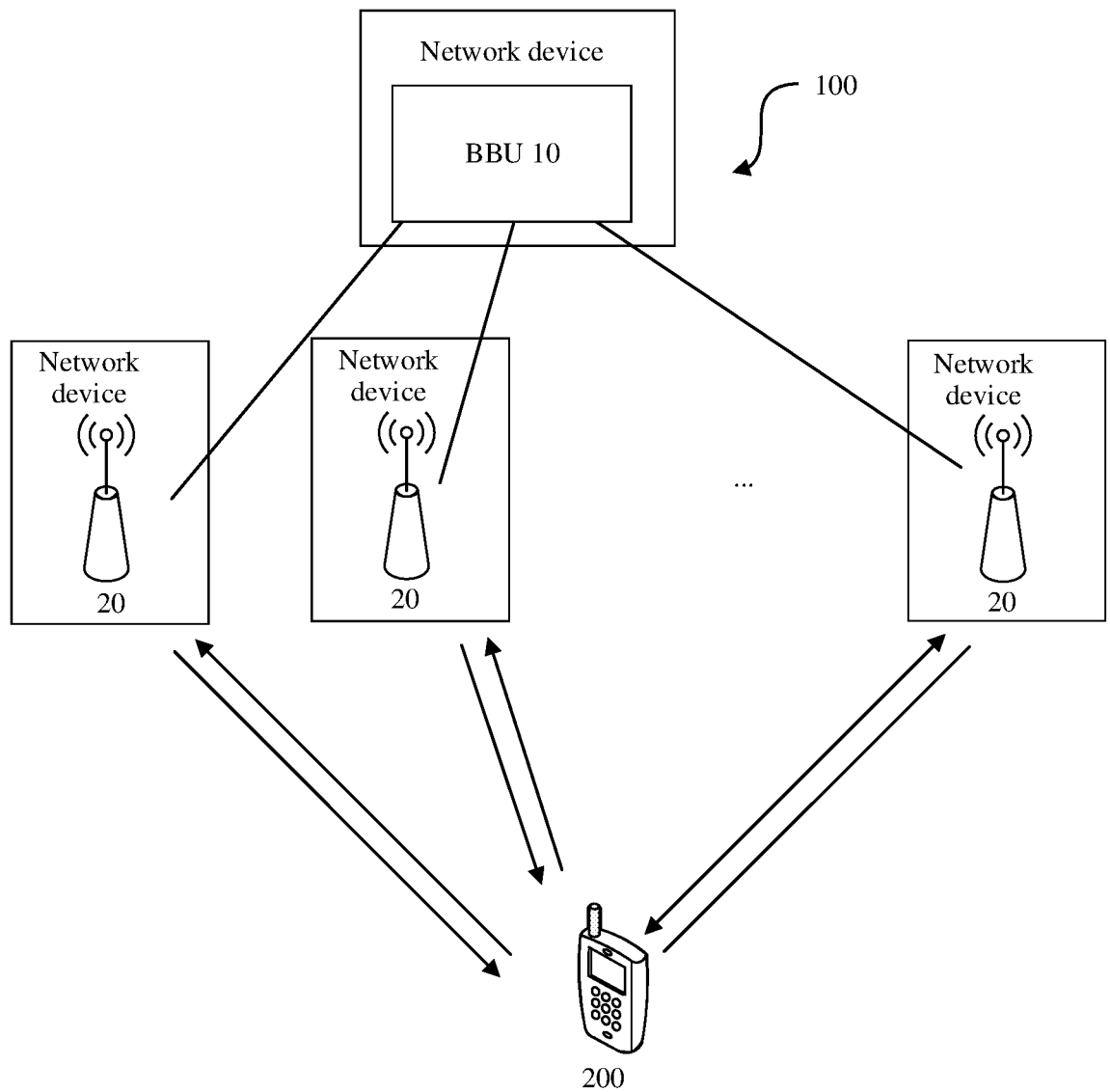
FIG. 1C is still another diagram of a network architecture of a communication system according to an embodiment.

FIG. 1B is another diagram of a network architecture of a communication system according to an embodiment. In FIG. 1B, a BBU and a plurality of transmission reception apparatuses 20 in one SFN cell are deployed on a same network device. FIG. 1C is still another diagram of a network architecture of a communication system according to an embodiment. In FIG. 1C, a BBU and a plurality of transmission reception apparatuses 20 in one SFN cell are deployed on different network devices. The transmission reception apparatus may be an RRU, an RRH, or a TRP of a deployed network device, or may be an independent network device having a processing capability. Hardware deployment of the SFN cell is not limited in the embodiments.

A network device in embodiments is a device that is in an access network and that communicates with wireless user equipment over an air interface through one or more cells. For example, the network device may be an evolved NodeB (eNB) in a long term evolution (LTE) system or long term evolution-advanced (LTE-A), or may include a new radio network device (gNB) in a $5^{th}$ generation mobile communication technology (5G) NR system.

A terminal device is a user-side device that is used by a user to receive a signal. For example, the terminal device may be, but is not limited to, a terminal device such as a mobile phone, a notebook computer, a tablet computer, or a large-screen television.

Figure 2A:
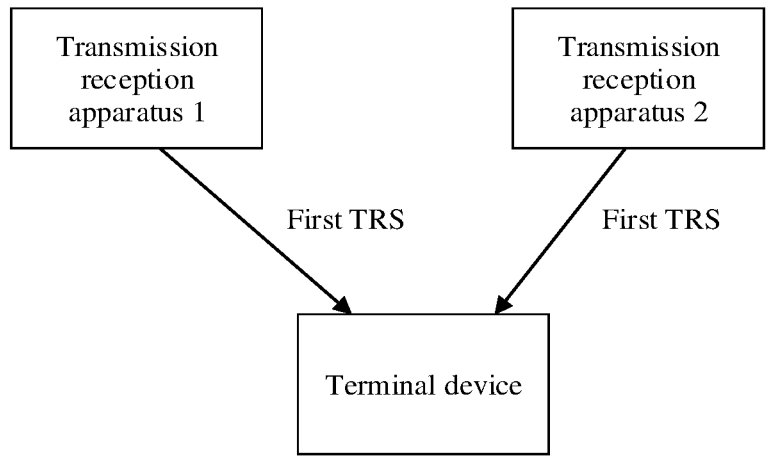
FIG. 2A is a schematic diagram of a scenario of a signal demodulation method in a conventional technology.

FIG. 2A is a schematic diagram of a scenario of a signal demodulation method in a conventional technology. In the conventional technology, after a terminal device accesses an SFN cell, a plurality of transmission reception apparatuses sends a same TRS to the terminal device on a same time-frequency resource. As shown in FIG. 2A, a transmission reception apparatus 1 and a transmission reception apparatus 2 send a same first TRS to the terminal device on a same time-frequency resource. Then, the user equipment determines, based on the first TRS, a first carrier frequency on which a DM-RS and a PDSCH are to be received. For example, the terminal device receives the DM-RS (DM-RS) and the physical downlink shared channel (PDSCH) on the first carrier frequency, and the terminal device may demodulate the PDSCH based on the DM-RS received on the carrier frequency 1.

Usually, there is a frequency offset between the terminal device and the transmission reception apparatus. The frequency offset may include a carrier frequency offset (CFO) caused by an offset between carrier frequencies of local oscillators at transmit and receive ends, and a Doppler shift caused by relative motion of the transmit and receive ends. In this case, frequency offsets between different transmission reception apparatuses and the terminal device are different. In the conventional technology, a plurality of transmission reception apparatuses in a same SFN cell send a same TRS to the terminal on a same time-frequency resource. Therefore, the terminal device receives the TRS only on the time-frequency resource corresponding to the TRS, determines, based on the TRS, the first carrier frequency on which the DM-RS and the PDSCH are to be received, receives the DM-RS and the PDSCH on the first carrier frequency, and demodulates the PDSCH by using the received DM-RS. Consequently, the terminal device cannot obtain a most appropriate carrier frequency on which downlink data is to be received, and accurate receiving of the DM-RS and the PDSCH is affected. As a result, performance of demodulating the PDSCH by the terminal device is reduced.

Figure 2B:
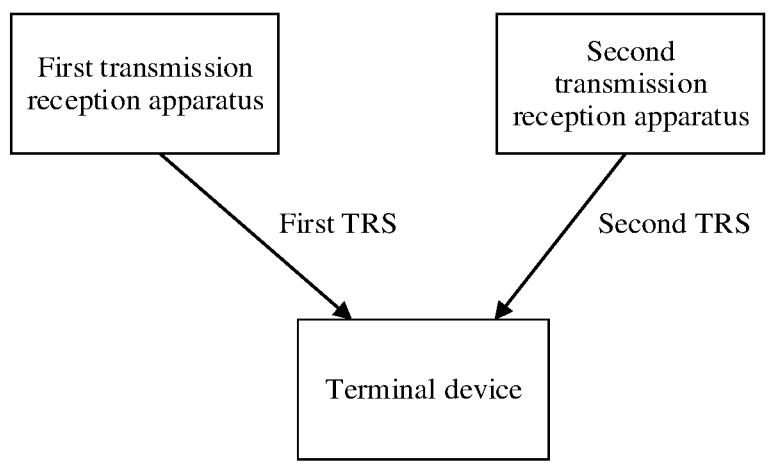
FIG. 2B is a schematic diagram of a scenario related to a signal demodulation method according to an embodiment.

FIG. 2B is a schematic diagram of a scenario a signal demodulation method according to an embodiment. In the scenario shown in FIG. 2B, a first transmission reception apparatus of a single frequency network cell sends a first TRS to a terminal device, and a second transmission reception apparatus sends a second TRS to the terminal device. The first TRS and the second TRS occupy different time-frequency resources. The first transmission reception apparatus sends indication information to the terminal device, where the indication information indicates one or more TRSs for receiving a downlink signal. The one or more TRSs for receiving the downlink signal are at least one of the first TRS and the second TRS. The downlink signal includes a DM-RS and downlink data. In this way, the terminal device can receive the first TRS on a time-frequency resource used by the first transmission reception apparatus to send the TRS and receive the second TRS on a time-frequency resource used by the second transmission reception apparatus to send the TRS. The terminal device can obtain, based on the one or more TRSs that are for receiving the downlink signal and that are indicated by the indication information, an appropriate carrier frequency on which the downlink signal is to be received, and demodulate the downlink data in the downlink signal by using the DM-RS in the downlink signal. This helps improve performance of receiving and demodulating the downlink data by the terminal device. The embodiments may be applied to a single frequency network scenario, for example, a high-speed railway scenario.

Figure 3:
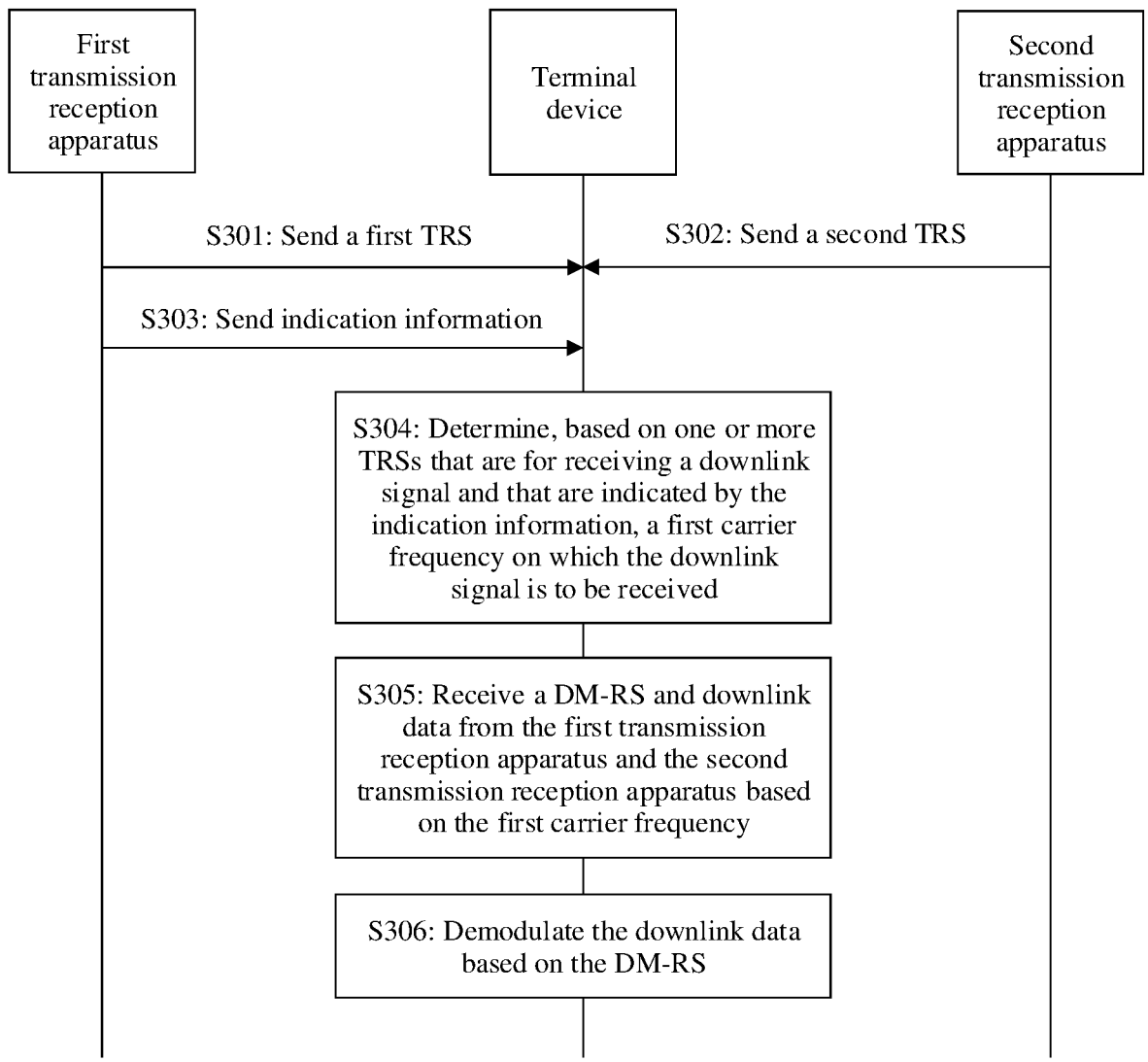
FIG. 3 is a schematic flowchart of a signal demodulation method according to an implementation.

FIG. 3 is a schematic flowchart of a signal demodulation method according to an embodiment.

S301: A first transmission reception apparatus sends a first TRS to a terminal device.

A network processing device may send the first TRS to the terminal device through the first transmission reception apparatus.

S302: A second transmission reception apparatus sends a second TRS to the terminal device.

The network processing device may send the first TRS to the terminal device through the second transmission reception apparatus.

The first TRS and the second TRS occupy different time-frequency resources.

The terminal device may receive the first TRS from the first transmission reception apparatus on a time-frequency resource corresponding to the first TRS and receive the second TRS from the second transmission reception apparatus on a time-frequency resource corresponding to the second TRS.

Before step S301 and step S302, the first transmission reception apparatus and the second transmission reception apparatus may send RRC signaling to the terminal device, to indicate a time-frequency resource occupied by a TRS sent by each transmission reception apparatus.

The first TRS and the second TRS may occupy different time domain resources, the first TRS and the second TRS may occupy different frequency domain resources, or the first TRS and the second TRS may occupy different time domain resources and different frequency domain resources.

Performing receiving and sending by the transmission reception apparatus may be understood as performing receiving and sending by the network processing device through the transmission reception apparatus. For ease of description, sometimes it is expressed as performing sending or receiving by the network processing device, and sometimes it is expressed as performing sending or receiving by the transmission reception apparatus.

S303: The first transmission reception apparatus sends indication information to the terminal device, where the indication information indicates one or more TRSs for receiving a downlink signal, and the one or more TRSs for demodulation are at least one of the first TRS and the second TRS.

Accordingly, the terminal device receives the indication information from the first transmission reception apparatus.

It may be understood that the indication information may indicate that the TRS for receiving the downlink signal may be the first TRS, the TRS for receiving the downlink signal may be the second TRS, or the TRSs for receiving the downlink signal may be the first TRS and the second TRS.

The first transmission reception apparatus may send media access control control element (MAC CE) signaling and/or downlink control information (DCI) signaling to the terminal.

For example, the first transmission reception apparatus may send the MAC CE signaling to the terminal, where the MAC CE signaling includes the indication information. Alternatively, the first transmission reception apparatus may send the DCI signaling to the terminal, where the DCI signaling includes the indication information. Alternatively, the first transmission reception apparatus may send the MAC CE signaling and the DCI signaling to the terminal, where the MAC CE signaling and the DCI signaling include the indication information.

It should be noted that, in this embodiment, alternatively, the second transmission reception apparatus may send indication information to the terminal device. Alternatively, the second transmission reception apparatus sends MAC CE signaling and/or DCI signaling that include/includes indication information.

S304: The terminal device determines, based on the one or more TRSs that are for receiving the downlink signal and that are indicated by the indication information, a first carrier frequency on which the downlink signal is to be received.

When the TRS that is for receiving the downlink signal and that is indicated by the indication information is either of the first TRS and the second TRS, the terminal device determines the first carrier frequency based on either of the TRSs. When the TRSs that are for receiving the downlink signal and that are indicated by the indication information are the first TRS and the second TRS, the terminal device determines the first carrier frequency based on the first TRS and the second TRS.

S305: The terminal device receives a DM-RS and downlink data from the first transmission reception apparatus and the second transmission reception apparatus based on the first carrier frequency.

It may be understood that the first transmission reception apparatus sends the DM-RS and the downlink data to the terminal device, and the second transmission reception apparatus sends the DM-RS and the downlink data to the terminal device, so that the terminal device can receive the DM-RS and the downlink data from the first transmission reception apparatus and the second transmission reception apparatus.

In this embodiment, the DM-RS sent by the first transmission reception apparatus is the same as the DM-RS sent by the second transmission reception apparatus, and the downlink data sent by the first transmission reception apparatus is the same as the downlink data sent by the second transmission reception apparatus.

S306: The terminal device demodulates the downlink data based on the DM-RS.

After receiving the DM-RS and the downlink data, the terminal device demodulates the downlink data based on the DM-RS. The downlink data may be, for example, a PDSCH or a PDCCH.

It should be noted that the signal demodulation method in this embodiment is also applicable to a scenario in which an SFN cell includes a plurality of (more than two) transmission reception apparatuses. The first transmission reception apparatus and the second transmission reception apparatus may be understood as any two different transmission reception apparatuses in the plurality of transmission reception apparatuses.

The plurality of (more than two) transmission reception apparatuses send TRSs to the terminal, each transmission reception apparatus is configured to send one TRS to the terminal device, and time-frequency resources occupied by the TRSs sent by the transmission reception apparatuses are different. The terminal device may receive, on the different time-frequency resources, the TRSs sent by all of the plurality of transmission reception apparatuses, to obtain a plurality of received TRSs. Any one or more of the plurality of transmission reception apparatuses send indication information to the terminal device. One or more TRSs that are for receiving a downlink signal and that are indicated by the indication information may be one or more of the plurality of received TRSs. Then, the terminal device determines, based on the one or more TRSs for receiving the downlink signal, a first carrier frequency on which the downlink signal is to be received, receives a DM-RS and downlink data on the first carrier frequency, and demodulates the downlink data based on the received DM-RS.

In the signal demodulation method in this embodiment, the first transmission reception apparatus sends the first TRS to the terminal device, and the second transmission reception apparatus sends the second TRS to the terminal device. The terminal device receives the indication information from the first transmission reception apparatus or the second transmission reception apparatus, where the indication information indicates the one or more TRSs for receiving the downlink signal, and the one or more TRSs for receiving the downlink signal are at least one of the first TRS and the second TRS. In this way, the terminal device can obtain a plurality of received TRSs on different time-frequency resources. The terminal device can obtain, based on the one or more TRSs that are for demodulation and that are indicated by the indication information, an appropriate carrier frequency on which the downlink signal is to be received, and demodulate the downlink data in the downlink signal by using the DM-RS in the downlink signal. This helps improve performance of receiving and demodulating the downlink data by the terminal device.

In some embodiments, the TRSs for demodulation are the first TRS and the second TRS.

Figure 4A:
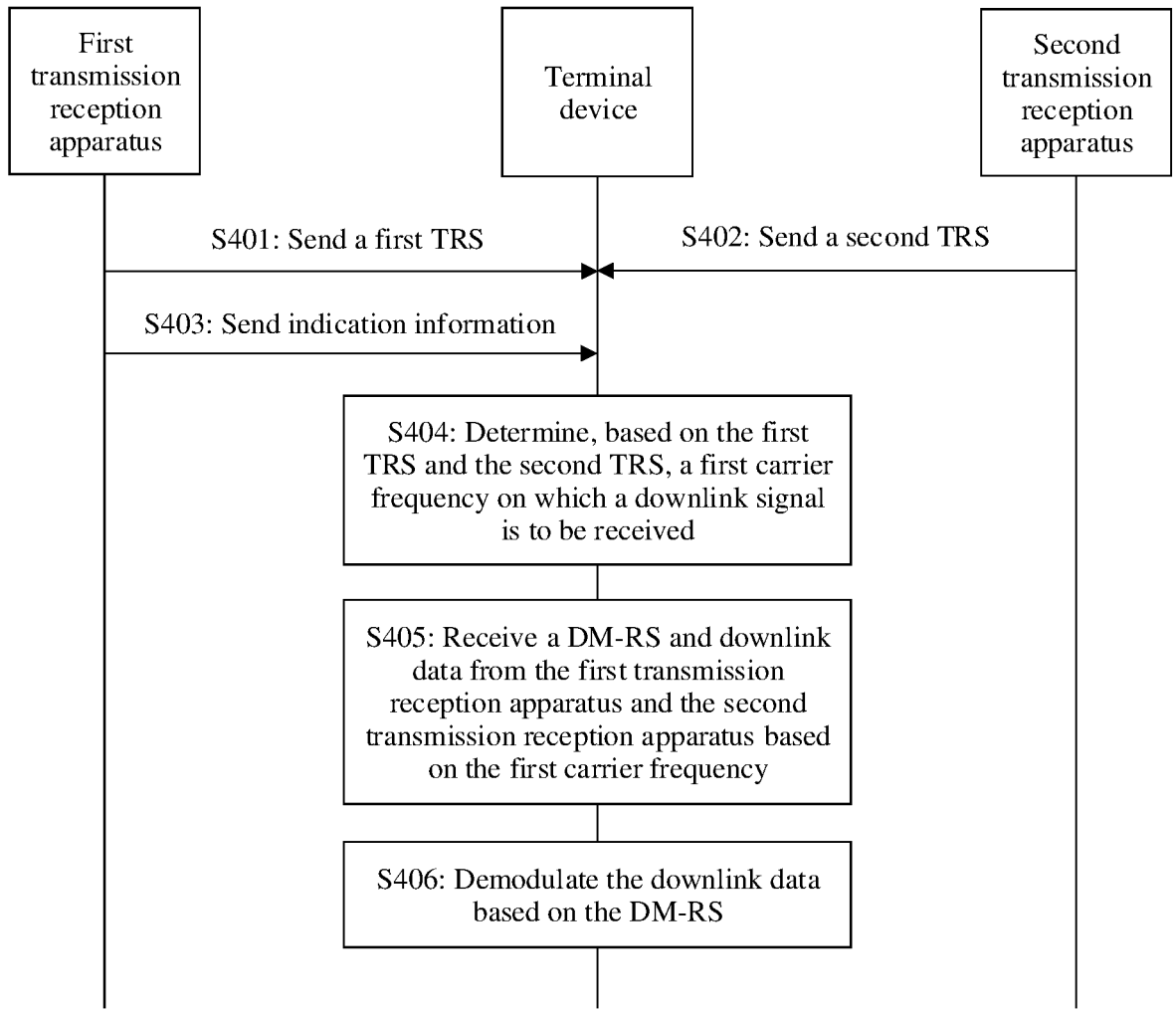
FIG. 4A is another schematic flowchart of a signal demodulation method according to an embodiment.

FIG. 4A is another schematic flowchart of a signal demodulation method according to an embodiment. In some embodiments, the signal demodulation method may include the following steps.

S401: A first transmission reception apparatus sends a first TRS to a terminal device.

S402: A second transmission reception apparatus sends a second TRS to the terminal device.

The first TRS and the second TRS occupy different time-frequency resources.

The terminal device may receive the first TRS from the first transmission reception apparatus on a time-frequency resource corresponding to the first TRS and receive the second TRS from the second transmission reception apparatus on a time-frequency resource corresponding to the second TRS.

For explanations and descriptions of step S401 and step S402, refer to explanations and descriptions of step S301 and step S401 in the foregoing embodiment. To avoid redundancy, details are not described herein again.

S403: The first transmission reception apparatus sends indication information to the terminal device, where the indication information indicates TRSs for receiving a downlink signal, and the TRSs for demodulation are the first TRS and the second TRS.

Accordingly, the terminal device receives the indication information from the first transmission reception apparatus.

It should be noted that, in this embodiment, alternatively, the second transmission reception apparatus may send indication information to the terminal device.

S404: The terminal device determines, based on the first TRS and the second TRS, a first carrier frequency on which the downlink signal is to be received.

The terminal device may determine, based on a second carrier frequency of the first TRS and a third carrier frequency of the second TRS, the first carrier frequency on which the downlink signal is to be received. Alternatively, the terminal device may determine the first carrier frequency based on a first signal to interference plus noise ratio of the first TRS and a signal to interference plus noise ratio of the second TRS. Alternatively, the terminal device may determine the first carrier frequency based on first receive power corresponding to the first TRS and second receive power corresponding to the second TRS. Further, a manner of determining the first carrier frequency based on the first TRS and the second TRS is not limited to the foregoing examples. In another embodiment, the terminal device may alternatively determine the first carrier frequency based on the first TRS and the second TRS in another manner.

S405: The terminal device receives a DM-RS and downlink data from the first transmission reception apparatus and the second transmission reception apparatus based on the first carrier frequency.

For explanations and descriptions of step S405, refer to explanations and descriptions of S305 in the foregoing embodiment. To avoid redundancy, details are not described herein again.

S406: The terminal device demodulates the downlink data based on the DM-RS.

In this way, the terminal device can obtain an appropriate first carrier frequency based on the first TRS and the second TRS, so that the terminal device can better receive the downlink signal and demodulate the downlink data in the downlink signal by using the DM-RS in the downlink signal.

Further, the signal demodulation method in this embodiment is also applicable to a scenario in which an SFN cell includes a plurality of (more than two) transmission reception apparatuses. The first transmission reception apparatus and the second transmission reception apparatus may be understood as any two different transmission reception apparatuses in the plurality of transmission reception apparatuses.

In the scenario in which the SFN cell includes the plurality of (more than two) transmission reception apparatuses, the plurality of transmission reception apparatuses sends TRSs to the terminal device, each transmission reception apparatus is configured to send one TRS to the terminal device, and time-frequency resources occupied by the TRSs sent by the transmission reception apparatuses are different. The terminal device may receive, on the different time-frequency resources, the TRSs sent by all of the plurality of transmission reception apparatuses, to obtain a plurality of received TRSs. TRSs that are for receiving a downlink signal and that are indicated by indication information are the plurality of received TRSs. The terminal device determines, based on the plurality of received TRSs, a first carrier frequency on which the downlink signal is to be received, and receives a DM-RS and downlink data on the first carrier frequency.

Figure 4B:
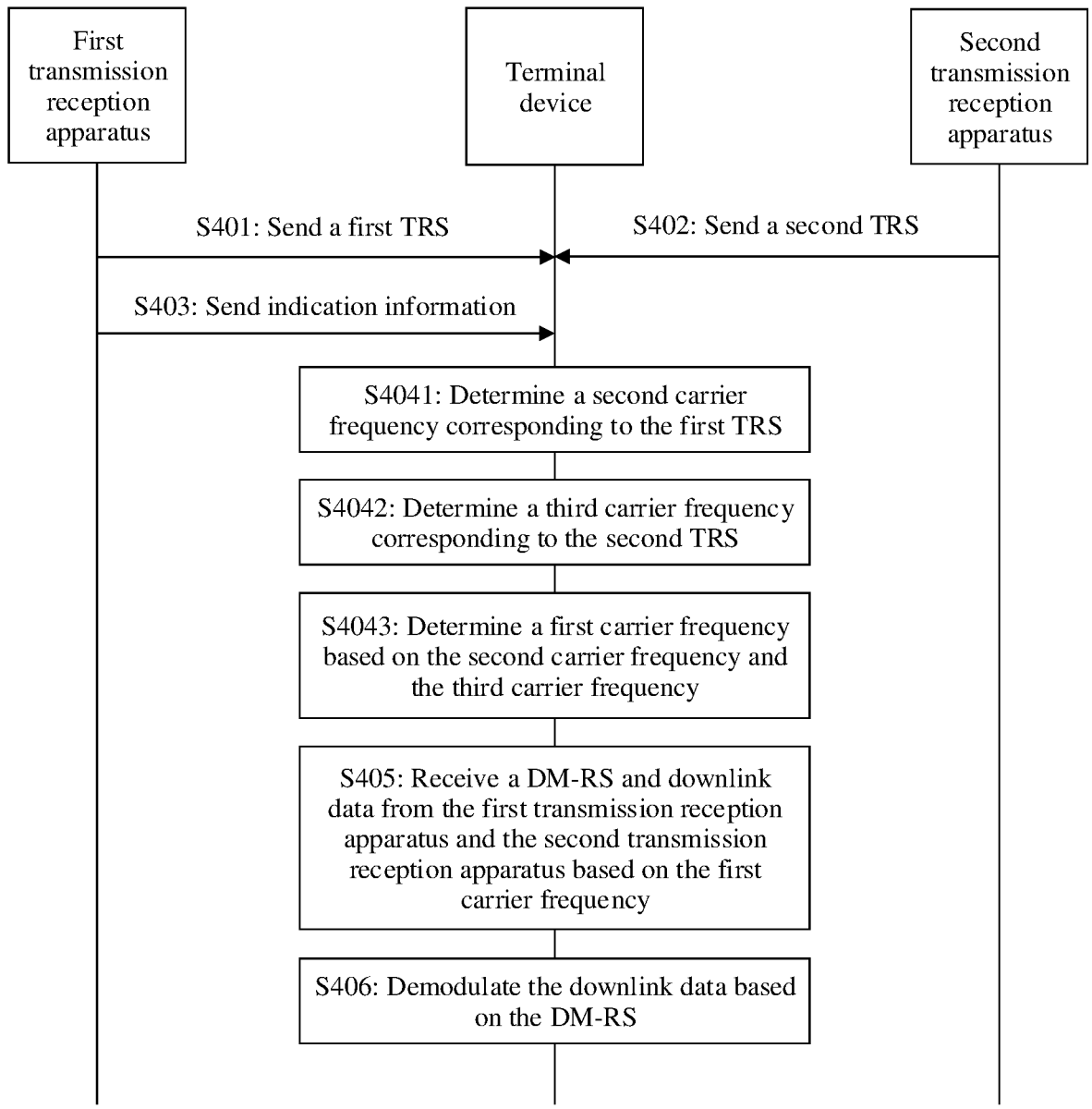
FIG. 4B is another schematic flowchart of a signal demodulation method according to an embodiment.

FIG. 4B is another schematic flowchart of a signal demodulation method according to an embodiment. Based on the embodiment shown in FIG. 4A, in some embodiments, S404 may include the following steps:

S4041: The terminal device determines a second carrier frequency corresponding to the first TRS.

S4042: The terminal device determines a third carrier frequency corresponding to the second TRS.

S4043: The terminal device determines the first carrier frequency based on the second carrier frequency and the third carrier frequency.

The terminal device may use the second carrier frequency as the first carrier frequency, the terminal device may use the third carrier frequency as the first carrier frequency, or the terminal device may obtain the first carrier frequency through calculation based on the second carrier frequency and the third carrier frequency. For example, the terminal device may use an arithmetic average value of the second carrier frequency and the third carrier frequency as the first carrier frequency, or the terminal device may use a weighted average value of the second carrier frequency and the third carrier frequency as the first carrier frequency.

In this way, the first carrier frequency is obtained based on the second carrier frequency corresponding to the first TRS and the third carrier frequency corresponding to the second TRS, so that the first carrier frequency on which a DM-RS and downlink data are to be received is more appropriate. This can improve performance of receiving and demodulating the data by the terminal device.

Optionally, the terminal device uses a weighted average value of carrier frequencies corresponding to all TRSs as the first carrier frequency, and a weighted value of a carrier frequency corresponding to a TRS sent by each transmission reception apparatus is determined by the terminal device based on receive power of a downlink reference signal received by the terminal device from the transmission reception apparatus or a signal to interference plus noise ratio (SINR) of the downlink reference signal received by the terminal device from the transmission reception apparatus. The terminal device may distinguish between downlink reference signals sent by all transmission reception apparatuses. In other words, the terminal device can identify a transmission reception apparatus that sends the downlink signal. For example, the downlink reference signal may be, but is not limited to, a TRS.

In an example, the receive power is positively correlated with the weighted value. In this way, a weighted value of a carrier frequency corresponding to a TRS with higher receive power can be larger, so that the first carrier frequency can be more likely to be similar to a carrier frequency corresponding to a TRS with higher signal strength. In this case, the terminal device receives the DM-RS and the downlink data on the first carrier frequency, so that the performance of receiving the downlink data by the terminal device can be improved.

When an absolute value of a difference between the second carrier frequency and the third carrier frequency is less than a frequency offset threshold, the terminal device determines the first carrier frequency based on the second carrier frequency and the third carrier frequency. The frequency offset threshold is a real number and is for measuring a difference between two selected carrier frequencies. The frequency offset threshold is stored in the terminal device, and frequency offset thresholds of different terminal devices may be the same or may be different.

It may be understood that, when the absolute value of the difference between the second carrier frequency and the third carrier frequency is less than the frequency offset threshold, a difference between a frequency offset between the terminal device and the first transmission reception apparatus and a frequency offset between the terminal device and the second transmission reception apparatus is not large. In this case, the terminal device may determine, based on the second carrier frequency corresponding to the first TRS sent by the first transmission reception apparatus and the third carrier frequency corresponding to the second TRS sent by the second transmission reception apparatus, the first carrier frequency on which the downlink signal is to be received. In this way, the first carrier frequency is determined by comprehensively considering the second carrier frequency corresponding to the first TRS sent by the first transmission reception apparatus and the third carrier frequency corresponding to the second TRS sent by the second transmission reception apparatus. The terminal device receives the DM-RS and the downlink data on the first carrier frequency and demodulates the downlink data by using the received DM-RS, so that the performance of receiving and demodulating the downlink data can be improved.

When an absolute value of a difference between the second carrier frequency and the third carrier frequency is greater than a frequency offset threshold, the terminal device uses either of the first carrier frequency and the second carrier frequency as the first carrier frequency. For example, the terminal device may obtain a first signal to interference plus noise ratio corresponding to the first TRS and a second signal to interference plus noise ratio corresponding to the second TRS, and determine, based on the first signal to interference plus noise ratio and the second signal to interference plus noise ratio, to use the second carrier frequency or the third carrier frequency as the first carrier frequency. Optionally, the terminal device uses a carrier frequency corresponding to a TRS with a largest signal to interference plus noise ratio as the first carrier frequency. For another example, the terminal device may obtain first receive power corresponding to the first TRS and second receive power corresponding to the second TRS, and determine, based on the first receive power and the second receive power, to use the second carrier frequency or the third carrier frequency as the first carrier frequency. Optionally, the terminal device uses a carrier frequency corresponding to a TRS with highest receive power as the first carrier frequency.

When an absolute value of a difference between the second carrier frequency and the third carrier frequency is equal to a frequency offset threshold, the terminal device may use a processing manner used when the absolute value of the difference between the second carrier frequency and the third carrier frequency is greater than the frequency offset threshold, that is, may obtain the first carrier frequency through calculation based on the second carrier frequency and the third carrier frequency; or the terminal device uses a processing manner used when the absolute value of the difference between the second carrier frequency and the third carrier frequency is less than the frequency offset threshold, that is, uses either of the first carrier frequency and the second carrier frequency as the first carrier frequency.

It should be noted that the signal demodulation method in this embodiment is also applicable to a scenario in which an SFN cell includes a plurality of (more than two) transmission reception apparatuses. The first transmission reception apparatus and the second transmission reception apparatus may be understood as any two different transmission reception apparatuses in the plurality of transmission reception apparatuses.

In the scenario in which the SFN cell includes the plurality of (more than two) transmission reception apparatuses, the plurality of transmission reception apparatuses sends TRSs to the terminal, each transmission reception apparatus is configured to send one TRS to the terminal device, and time-frequency resources occupied by the TRSs sent by the transmission reception apparatuses are different.

The terminal device may receive, on the different time-frequency resources, the TRSs sent by all of the plurality of transmission reception apparatuses, to obtain a plurality of TRSs. The terminal device receives indication information from at least one of the plurality of transmission reception apparatuses. TRSs that are for receiving a downlink signal and that are indicated by the indication information are the plurality of TRSs. The terminal device obtains a carrier frequency corresponding to each of the plurality of TRSs, and then determines, based on the carrier frequency corresponding to each of the plurality of TRSs, a first carrier frequency on which the downlink signal is to be received.

Optionally, the terminal device may obtain the carrier frequency corresponding to each of the plurality of TRSs, and then calculate an absolute value of a difference between carrier frequencies corresponding to every two different TRSs to obtain a plurality of frequency offset residuals, where each frequency offset residual is the absolute value of the difference between the carrier frequencies corresponding to the two different TRSs. When an average value of the plurality of frequency offset residuals is less than a frequency offset threshold, the terminal device determines, based on the carrier frequency corresponding to each of the plurality of TRSs, the first carrier frequency on which the downlink signal is to be received. For example, the terminal device may use a weighted average value of the carrier frequencies corresponding to all of the plurality of TRSs as the first carrier frequency.

When an average value of the plurality of frequency offset residuals is greater than a frequency offset threshold, the terminal device uses a carrier frequency corresponding to one of the plurality of TRSs as the first carrier frequency. For example, the terminal device may obtain a signal to interference plus noise ratio corresponding to each TRS and use a carrier frequency corresponding to one of the TRSs as the first carrier frequency based on the signal to interference plus noise ratio corresponding to each TRS. Optionally, the terminal device uses a carrier frequency corresponding to a TRS with a largest signal to interference plus noise ratio as the first carrier frequency. For another example, the terminal device may obtain receive power corresponding to each TRS and use a carrier frequency corresponding to one of the TRSs as the first carrier frequency based on the receive power corresponding to each TRS. Optionally, the terminal device uses a carrier frequency corresponding to a TRS with highest receive power as the first carrier frequency.

When an average value of the plurality of frequency offset residuals is equal to a frequency offset threshold, the terminal device may use a processing manner used when the average value of the plurality of frequency offset residuals is greater than the frequency offset threshold, that is, may use a carrier frequency corresponding to one of the plurality of TRSs as the first carrier frequency; or the terminal device may use a processing manner used when the average value of the plurality of frequency offset residuals is less than the frequency offset threshold, that is, may determine, based on the carrier frequency corresponding to each of the plurality of TRSs, the first carrier frequency on which the downlink signal is to be received.

Figure 4C:
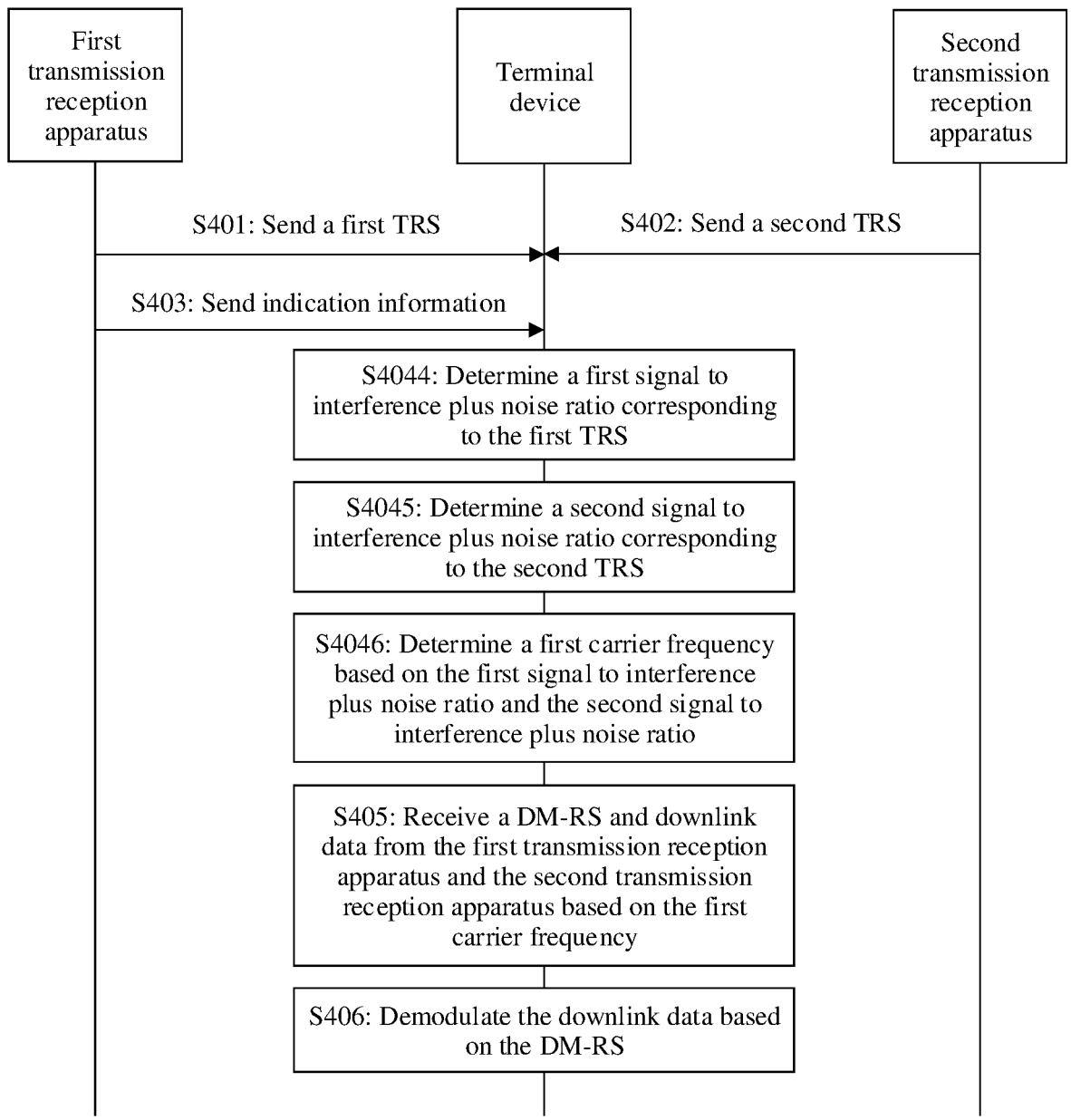
FIG. 4C is another schematic flowchart of a signal demodulation method according to an embodiment.

FIG. 4C is another schematic flowchart of a signal demodulation method according to an embodiment. Based on the embodiment shown in FIG. 4A, in some embodiments, S404 may include the following steps:

S4044: The terminal device determines a first signal to interference plus noise ratio corresponding to the first TRS.

S4045: The terminal device determines a second signal to interference plus noise ratio corresponding to the second TRS.

S4046: The terminal device determines the first carrier frequency based on the first signal to interference plus noise ratio and the second signal to interference plus noise ratio, where the first carrier frequency is a second carrier frequency corresponding to the first TRS or a third carrier frequency corresponding to the second TRS.

A signal to interference plus noise ratio reflects quality of a signal sent by a transmission reception apparatus corresponding to each TRS to the terminal device. The terminal device selects, from the first TRS and the second TRS based on the first signal to interference plus noise ratio of the first TRS and the second signal to interference plus noise ratio of the second TRS, one first carrier frequency as the first carrier frequency on which the downlink signal is to be received, so that the terminal device can select a carrier frequency, with appropriate signal quality, on which a DM-RS and downlink data are to be received.

Optionally, the terminal device uses a carrier frequency corresponding to a TRS with a largest signal to interference plus noise ratio as the first carrier frequency. For example, if the first signal to interference plus noise ratio is the largest, the second carrier frequency is used as the first carrier frequency. Alternatively, if the second signal to interference plus noise ratio is the largest, the third carrier frequency is used as the first carrier frequency. The signal to interference plus noise ratio reflects the quality of the signal sent by the transmission reception apparatus corresponding to each TRS to the terminal device. Therefore, the terminal device selects, based on the first signal to interference plus noise ratio and the second signal to interference plus noise ratio, the carrier frequency corresponding to the TRS with the largest signal to interference plus noise ratio as the first carrier frequency. In this way, the terminal device can receive the downlink DM-RS and the downlink data on a carrier frequency with best signal quality and demodulate the downlink data by using the received DM-RS, to improve performance of receiving and demodulating the downlink data by the terminal device.

In an optional embodiment, S4046 includes: The terminal device determines the second carrier frequency corresponding to the first TRS. The terminal device determines the third carrier frequency corresponding to the second TRS. When an absolute value of a difference between the second carrier frequency and the third carrier frequency is greater than a frequency offset threshold, the terminal device determines the first carrier frequency based on the first signal to interference plus noise ratio and the second signal to interference plus noise ratio. The first carrier frequency is the second carrier frequency corresponding to the first TRS or the third carrier frequency corresponding to the second TRS.

It may be understood that when the absolute value of the difference between the second carrier frequency and the third carrier frequency is greater than the frequency offset threshold, a difference between a frequency offset between the terminal device and the first transmission reception apparatus and a frequency offset between the terminal device and the second transmission reception apparatus is large. The terminal device selects one carrier frequency on which the downlink signal is to be received, so that it can be ensured that the terminal device better receives the DM-RS and the downlink data that are sent by one transmission reception apparatus.

Optionally, when the absolute value of the difference between the second carrier frequency and the third carrier frequency is greater than the frequency offset threshold, the terminal device may select the carrier frequency corresponding to the TRS with the largest signal to interference plus noise ratio as the first carrier frequency on which the downlink signal is to be received. In this way, the terminal device can receive the DM-RS and the downlink data that are sent by a transmission reception apparatus with best signal quality, to improve the performance of receiving and demodulating the downlink data by the terminal device.

Further, the signal demodulation method further includes: The terminal device sends feedback information, where the feedback information is for indicating to silence a transmission reception apparatus other than a transmission reception apparatus corresponding to the first carrier frequency.

The terminal device may send the feedback information in a broadcast manner. After transmission reception apparatuses in an SFN cell receive the feedback information, the transmission reception apparatus other than the transmission reception apparatus corresponding to the first carrier frequency is silenced. Alternatively, after receiving the feedback information sent by the terminal, at least one of a plurality of transmission reception apparatuses sends the feedback information to a BBU. The BBU indicates, based on the feedback information, the transmission reception apparatus other than the transmission reception apparatus corresponding to the first carrier frequency to switch to a silent state. In this way, only the transmission reception apparatus corresponding to the first carrier frequency sends the downlink signal to the terminal device, so that wireless transmission resources can be saved.

Optionally, when an absolute value of a difference between the second carrier frequency and the third carrier frequency is less than a frequency offset threshold, the terminal device obtains, through calculation based on the second carrier frequency and the third carrier frequency, the first carrier frequency on which the downlink signal is to be received. It may be understood that, when the absolute value of the difference between the second carrier frequency and the third carrier frequency is less than the frequency offset threshold, a difference between a frequency offset between the terminal device and the first transmission reception apparatus and a frequency offset between the terminal device and the second transmission reception apparatus is not large. In this case, the terminal device may determine, based on the second carrier frequency corresponding to the first TRS sent by the first transmission reception apparatus and the third carrier frequency corresponding to the second TRS sent by the second transmission reception apparatus, the first carrier frequency on which the downlink signal is to be received. In this way, the first carrier frequency is determined by comprehensively considering the second carrier frequency corresponding to the first TRS sent by the first transmission reception apparatus and the third carrier frequency corresponding to the second TRS sent by the second transmission reception apparatus, so that the terminal device can receive the DM-RS and the downlink data from each transmission reception apparatus on the first carrier frequency, to improve the performance of receiving the downlink data.

When an absolute value of a difference between the second carrier frequency and the third carrier frequency is equal to a frequency offset threshold, the terminal device may use a processing manner used when the absolute value of the difference between the second carrier frequency and the third carrier frequency is greater than the frequency offset threshold, that is, may select either of the second carrier frequency corresponding to the first TRS and the second carrier frequency corresponding to the second TRS as the first carrier frequency based on the first signal to interference plus noise ratio and the second signal to interference plus noise ratio; or the terminal device may use a processing manner used when the absolute value of the difference between the second carrier frequency and the third carrier frequency is less than the frequency offset threshold, that is, may obtain, through calculation based on the second carrier frequency and the third carrier frequency, the first carrier frequency on which the downlink signal is to be received.

It should be noted that the signal demodulation method in this embodiment is also applicable to a scenario in which an SFN cell includes a plurality of (more than two) transmission reception apparatuses. The first transmission reception apparatus and the second transmission reception apparatus may be understood as any two different transmission reception apparatuses in the plurality of transmission reception apparatuses.

For example, in the scenario in which the SFN cell includes the plurality of (more than two) transmission reception apparatuses, the plurality of transmission reception apparatuses sends TRSs to the terminal, each transmission reception apparatus is configured to send one TRS to the terminal device, and time-frequency resources occupied by the TRSs sent by the transmission reception apparatuses are different.

The terminal device may receive, on the different time-frequency resources, the TRSs sent by all of the plurality of transmission reception apparatuses, to obtain a plurality of TRSs. Then, the terminal device selects, based on a signal to interference plus noise ratio of each of the plurality of TRSs, a carrier frequency corresponding to one of the plurality of TRSs as a first carrier frequency on which a downlink signal is to be received. For example, the terminal device may obtain the signal to interference plus noise ratio of each TRS, and use a carrier frequency corresponding to a TRS with a largest signal to interference plus noise ratio as the first carrier frequency. The signal to interference plus noise ratio reflects quality of a signal. In this way, the terminal device can receive a DM-RS and downlink data from a transmission reception apparatus with best signal quality, to improve performance of receiving and demodulating the downlink data by the terminal device.

Optionally, the terminal device may obtain a carrier frequency corresponding to each of the plurality of TRSs, and then calculate an absolute value of a difference between carrier frequencies corresponding to every two different TRSs to obtain a plurality of frequency offset residuals, where each frequency offset residual is the absolute value of the difference between the carrier frequencies corresponding to the two different TRSs. When an average value of the plurality of frequency offset residuals is greater than a frequency offset threshold, the terminal device selects a carrier frequency of one of the plurality of TRSs as the first carrier frequency based on the signal to interference plus noise ratio of each TRS. Optionally, the terminal device uses the carrier frequency corresponding to the TRS with the largest signal to interference plus noise ratio as the first carrier frequency.

After determining the first carrier frequency, the terminal device sends feedback information, where the feedback information is for indicating to silence a transmission reception apparatus other than a transmission reception apparatus corresponding to the first carrier frequency.

Optionally, when an average value of the plurality of frequency offset residuals is less than a frequency offset threshold, the terminal device obtains, through calculation based on the carrier frequency corresponding to each of the plurality of TRSs, the first carrier frequency on which the downlink signal is to be received. It may be understood that when the average value of the plurality of frequency offset residuals is less than the frequency offset threshold, a difference between frequency offsets between the terminal device and the transmission reception apparatuses is not large. In this case, the terminal device may obtain, through calculation based on the carrier frequency corresponding to each of the plurality of TRSs, the first carrier frequency on which the downlink signal is to be received. In this way, the first carrier frequency is determined by comprehensively considering the carrier frequency of the TRS sent by each transmission reception apparatus, so that the terminal device can receive, on the first carrier frequency, the downlink signal sent by each transmission reception apparatus, to improve performance of receiving the downlink signal.

When an average value of the plurality of frequency offset residuals is equal to a frequency offset threshold, the terminal device may use a processing manner used when the average value of the plurality of frequency offset residuals is greater than the frequency offset threshold, that is, may select a carrier frequency of one of the plurality of TRSs as the first carrier frequency based on the signal to interference plus noise ratio of each TRS; or the terminal device may use a processing manner used when the average value of the plurality of frequency offset residuals is less than the frequency offset threshold, that is, may obtain, through calculation based on the carrier frequency corresponding to each of the plurality of TRSs, the first carrier frequency on which the downlink signal is to be received.

Figure 4D:
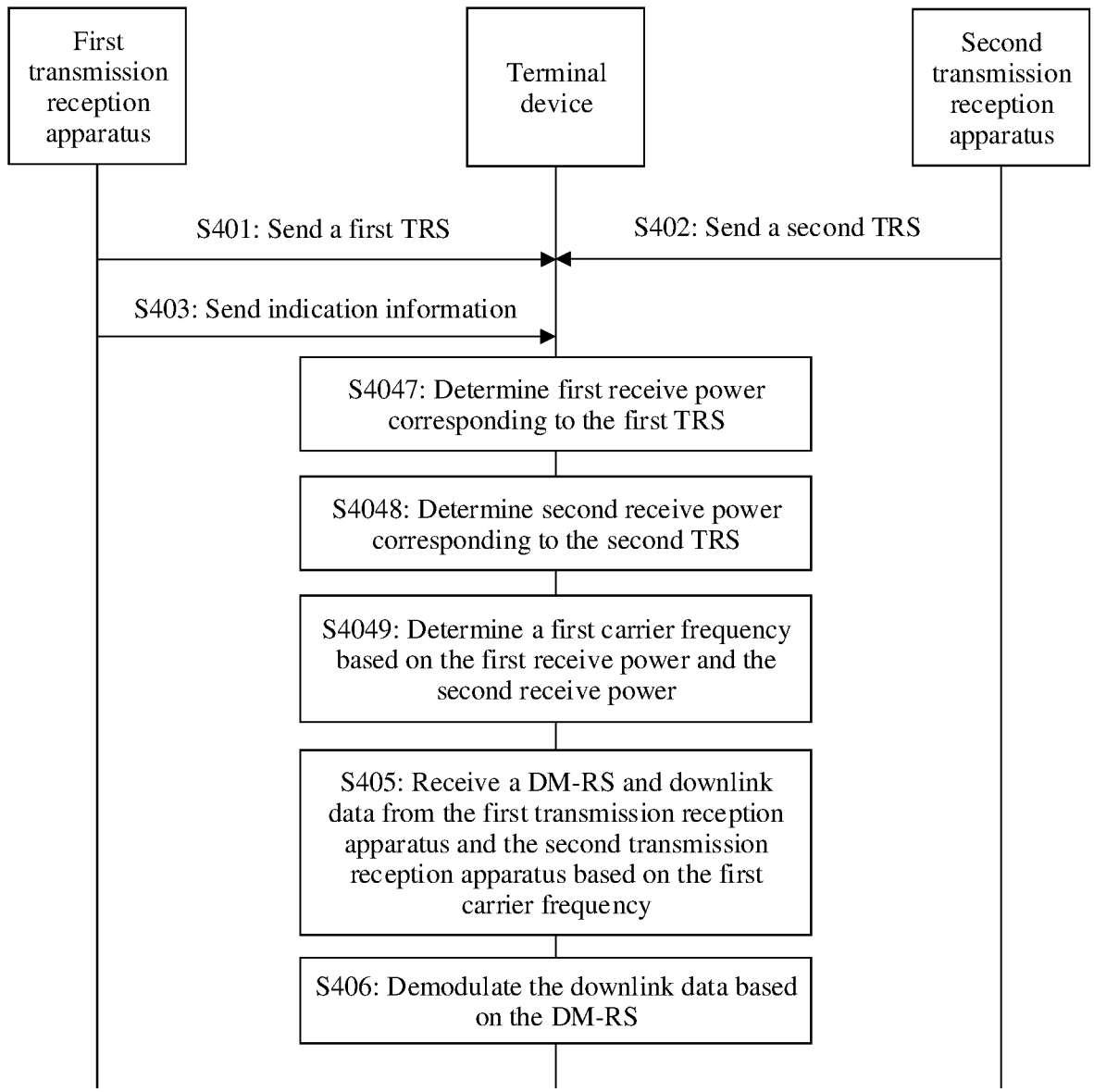
FIG. 4D is another schematic flowchart of a signal demodulation method according to an embodiment.

FIG. 4D is another schematic flowchart of a signal demodulation method according to an embodiment. Based on the embodiment shown in FIG. 4A, in some embodiments, S404 may include the following steps:

S4047: The terminal device determines first receive power corresponding to the first TRS.

S4048: The terminal device determines second receive power corresponding to the second TRS.

S4049: The terminal device determines the first carrier frequency based on the first receive power and the second receive power, where the first carrier frequency is a second carrier frequency corresponding to the first TRS or a third carrier frequency corresponding to the second TRS.

Receive power reflects strength of a signal sent by a transmission reception apparatus corresponding to each TRS to the terminal device. The terminal device selects, from the first TRS and the second TRS based on the first receive power of the first TRS and the second receive power of the second TRS, one first carrier frequency as the first carrier frequency on which the downlink signal is to be received, so that the terminal device can select a carrier frequency, with appropriate signal strength, on which a DM-RS and downlink data are to be received, to improve performance of receiving and demodulating the data by the terminal device.

In an optional embodiment, the terminal device uses a carrier frequency corresponding to a TRS with highest receive power as the first carrier frequency. For example, if the first receive power is the highest, the second carrier frequency is used as the first carrier frequency. Alternatively, if the second receive power is the highest, the third carrier frequency is used as the first carrier frequency. The receive power reflects quality of the signal sent by the transmission reception apparatus corresponding to each TRS to the terminal device. In this case, the terminal device selects, based on the first receive power and the second receive power, the carrier frequency of the TRS with the highest receive power as the first carrier frequency. In this way, the terminal device can receive the DM-RS and the downlink data on a carrier frequency with highest signal strength, to improve the performance of receiving and demodulating the downlink data by the terminal device.

In an optional embodiment, S4049 includes: The terminal device determines the second carrier frequency corresponding to the first TRS. The terminal device determines the third carrier frequency corresponding to the second TRS. When an absolute value of a difference between the second carrier frequency and the third carrier frequency is greater than a frequency offset threshold, the terminal device determines the first carrier frequency based on the first receive power and the second receive power. The first carrier frequency is the second carrier frequency corresponding to the first TRS or the third carrier frequency corresponding to the second TRS.

It may be understood that when the absolute value of the difference between the second carrier frequency and the third carrier frequency is greater than the frequency offset threshold, a difference between a frequency offset between the terminal device and the first transmission reception apparatus and a frequency offset between the terminal device and the second transmission reception apparatus is large. The terminal device selects one carrier frequency on which the downlink signal is to be received, so that it can be ensured that the terminal device better receives the DM-RS and the downlink data that are sent by one transmission reception apparatus.

Optionally, when the absolute value of the difference between the second carrier frequency and the third carrier frequency is greater than the frequency offset threshold, the terminal device may select the carrier frequency corresponding to the TRS with the highest receive power as the first carrier frequency on which the downlink signal is to be received. In this way, the terminal device can receive the DM-RS and the downlink data that are sent by a transmission reception apparatus with highest signal strength, to improve the performance of receiving and demodulating the downlink data by the terminal device.

Further, the signal demodulation method further includes: The terminal device sends feedback information, where the feedback information is for indicating to silence a transmission reception apparatus other than a transmission reception apparatus corresponding to the first carrier frequency.

The terminal device may send the feedback information in a broadcast manner. After transmission reception apparatuses in an SFN cell receive the feedback information, the transmission reception apparatus other than the transmission reception apparatus corresponding to the first carrier frequency is silenced. Alternatively, after receiving the feedback information sent by the terminal, at least one of a plurality of transmission reception apparatuses sends the feedback information to a BBU. The BBU indicates, based on the feedback information, the transmission reception apparatus other than the transmission reception apparatus corresponding to the first carrier frequency to switch to a silent state. In this way, only the transmission reception apparatus corresponding to the first carrier frequency sends the downlink signal to the terminal device, so that wireless transmission resources can be saved.

Optionally, when an absolute value of a difference between the second carrier frequency and the third carrier frequency is less than a frequency offset threshold, the terminal device obtains, through calculation based on the second carrier frequency and the third carrier frequency, the first carrier frequency on which the downlink signal is to be received. It may be understood that, when the absolute value of the difference between the second carrier frequency and the third carrier frequency is less than the frequency offset threshold, a difference between a frequency offset between the terminal device and the first transmission reception apparatus and a frequency offset between the terminal device and the second transmission reception apparatus is not large. In this case, the terminal device may determine, based on the second carrier frequency corresponding to the first TRS sent by the first transmission reception apparatus and the third carrier frequency corresponding to the second TRS sent by the second transmission reception apparatus, the first carrier frequency on which the downlink signal is to be received. In this way, the first carrier frequency is determined by comprehensively considering 42 second carrier frequency corresponding to the first TRS sent by the first transmission reception apparatus and the third carrier frequency corresponding to the second TRS sent by the second transmission reception apparatus, so that the terminal device can receive, on the first carrier frequency, the DM-RS and the downlink data that are sent by each transmission reception apparatus, to improve the performance of receiving the downlink data.

When an absolute value of a difference between the second carrier frequency and the third carrier frequency is equal to a frequency offset threshold, the terminal device may use a processing manner used when the absolute value of the difference between the second carrier frequency and the third carrier frequency is greater than the frequency offset threshold, that is, may select either of the second carrier frequency corresponding to the first TRS and the second carrier frequency corresponding to the second TRS as the first carrier frequency based on the first receive power and the second receive power; or the terminal device may use a processing manner used when the absolute value of the difference between the second carrier frequency and the third carrier frequency is less than the frequency offset threshold, that is, may obtain, through calculation based on the second carrier frequency and the third carrier frequency, the first carrier frequency on which the downlink signal is to be received.

It should be noted that the signal demodulation method in this embodiment is also applicable to a scenario in which an SFN cell includes a plurality of (more than two) transmission reception apparatuses. The first transmission reception apparatus and the second transmission reception apparatus may be understood as any two different transmission reception apparatuses in the plurality of transmission reception apparatuses.

For example, in the scenario in which the SFN cell includes the plurality of (more than two) transmission reception apparatuses, the plurality of transmission reception apparatuses sends TRSs to the terminal, each transmission reception apparatus is configured to send one TRS to the terminal device, and time-frequency resources occupied by the TRSs sent by the transmission reception apparatuses are different.

The terminal device may receive, on the different time-frequency resources, the TRSs sent by all of the plurality of transmission reception apparatuses, to obtain a plurality of TRSs. Then, the terminal device selects, based on receive power of each of the plurality of TRSs, a carrier frequency corresponding to one of the plurality of TRSs as a first carrier frequency on which a downlink signal is to be received. For example, the terminal device may obtain the receive power of each TRS and use a carrier frequency corresponding to a TRS with highest receive power as the first carrier frequency. In this way, the terminal device can receive a DM-RS and downlink data from a transmission reception apparatus with highest signal strength, to improve performance of receiving and demodulating the downlink data by the terminal device.

Optionally, the terminal device may obtain a carrier frequency corresponding to each of the plurality of TRSs, and then calculate an absolute value of a difference between carrier frequencies corresponding to every two different TRSs to obtain a plurality of frequency offset residuals, where each frequency offset residual is the absolute value of the difference between the carrier frequencies corresponding to the two different TRSs. When an average value of the plurality of frequency offset residuals is greater than a frequency offset threshold, the terminal device selects a carrier frequency of one of the plurality of TRSs as the first carrier frequency based on the receive power of each TRS. Optionally, the terminal device uses the carrier frequency corresponding to the TRS with the highest receive power as the first carrier frequency.

After determining the first carrier frequency, the terminal device sends feedback information, where the feedback information is for indicating to silence a transmission reception apparatus other than a transmission reception apparatus corresponding to the first carrier frequency. In this way, only the transmission reception apparatus corresponding to the first carrier frequency sends the downlink signal to the terminal device, so that wireless transmission resources can be saved.

Optionally, when an average value of the plurality of frequency offset residuals is less than a frequency offset threshold, the terminal device obtains, through calculation based on the carrier frequency corresponding to each of the plurality of TRSs, the first carrier frequency on which the downlink signal is to be received. It may be understood that when the average value of the plurality of frequency offset residuals is less than the frequency offset threshold, a difference between frequency offsets between the terminal device and the transmission reception apparatuses is not large. In this case, the terminal device may obtain, through calculation based on the carrier frequency corresponding to each of the plurality of TRSs, the first carrier frequency on which the downlink signal is to be received. In this way, the first carrier frequency is determined by comprehensively considering the carrier frequency of the TRS sent by each transmission reception apparatus, so that the terminal device can receive, on the first carrier frequency, the DM-RS and downlink data that are sent by each transmission reception apparatus, to improve the performance of receiving the downlink data.

When an average value of the plurality of frequency offset residuals is equal to a frequency offset threshold, the terminal device may use a processing manner used when the average value of the plurality of frequency offset residuals is greater than the frequency offset threshold, that is, may select a carrier frequency of one of the plurality of TRSs as the first carrier frequency based on the receive power of each TRS; or the terminal device may use a processing manner used when the average value of the plurality of frequency offset residuals is less than the frequency offset threshold, that is, may obtain, through calculation based on the carrier frequency corresponding to each of the plurality of TRSs, the first carrier frequency on which the downlink signal is to be received.

Figure 4E:
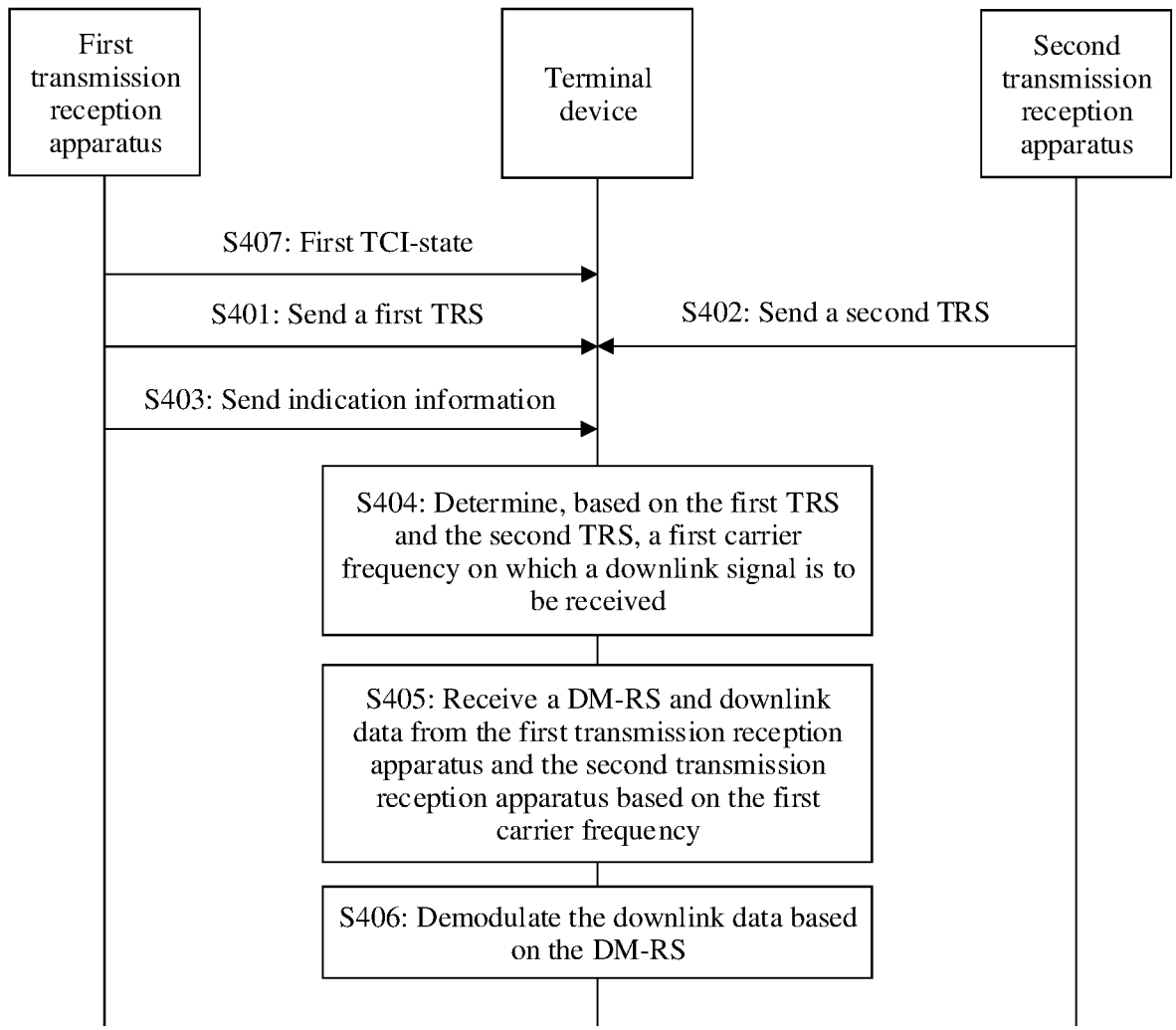
FIG. 4E is another schematic flowchart of a signal demodulation method according to an embodiment.

Refer to FIG. 4E. Based on the embodiment corresponding to FIG. 4A, in some embodiments, the signal demodulation method further includes the following step:

S407: The first transmission reception apparatus sends a first transmission configuration indicator state (TCI-state) to the terminal device.

In some embodiments, the first TCI-state indicates a first correspondence between a first TRS and a DM-RS and a second correspondence between a second TRS and a DM-RS. In some other embodiments, the first TCI-state indicates a first correspondence between a first TRS and downlink data and a second correspondence between a second TRS and downlink data.

The indication information received by the terminal device from the first transmission reception apparatus or the second transmission reception apparatus is information indicating the first TCI-state. The indication information indicates the first TCI-state, to indicate that the TRSs for receiving the downlink signal are the first TRS and the second TRS.

It should be noted that, in this embodiment, alternatively, the second transmission reception apparatus may send a first transmission configuration state.

A network processing device may send the first TCI-state to the terminal device through either or both of the first transmission reception apparatus and the second transmission reception apparatus.

In an example, step S407 is performed before step S401 and step S402. In another example, step S407 is performed after step S401 and step S402. An execution sequence of step S401, step S402, and step S401 is not limited in this embodiment.

Further, the signal demodulation method in this embodiment is also applicable to a scenario in which an SFN cell includes a plurality of (more than two) transmission reception apparatuses. The first transmission reception apparatus and the second transmission reception apparatus may be understood as any two different transmission reception apparatuses in the plurality of transmission reception apparatuses.

In the scenario in which the SFN cell includes the plurality of (more than two) transmission reception apparatuses, for example, the SFN cell includes a transmission reception apparatus 1, a transmission reception apparatus 2, . . . , and a transmission reception apparatus n, where n is a positive integer greater than 2, the plurality of transmission reception apparatuses send TRSs to the terminal device, each transmission reception apparatus is configured to send one TRS to the terminal device, and time-frequency resources occupied by the TRSs sent by the transmission reception apparatuses are different. Any one of the plurality of transmission reception apparatuses may send a first TCI-state. The first TCI-state indicates a correspondence between a TRS sent by the transmission reception apparatus 1 and a DM-RS, a correspondence between a TRS sent by the transmission reception apparatus 2 and a DM-RS, . . . , and a correspondence between a TRS sent by the transmission reception apparatus n and a DM-RS. Alternatively, the first TCI-state indicates a correspondence between a TRS sent by the transmission reception apparatus 1 and downlink data, a correspondence between a TRS sent by the transmission reception apparatus 2 and downlink data, . . . , and a correspondence between a TRS sent by the transmission reception apparatus n and downlink data. Indication information received by the terminal device is information indicating the first TCI-state.

Figure 4F:
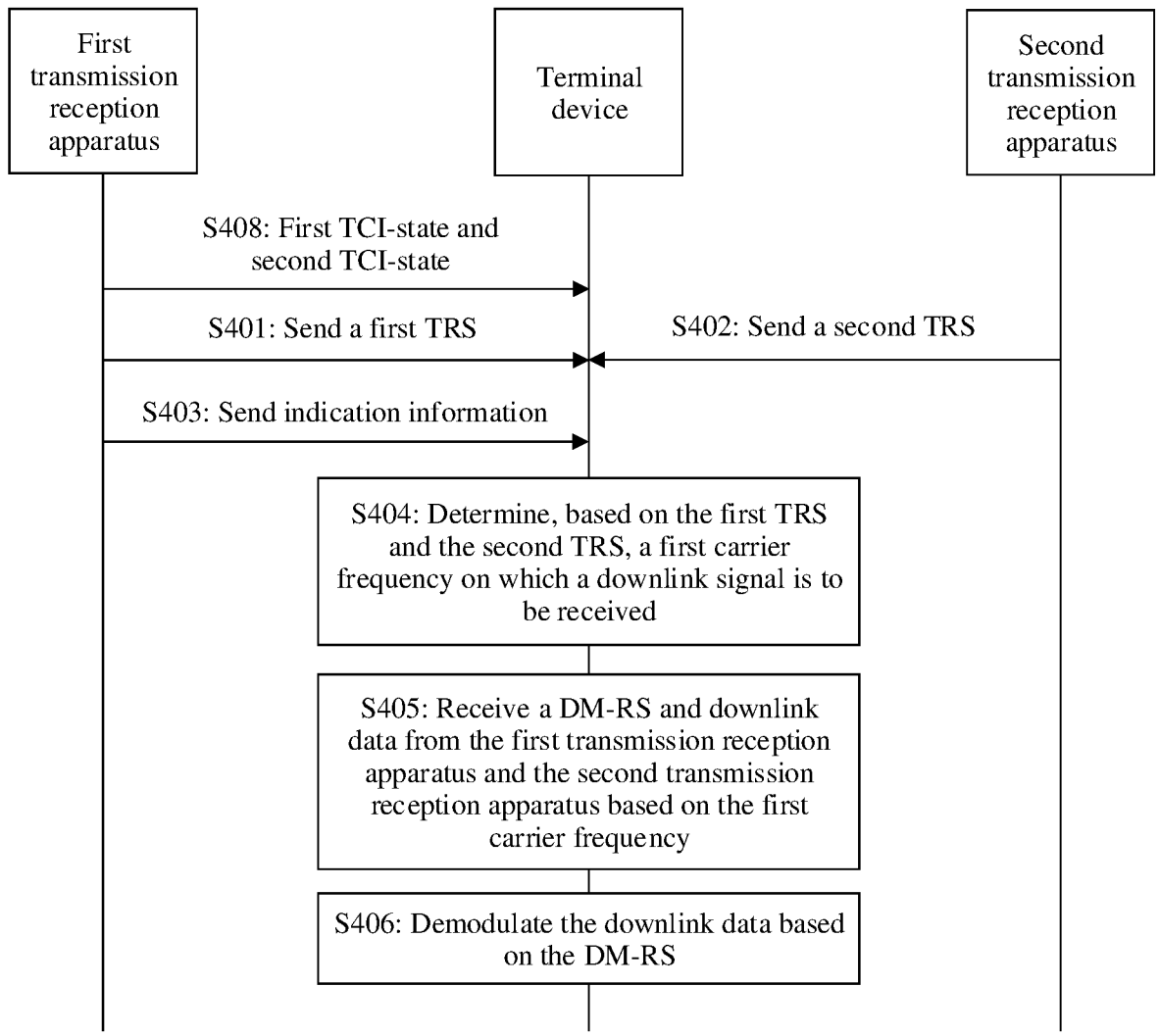
FIG. 4F is another schematic flowchart of a signal demodulation method according to an embodiment.

Refer to FIG. 4F. Based on the embodiment shown in FIG. 4A, in some embodiments, the signal demodulation method further includes the following step:

S408: The first transmission reception apparatus sends a first TCI-state and a second TCI-state to the terminal device.

In this embodiment, alternatively, the second transmission reception apparatus may send a first TCI-state and a second TCI-state.

A network processing device may send the first TCI-state and the second TCI-state to the terminal device through either or both of the first transmission reception apparatus and the second transmission reception apparatus.

In some embodiments, the first TCI-state indicates a first correspondence between a first TRS and a DM-RS, and the second TCI-state indicates a second correspondence between a second TRS and a DM-RS. In some other embodiments, the first TCI-state indicates a first correspondence between a first TRS and downlink data, and the second TCI-state indicates a second correspondence between a second TRS and downlink data.

The indication information received by the terminal device from the first transmission reception apparatus or the second transmission reception apparatus is information indicating the first TCI-state and the second TCI-state. The indication information indicates the first TCI-state and the second TCI-state, to indicate that the TRSs for receiving the downlink signal are the first TRS and the second TRS. In this way, a plurality of TCI-states is configured, so that the network processing device can flexibly indicate the TRSs for receiving the downlink signal.

Further, the signal demodulation method in this embodiment is also applicable to a scenario in which an SFN cell includes a plurality of (more than two) transmission reception apparatuses. The first transmission reception apparatus and the second transmission reception apparatus may be understood as any two different transmission reception apparatuses in the plurality of transmission reception apparatuses.

In the scenario in which the SFN cell includes the plurality of (more than two) transmission reception apparatuses, for example, the SFN cell includes a transmission reception apparatus 1, a transmission reception apparatus 2, . . . , and a transmission reception apparatus n, where n is a positive integer greater than 2, the plurality of transmission reception apparatuses send TRSs to the terminal device, each transmission reception apparatus is configured to send one TRS to the terminal device, and time-frequency resources occupied by the TRSs sent by the transmission reception apparatuses are different. Any one of the plurality of transmission reception apparatuses may send n TCI-states.

Each of the n TCI-states indicates a correspondence between a TRS sent by one transmission reception apparatus and a DM-RS. For example, a first TCI-state indicates a correspondence between a TRS sent by the transmission reception apparatus 1 and a DM-RS, a second TCI-state indicates a correspondence between a TRS sent by the transmission reception apparatus 2 and a DM-RS, . . . , and an $n^{th}$ TCI-state indicates a correspondence between a TRS sent by the transmission reception apparatus n and a DM-RS.

Alternatively, each of the n TCI-states indicates a correspondence between a TRS sent by one transmission reception apparatus and downlink data. For example, a first TCI-state indicates a correspondence between a TRS sent by the transmission reception apparatus 1 and downlink data, a correspondence between a TRS sent by the transmission reception apparatus 2 and downlink data, . . . , and a correspondence between a TRS sent by the transmission reception apparatus n and downlink data.

Indication information received by the terminal device is indication information indicating the n TCI-states.

In some embodiments, the TRS for receiving the downlink signal is the first TRS or the second TRS. In a scenario in which an SFN cell includes a plurality of (more than two) transmission reception apparatuses, the plurality of transmission reception apparatuses sends TRSs to the terminal, each transmission reception apparatus is configured to send one TRS to the terminal device, and time-frequency resources occupied by the TRSs sent by the transmission reception apparatuses are different. The terminal device receives, on the different time-frequency resources, the TRSs sent by all of the plurality of transmission reception apparatuses, to obtain a plurality of received TRSs. Any one or more of the plurality of transmission reception apparatuses sends indication information to the terminal device. A TRS that is for receiving a downlink signal and that is indicated by the indication information is one of the plurality of received TRSs.

The TRS for receiving the downlink signal may be determined based on receive power of an uplink reference signal sent by the terminal device at each transmission reception apparatus, may be determined based on a frequency offset value of an uplink reference signal sent by the terminal device at each transmission reception apparatus, or may be determined based on a distance between the terminal device and each transmission reception apparatus.

Figure 5A:
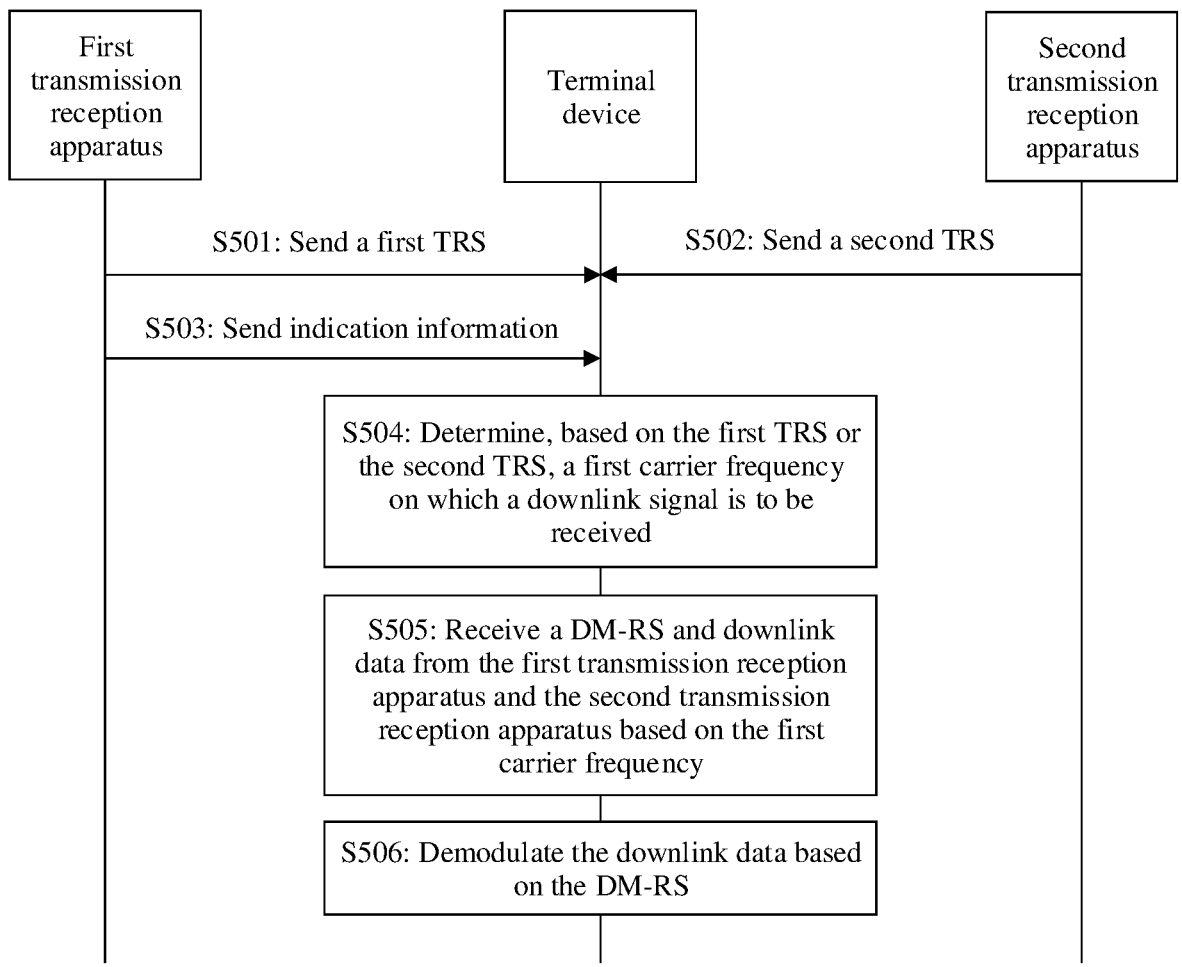
FIG. 5A is another schematic flowchart of a signal demodulation method according to an embodiment.

FIG. 5A is another schematic flowchart of a signal demodulation method according to an embodiment. In some embodiments, the signal demodulation method includes the following steps.

S501: A first transmission reception apparatus sends a first TRS to a terminal device.

S502: A second transmission reception apparatus sends a second TRS to the terminal device.

The first TRS and the second TRS occupy different time-frequency resources.

Accordingly, the terminal device receives the first TRS from the first transmission reception apparatus on a time-frequency resource corresponding to the first TRS and receives the second TRS from the second transmission reception apparatus on a time-frequency resource corresponding to the second TRS. S403: The terminal device sends an uplink reference signal.

For explanations and descriptions of step S501 and step S502, refer to explanations and descriptions of step S301 and step S302 in the foregoing embodiment. To avoid redundancy, details are not described herein again.

S503: The first transmission reception apparatus sends indication information to the terminal device, where the indication information indicates a TRS for receiving a downlink signal, and the TRS for demodulation is the first TRS or the second TRS.

Accordingly, the terminal device receives the indication information from the first transmission reception apparatus.

For example, a network processing device may determine, based on a distance between the first transmission reception apparatus and the terminal device and a distance between the second transmission reception apparatus and the terminal device, the TRS for receiving the downlink signal. In other words, a transmission reception apparatus that sends the TRS for receiving the downlink signal may be determined based on a distance between each transmission reception apparatus and the terminal device. Optionally, a BBU of an SFN cell may use, as the TRS for receiving the downlink signal, a TRS sent by a transmission reception apparatus closest to the terminal device. This can improve performance of receiving downlink data by the terminal device.

It should be noted that, in this embodiment, alternatively, the second transmission reception apparatus may send indication information to the terminal device.

In some examples, step S503 may be performed before step S501 and step S502. In some other examples, step S503 may be performed after step S501 and step S502. An execution sequence of steps S501 to S503 is not limited in this embodiment.

S504: The terminal device determines, based on the first TRS or the second TRS, a first carrier frequency on which the downlink signal is to be received.

The terminal device may determine the first carrier frequency based on a first receive carrier frequency of the first TRS at the terminal device, or the terminal device determines the first carrier frequency based on a second receive carrier frequency of the second TRS at the terminal device.

S505: The terminal device receives a DM-RS and the downlink data from the first transmission reception apparatus and the second transmission reception apparatus based on the first carrier frequency.

For explanations and descriptions of step S505, refer to explanations and descriptions of S505 in the foregoing embodiment. To avoid redundancy, details are not described herein again.

S506: The terminal device demodulates the downlink data based on the DM-RS.

In this way, the terminal device can obtain an appropriate first carrier frequency based on the first TRS and the second TRS, so that the terminal device can better receive the downlink signal and demodulate the downlink data in the downlink signal by using the DM-RS in the downlink signal.

Further, the signal demodulation method in this embodiment is also applicable to a scenario in which an SFN cell includes a plurality of (more than two) transmission reception apparatuses. The first transmission reception apparatus and the second transmission reception apparatus may be understood as any two different transmission reception apparatuses in the plurality of transmission reception apparatuses.

In the scenario in which the SFN cell includes the plurality of (more than two) transmission reception apparatuses, the plurality of transmission reception apparatuses sends TRSs to the terminal device, each transmission reception apparatus is configured to send one TRS to the terminal device, and time-frequency resources occupied by the TRSs sent by the transmission reception apparatuses are different. The terminal device may receive, on the different time-frequency resources, the TRSs sent by all of the plurality of transmission reception apparatuses, to obtain a plurality of received TRSs. A TRS that is for receiving a downlink signal and that is indicated by indication information is one of the plurality of received TRSs. The terminal device determines, based on the TRS indicated by the indication information, a first carrier frequency on which the downlink signal is to be received, and receives a DM-RS and downlink data on the first carrier frequency.

Figure 5B:
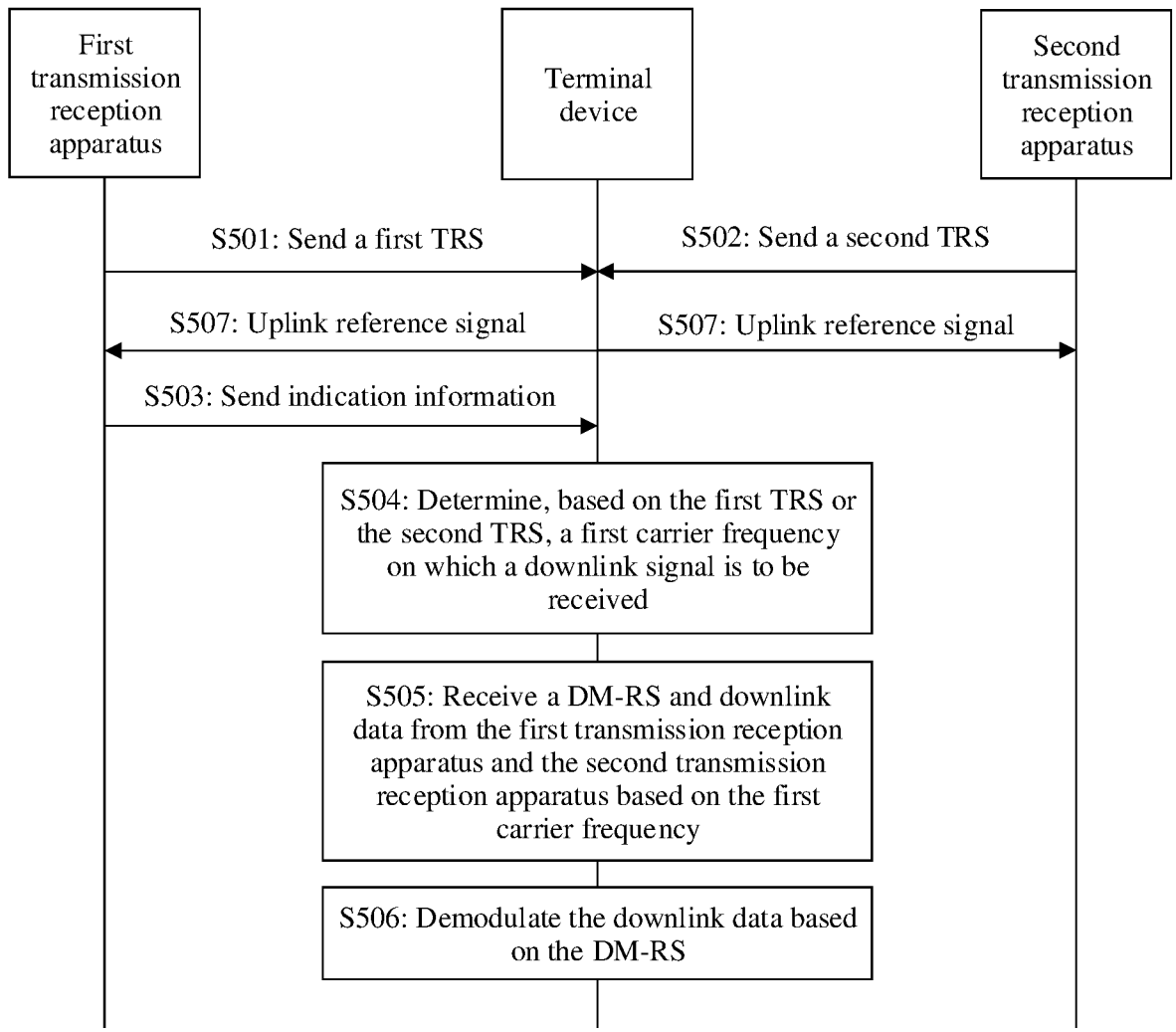
FIG. 5B is another schematic flowchart of a signal demodulation method according to an embodiment.

FIG. 5B is another schematic flowchart of a signal demodulation method according to an embodiment. Based on the embodiment shown in FIG. 5A, in some embodiments, the signal demodulation method further includes the following step:

S507: The terminal device sends an uplink reference signal.

The terminal device may send the uplink reference signal, and each transmission reception apparatus in the SFN cell can receive the uplink reference signal.

Accordingly, the first transmission reception apparatus receives the uplink reference signal sent by the terminal device. The second transmission reception apparatus receives the uplink reference signal sent by the terminal device.

In an optional embodiment, reference signal received power of the uplink reference signal at the first transmission reception apparatus and reference signal received power of the uplink reference signal at the second transmission reception apparatus are for determining the TRS for receiving the downlink signal.

The network processing device may determine, based on first receive power of the uplink reference signal received by the first transmission reception apparatus and second receive power of the uplink reference signal received by the second transmission reception apparatus, the TRS for receiving the downlink signal, and then the first transmission reception apparatus or the second transmission reception apparatus sends the indication information, to indicate the TRS for receiving the downlink signal. The BBU of the SFN cell is deployed in the network processing device.

Transmit power of uplink reference signals received by the transmission reception apparatuses is the same. However, a path loss is caused in a transmission process of uplink power. Positions of the transmission reception apparatuses are different. Transmission paths and path losses of the uplink reference signals received by the transmission reception apparatuses are different. Therefore, receive power of the uplink reference signals received by the transmission reception apparatuses is different. In this case, the network processing device may determine, based on the receive power of the uplink reference signals received by the transmission reception apparatuses, to use the TRS sent by the first transmission reception apparatus or the TRS sent by the second transmission reception apparatus as the TRS for receiving the downlink signal. For example, the network processing device may select, as the TRS for receiving the downlink signal, a TRS sent by a transmission reception apparatus that receives an uplink reference signal with highest receive power. In this way, a transmission reception apparatus can be selected, where a path loss between the transmission reception apparatus and the terminal device is the smallest. A TRS sent by the transmission reception apparatus is used as the TRS for receiving the downlink signal. A smaller path loss indicates higher signal strength. In this way, the terminal device can receive the DM-RS and the downlink data on a carrier frequency with highest signal strength.

When the first transmission reception apparatus and the second transmission reception apparatus are deployed on a same network device, reference may be made to a scenario shown in FIG. 1B. The BBU of the SFN cell is deployed on the network device. The BBU obtains the uplink reference signal received by the first transmission reception apparatus and the uplink reference signal received by the second transmission reception apparatus, and determines, based on the reference signal received power of the uplink reference signal received by the first reception apparatus and the reference signal received power of the uplink reference signal received by the second reception apparatus, the TRS for receiving the downlink signal.

When the first transmission reception apparatus and the second transmission reception apparatus are deployed on different network devices, reference may be made to a scenario shown in FIG. 1C. The first transmission reception apparatus and the second transmission reception apparatus are connected to a same network device, and the BBU of the SFN cell is deployed on the same network device. After receiving the uplink reference signal, the first reception apparatus transmits the received uplink reference signal to the BBU. After receiving the uplink reference signal, the second reception apparatus transmits the received uplink reference signal to the BBU. The BBU obtains the uplink reference signal received by the first transmission reception apparatus and the uplink reference signal received by the second transmission reception apparatus, and determines, based on the reference signal received power of the uplink reference signal received by the first reception apparatus and the reference signal received power of the uplink reference signal received by the second reception apparatus, the TRS for receiving the downlink signal.

It may be understood that this embodiment is also applicable to a scenario in which an SFN cell includes a plurality of (more than two) transmission reception apparatuses. When the plurality of (more than two) transmission reception apparatuses in the SFN cell receive an uplink reference signal sent by the terminal device, the BBU obtains receive power of the uplink reference signal received by each of the plurality of transmission reception apparatuses, and determines, based on the receive power of the uplink reference signal received by each transmission reception apparatus, a TRS sent by one of the plurality of transmission reception apparatuses as a TRS for receiving a downlink signal. For example, the BBU selects a transmission reception apparatus that receives an uplink reference signal with highest receive power and uses a TRS sent by the transmission reception apparatus as the TRS for receiving the downlink signal.

In another optional embodiment, a frequency offset value of the uplink reference signal at the first transmission reception apparatus and a frequency offset value of the uplink reference signal at the second transmission reception apparatus are for determining the TRS for receiving the downlink signal.

The network processing device may determine a first frequency offset at the first transmission reception apparatus based on the uplink reference signal received by the first transmission reception apparatus and determine a second frequency offset at the second transmission reception apparatus based on the uplink reference signal received by the second transmission reception apparatus. Then, the TRS for receiving the downlink signal is determined based on the first frequency offset and the second frequency offset, and the first transmission reception apparatus or the second transmission reception apparatus sends the indication information, to indicate the TRS for receiving the downlink signal. The BBU of the SFN cell is deployed in the network processing device.

The network processing device may select, based on the first frequency offset and the second frequency offset, a TRS sent by a transmission reception apparatus as the TRS for receiving the downlink signal, where a frequency offset between the transmission reception apparatus and the terminal device is smaller. For example, if the network processing device determines, based on the first frequency offset and the second frequency offset, that a frequency offset between the terminal device and the first transmission reception apparatus is the smallest, the network processing device may determine that the first TRS sent by the first transmission reception apparatus is the TRS for receiving the downlink signal.

Alternatively, the network processing device may perform, based on the first frequency offset, pre-compensation on a carrier frequency on which the first transmission reception apparatus sends the downlink data, and determine the TRS for receiving the downlink signal as the first TRS.

Optionally, alternatively, the network processing device may perform, based on the second frequency offset, pre-compensation on a carrier frequency on which the second transmission reception apparatus sends the downlink data, and determine the TRS for receiving the downlink signal as the second TRS.

After determining the TRS for receiving the downlink signal, the network processing device performs step S503, that is, sends the indication information through the first transmission reception apparatus or the second transmission reception apparatus, to indicate the TRS used by the terminal device to receive the downlink signal. In this way, the terminal device determines, based on the indication information, the TRS for receiving the downlink signal.

When the first transmission reception apparatus and the second transmission reception apparatus are deployed on a same network device, reference may be made to a scenario shown in FIG. 1B. The BBU of the SFN cell is deployed on the network device. The BBU obtains the uplink reference signal received by the first transmission reception apparatus and the uplink reference signal received by the second transmission reception apparatus, and determines, based on the first frequency offset of the uplink reference signal at the first transmission reception apparatus and the second frequency offset of the uplink reference signal at the second transmission reception apparatus, the TRS for receiving the downlink signal.

When the first transmission reception apparatus and the second transmission reception apparatus are deployed on different network devices, reference may be made to a scenario shown in FIG. 1C. The first transmission reception apparatus and the second transmission reception apparatus are connected to a same network device, and the BBU of the SFN cell is deployed on the same network device. After receiving the uplink reference signal, the first reception apparatus transmits the received uplink reference signal to the BBU. After receiving the uplink reference signal, the second reception apparatus transmits the received uplink reference signal to the BBU. The BBU determines, based on the first frequency offset of the uplink reference signal at the first transmission reception apparatus and the second frequency offset of the uplink reference signal at the second transmission reception apparatus, the TRS for receiving the downlink signal.

It may be understood that the signal demodulation method in this implementation is also applicable to a scenario in which an SFN cell includes a plurality of (more than two) transmission reception apparatuses. The first transmission reception apparatus and the second transmission reception apparatus may be understood as any two different transmission reception apparatuses in the plurality of transmission reception apparatuses.

In the scenario in which the SFN cell includes the plurality of (more than two) transmission reception apparatuses, the network processing device obtains a frequency offset corresponding to an uplink reference signal received by each of the plurality of transmission reception apparatuses, and determines, based on the frequency offset corresponding to the uplink reference signal received by each transmission reception apparatus, a TRS sent by one of the plurality of transmission reception apparatuses as a TRS for receiving a downlink signal. Optionally, the network processing device may perform, based on the frequency offset corresponding to the uplink reference signal received by each transmission reception apparatus, pre-compensation on a carrier frequency on which each transmission reception apparatus sends downlink data to the terminal device, so that a frequency offset of the downlink data received by the terminal device can be 0, to improve performance of receiving and demodulating the data by the terminal device.

Figure 5C:
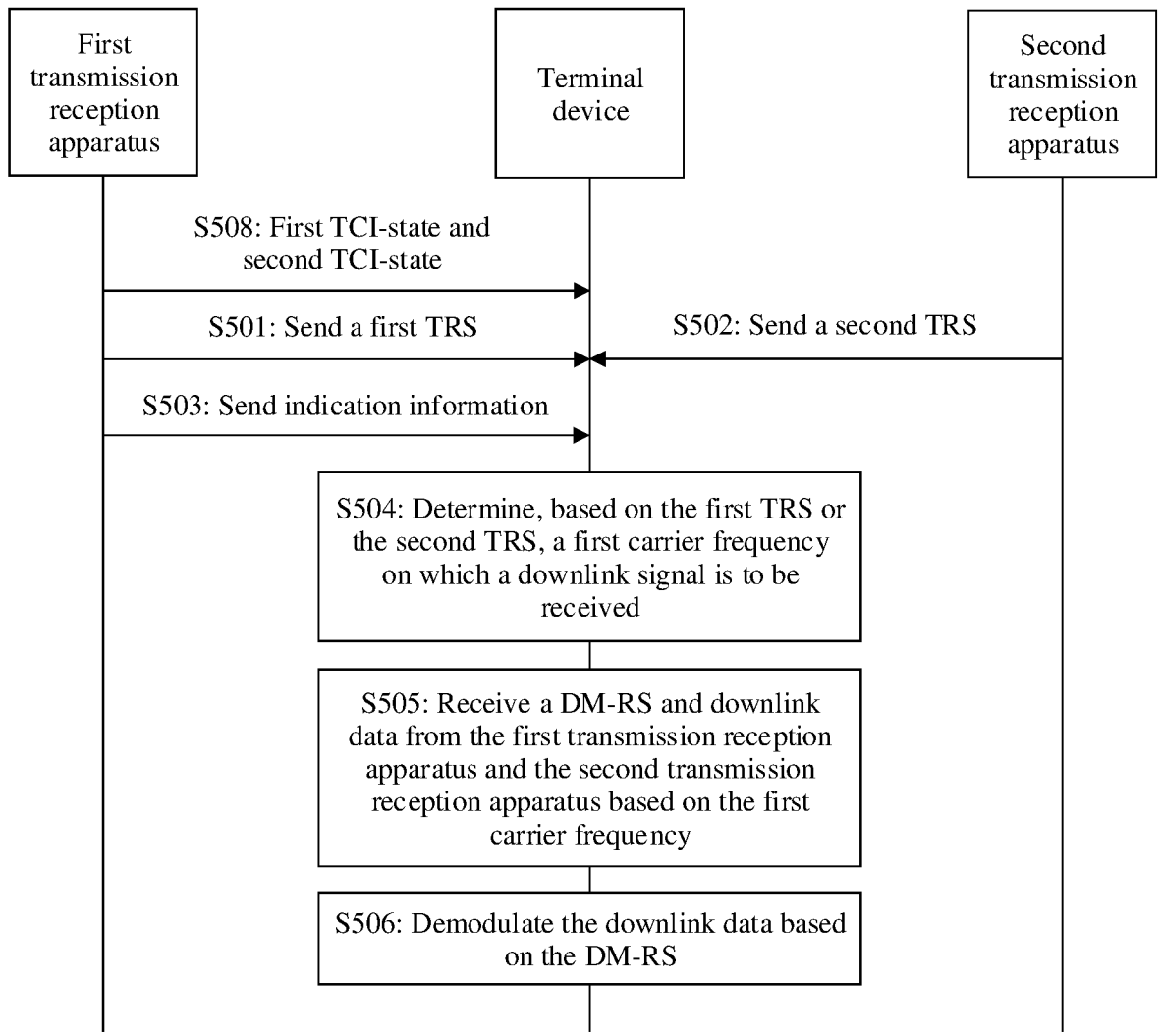
FIG. 5C is another schematic flowchart of a signal demodulation method according to an embodiment.

Refer to FIG. 5C. Based on the embodiment corresponding to FIG. 5A or FIG. 5B, in some embodiments, the signal demodulation method further includes the following step:

S508: The first transmission reception apparatus sends a first TCI-state and a second TCI-state to the terminal device.

In some embodiments, the first TCI-state indicates a first correspondence between a first TRS and a DM-RS, and the second TCI-state indicates a second correspondence between a second TRS and a DM-RS.

In some other embodiments, the first TCI-state indicates a first correspondence between a first TRS and downlink data, and the second TCI-state indicates a second correspondence between a second TRS and downlink data.

The indication information received by the terminal device from the first transmission reception apparatus or the second transmission reception apparatus is information indicating the first TCI-state or the second TCI-state.

For example, when the indication information indicates the first TCI-state, the TRS for receiving the downlink signal is the first TRS. Alternatively, when the indication information indicates the second TCI-state, the TRS for receiving the downlink signal is the second TRS.

It should be noted that, in this embodiment, alternatively, the second transmission reception apparatus may send a first TCI-state and a second TCI-state.

The network processing device may send the first TCI-state and the second TCI-state to the terminal device through either or both of the first transmission reception apparatus and the second transmission reception apparatus.

Further, the signal demodulation method in this embodiment is also applicable to a scenario in which an SFN cell includes a plurality of (more than two) transmission reception apparatuses. The first transmission reception apparatus and the second transmission reception apparatus may be understood as any two different transmission reception apparatuses in the plurality of transmission reception apparatuses.

In the scenario in which the SFN cell includes the plurality of (more than two) transmission reception apparatuses, for example, the SFN cell includes a transmission reception apparatus 1, a transmission reception apparatus 2, . . . , and a transmission reception apparatus n, where n is a positive integer greater than 2, the plurality of transmission reception apparatuses send TRSs to the terminal device, each transmission reception apparatus is configured to send one TRS to the terminal device, and time-frequency resources occupied by the TRSs sent by the transmission reception apparatuses are different. Any one of the plurality of transmission reception apparatuses may send n TCI-states.

Each of the n TCI-states indicates a correspondence between a TRS sent by one transmission reception apparatus and a DM-RS. For example, a first TCI-state indicates a correspondence between a TRS sent by the transmission reception apparatus 1 and a DM-RS, a second TCI-state indicates a correspondence between a TRS sent by the transmission reception apparatus 2 and a DM-RS, . . . , and an $n^{th}$ TCI-state indicates a correspondence between a TRS sent by the transmission reception apparatus n and a DM-RS.

Alternatively, each of the n TCI-states indicates a correspondence between a TRS sent by one transmission reception apparatus and downlink data. For example, a first TCI-state indicates a correspondence between a TRS sent by the transmission reception apparatus 1 and downlink data, a correspondence between a TRS sent by the transmission reception apparatus 2 and downlink data, . . . , and a correspondence between a TRS sent by the transmission reception apparatus n and downlink data.

Indication information received by the terminal device is indication information indicating one of the n TCI-states.

Figure 6:
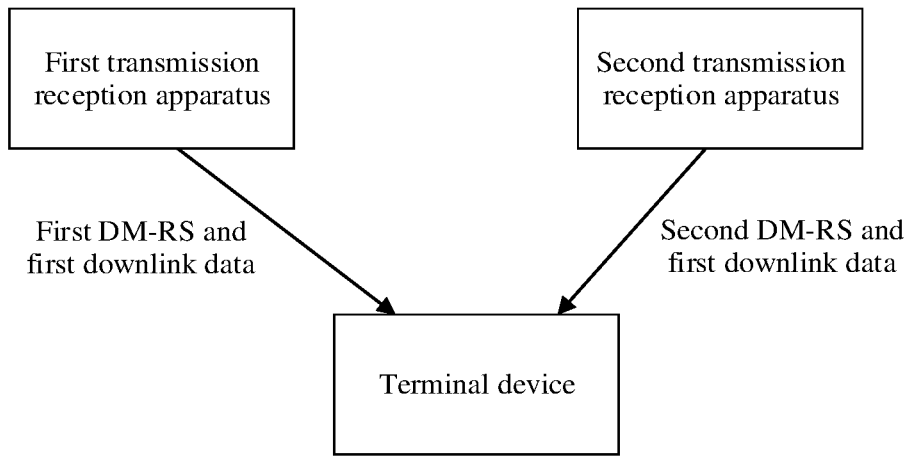
FIG. 6 is another schematic diagram of a scenario related to a signal demodulation method according to an embodiment.

FIG. 6 is another schematic diagram of a scenario related to a signal demodulation method. In the scenario shown in FIG. 6, a first transmission reception apparatus of a single frequency network cell sends a first DM-RS and first downlink data to a terminal device, and a second transmission reception apparatus of the single frequency network cell sends a second DM-RS and the first downlink data to the terminal device. The first DM-RS and the second DM-RS occupy a same time-frequency resource and are code-division-based or space-division-based. In this way, the terminal device can demodulate the first downlink data based on the first DM-RS and the second DM-RS, to improve performance of demodulating the downlink data by the terminal device.

Figure 7A:
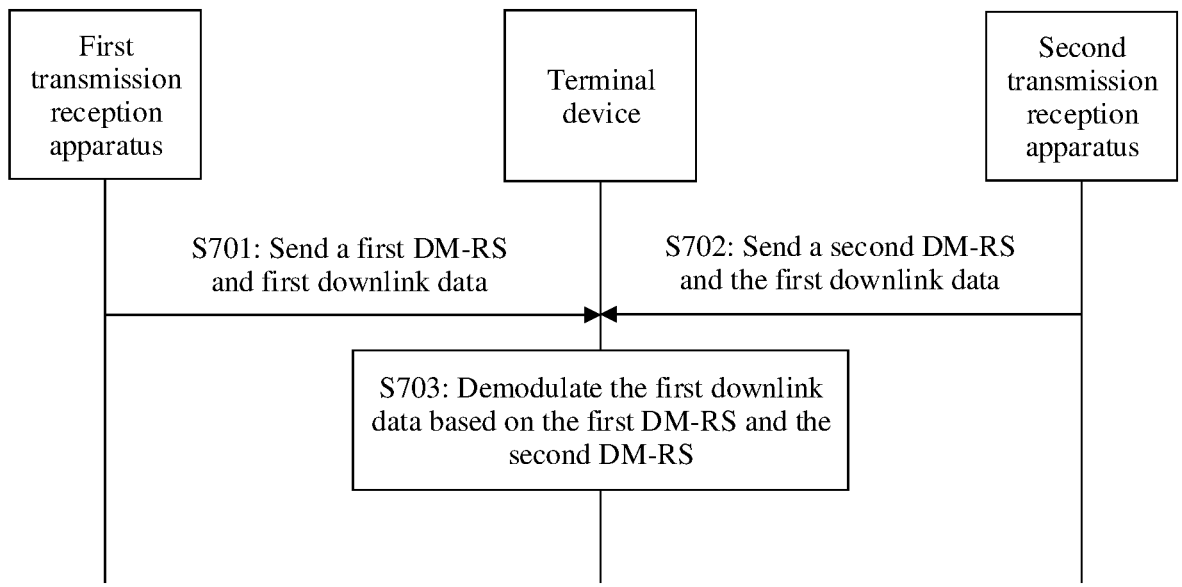
FIG. 7A is another schematic flowchart of a signal demodulation method according to an embodiment.

FIG. 7A is another schematic flowchart of a signal demodulation method according to an embodiment. The signal demodulation method may include the following steps.

S701: A first transmission reception apparatus sends a first DM-RS and first downlink data.

S702: A second transmission reception apparatus sends a second DM-RS and the first downlink data.

The first transmission reception apparatus and the second transmission reception apparatus are transmission reception apparatuses in a same SFN cell. The first DM-RS and the second DM-RS occupy a same time-frequency resource and are code-division-based or space-division-based.

In other words, the first DM-RS and the second DM-RS are transmitted on different code domain resources, or the first DM-RS and the second DM-RS are transmitted on different space domain resources. In this way, a terminal device can receive the first DM-RS and the second DM-RS in different code domains or receive the first DM-RS and the second DM-RS in different space domains.

Accordingly, the terminal device receives the first DM-RS and the first downlink data from the first transmission reception apparatus and sends the second DM-RS and the first downlink data from the second transmission reception apparatus.

The terminal device may receive the first DM-RS and the second DM-RS in different code domains. Alternatively, the terminal device may receive the first DM-RS and the second DM-RS in different space domains.

S703: The terminal device demodulates the first downlink data based on the first DM-RS and the second DM-RS.

It may be understood that the signal demodulation method in this embodiment is also applicable to a scenario in which an SFN cell includes a plurality of (more than two) transmission reception apparatuses. The first transmission reception apparatus and the second transmission reception apparatus may be understood as any two different transmission reception apparatuses in the plurality of transmission reception apparatuses.

In the scenario in which the SFN cell includes the plurality of (more than two) transmission reception apparatuses, each transmission reception apparatus is configured to send first downlink data and one DM-RS to the terminal device, and the DM-RSs sent by the transmission reception apparatuses are transmitted on different code domain resources, or the DM-RSs sent by the transmission reception apparatuses are transmitted on different space domain resources. The terminal device may receive, in different code domains, the DM-RSs sent by all of the plurality of transmission reception apparatuses, to obtain a plurality of received DM-RSs; or receive, in different space domains, the DM-RSs sent by all of the plurality of transmission reception apparatuses, to obtain a plurality of received DM-RSs. Then, the terminal device demodulates the downlink data based on the plurality of received DM-RSs.

In this embodiment, the first transmission reception apparatus sends the first DM-RS and the first downlink data, and the second transmission reception apparatus sends the second DM-RS and the first downlink data. In this way, the terminal device can demodulate the first downlink data based on a plurality of DM-RSs, to improve performance of demodulating the downlink data by the terminal device.

Optionally, in step S703, the terminal device may obtain signal reference information based on the first DM-RS and the second DM-RS and demodulate the first downlink data based on the channel reference information. The terminal device may obtain channel information based on the first DM-RS and obtain second channel information based on the second DM-RS. Then, the terminal device integrates the second channel information and the second information to obtain one piece of channel information and demodulates the first downlink data based on the channel information.

In the scenario in which the SFN cell includes the plurality of (more than two) transmission reception apparatuses, the DM-RSs sent by the transmission reception apparatuses are transmitted on different code domain resources, or the DM-RSs sent by the transmission reception apparatuses are transmitted on different space domain resources. The terminal device may receive, in different code domains, the DM-RSs sent by all of the plurality of transmission reception apparatuses, to obtain a plurality of received DM-RSs; or receive, in different space domains, the DM-RSs sent by all of the plurality of transmission reception apparatuses, to obtain a plurality of received DM-RSs.

In this way, the terminal device can obtain channel information of a channel between the terminal device and each transmission reception apparatus, to obtain a plurality of pieces of channel information. Then, the plurality of pieces of channel information is integrated into one piece of channel information, and the downlink data is demodulated based on the channel information, to effectively improve the performance of demodulating the downlink data by the terminal device.

In this embodiment, the DM-RS received by the terminal device and a carrier frequency on which the first downlink data is to be received may be determined based on the one or more TRSs indicated by the indication information in any one of the foregoing embodiments. To avoid redundancy, details are not described again in this embodiment.

Figure 7B:
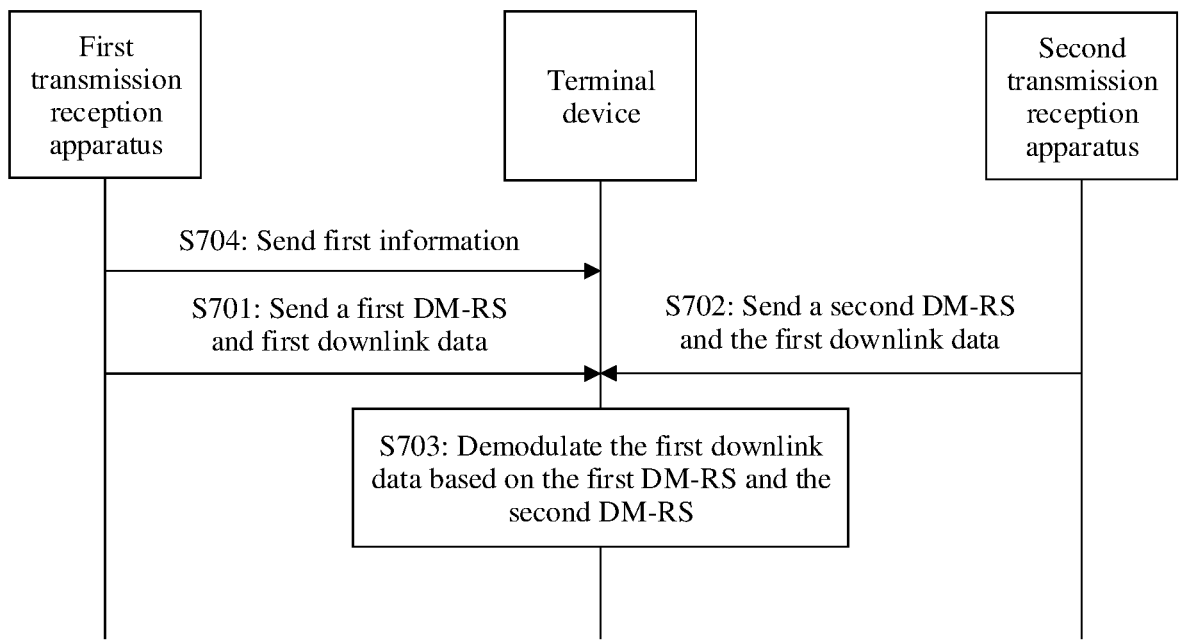
FIG. 7B is another schematic flowchart of a signal demodulation method according to an embodiment.

FIG. 7B is another schematic flowchart of a signal demodulation method according to an embodiment. Based on the embodiment corresponding to FIG. 7A, in some embodiments, the signal demodulation method may further include the following step:

S704: The first transmission reception apparatus sends first information to the terminal device, where the first information is for indicating to demodulate the first downlink data based on the first DM-RS and the second DM-RS.

Accordingly, the terminal device receives the first information from the first transmission reception apparatus, so that the terminal device can demodulate the first downlink data based on the first information by using the first DM-RS and the second DM-RS.

It should be noted that, in this embodiment, alternatively, the second transmission reception apparatus may send first information to the terminal device. Accordingly, the terminal device receives the first information from the second transmission reception apparatus.

In some optional embodiments, the first information is information indicating that the first downlink data is associated with the first DM-RS and the second DM-RS.

The first information may indicate that the first DM-RS is associated with first downlink data and the second DM-RS is associated with the first downlink data. In this way, the first downlink data is associated with both the first DM-RS and the second DM-RS. In this case, the terminal device demodulates, based on an association relationship indicated by the first information, the first downlink data by using the first DM-RS and the second DM-RS that are associated with the first downlink data.

In some other optional embodiments, the first information is information for indicating to receive the first downlink data at a layer at which the first DM-RS is located and receive the first downlink data at a layer at which the second DM-RS is located. In this way, the first DM-RS and the first downlink data are at the same layer, and the second DM-RS and the first downlink data are at another same layer. In this way, the terminal device can demodulate the first downlink data by using the first DM-RS at the same layer as the first downlink data and the second DM-RS at the another same layer as the first downlink data.

In some optional embodiments, the first information is information for indicating to receive the first downlink data in a code domain in which the first DM-RS is located and receive the first downlink data in a code domain in which the second DM-RS is located. In this way, the first DM-RS and the first downlink data are in the same code domain, and the second DM-RS and the first downlink data are in another same code domain. In this way, the terminal device can demodulate the first downlink data by using the first DM-RS in the same code domain as the first downlink data and the second DM-RS in the another same code domain as the first downlink data.

Figure 8:
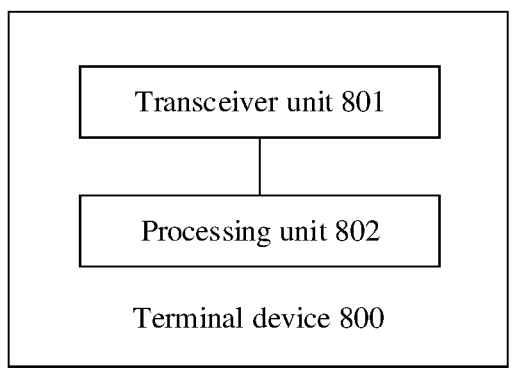
FIG. 8 is a schematic diagram of modules of a terminal device according to an embodiment.

FIG. 8 is a schematic diagram of modules of a terminal device according to an embodiment. An embodiment further provides a terminal device 800, including a transceiver unit 801 and a processing unit 802.

The transceiver unit 801 is configured to:
  receive a first tracking reference signal from a first transmission reception apparatus of a single frequency network cell;
  receive a second tracking reference signal from a second transmission reception apparatus of the single frequency network cell, where the first tracking reference signal and the second tracking reference signal occupy different time-frequency resources; and
  receive indication information from the first transmission reception apparatus or the second transmission reception apparatus, where the indication information indicates one or more tracking reference signals for receiving a downlink signal, the one or more tracking reference signals for receiving the downlink signal are at least one of the first tracking reference signal and the second tracking reference signal, and the downlink signal includes a demodulation reference signal and downlink data.

The processing unit 802 is configured to determine, based on the one or more tracking reference signals for receiving the downlink signal, a first carrier frequency on which the downlink signal is to be received.

The transceiver unit 801 is further configured to receive the demodulation reference signal and the downlink data based on the first carrier frequency.

The processing unit 802 is further configured to demodulate the downlink data based on the demodulation signal.

In this way, the terminal device 800 can obtain a plurality of received TRSs on different time-frequency resources. The terminal device 800 can obtain, based on the one or more TRSs that are for demodulation and that are indicated by the indication information, an appropriate carrier frequency on which the downlink signal is to be received, and demodulate the downlink data in the downlink signal by using the DM-RS in the downlink signal. However, in a conventional technology, each TRP sends a TRS to UE on a same time-frequency resource. In other words, each TRP sends the same TRS to the UE. In this case, the UE can receive a DM-RS and downlink data based only on the TRS. It can be understood that, in the demodulation method in this embodiment, the terminal device 800 can receive the plurality of TRSs, and obtain, based on the plurality of TRSs, one appropriate carrier frequency on which the downlink signal is to be received, but does not determine, based only on one TRS, a carrier frequency on which the downlink signal is to be received. This helps improve performance of receiving and demodulating the downlink data by the terminal device 800.

In some embodiments, the tracking reference signals for receiving the downlink signal are the first tracking reference signal and the second tracking reference signal.

In terms of determining, by the terminal device 800, based on the tracking reference signals for receiving the downlink signal, the first carrier frequency on which the downlink signal is to be received, the processing unit 802 is configured to:
  determine the first carrier frequency based on the first tracking reference signal and the second tracking reference signal.

In some embodiments, in terms of determining, by the terminal device 800, the first carrier frequency based on the first tracking reference signal and the second tracking reference signal, the processing unit 802 is configured to:
  determine a second carrier frequency corresponding to the first tracking reference signal;
  determine a third carrier frequency corresponding to the second tracking reference signal; and
  determine the first carrier frequency based on the second carrier frequency and the third carrier frequency.

In some embodiments, in terms of determining, by the terminal device 800, the first carrier frequency based on the second carrier frequency and the third carrier frequency, the processing unit 802 is configured to:

when an absolute value of a difference between the second carrier frequency and the third carrier frequency is less than or equal to a frequency offset threshold, determine the first carrier frequency based on the second carrier frequency and the third carrier frequency.

In some embodiments, in terms of determining, by the terminal device 800, the first carrier frequency based on the first tracking reference signal and the second tracking reference signal, the processing unit 802 is configured to:

determine a first signal to interference plus noise ratio corresponding to the first tracking reference signal;

determine a second signal to interference plus noise ratio corresponding to the second tracking reference signal; and determine the first carrier frequency based on the first signal to interference plus noise ratio and the second signal to interference plus noise ratio, where the first carrier frequency is a second carrier frequency corresponding to the first tracking reference signal or a third carrier frequency corresponding to the second tracking reference signal.

In some embodiments, in terms of determining, by the terminal device 800, the first carrier frequency based on the first signal to interference plus noise ratio and the second signal to interference plus noise ratio, the processing unit 802 is configured to:

determine a second carrier frequency corresponding to the first tracking reference signal;

determine a third carrier frequency corresponding to the second tracking reference signal; and when an absolute value of a difference between the second carrier frequency and the third carrier frequency is greater than or equal to a frequency offset threshold, determine the first carrier frequency based on the first signal to interference plus noise ratio and the second signal to interference plus noise ratio.

In some embodiments, the transceiver unit 801 is further configured to:

receive a first transmission configuration indicator state TCI-state from the first transmission reception apparatus or the second transmission reception apparatus, where the first TCI-state indicates a first correspondence between a first tracking reference signal and a demodulation reference signal and a second correspondence between a second tracking reference signal and a demodulation reference signal, or the first TCI-state indicates a first correspondence between a first tracking reference signal and downlink data and a second correspondence between a second tracking reference signal and downlink data; and the indication information is information indicating the first TCI-state.

In some embodiments, the transceiver unit 801 is further configured to:

receive a first TCI-state and a second TCI-state from the first transmission reception apparatus or the second transmission reception apparatus, where the first TCI-state indicates a first correspondence between a first tracking reference signal and a demodulation reference signal, and the second TCI-state indicates a second correspondence between a second tracking reference signal and a demodulation reference signal; or the first TCI-state indicates a first correspondence between a first tracking reference signal and downlink data, and the second TCI-state indicates a second correspondence between a second tracking reference signal and downlink data; and the indication information is information indicating the first TCI-state and the second TCI-state.

In some embodiments, the tracking reference signal for receiving the downlink signal is either of the first tracking reference signal and the second tracking reference signal.

In terms of determining, by the terminal device 800, based on the tracking reference signals for demodulation, the first carrier frequency on which the downlink signal is to be received, the processing unit 802 is configured to:

determine, by the terminal device 800, based on the first tracking reference signal or the second tracking reference signal, the first carrier frequency on which the downlink signal is to be received.

In some embodiments, the transceiver unit 801 is further configured to:

send an uplink reference signal.

Reference signal received power of the uplink reference signal at the first transmission reception apparatus and reference signal received power of the uplink reference signal at the second transmission reception apparatus are for determining the tracking reference signal for receiving the downlink signal.

In some embodiments, the transceiver unit 801 is further configured to:

send, by the terminal device 800, an uplink reference signal.

A frequency offset value of the uplink reference signal at the first transmission reception apparatus and a frequency offset value of the uplink reference signal at the second transmission reception apparatus are for determining the tracking reference signal for receiving the downlink signal.

In some embodiments, a distance between the terminal device 800 and the first transmission reception apparatus and a distance between the terminal device 800 and the second transmission reception apparatus are for determining the tracking reference signal for receiving the downlink signal.

In some embodiments, the transceiver unit 801 is further configured to:

receive a first TCI-state and a second TCI-state from the first transmission reception apparatus or the second transmission reception apparatus, where the first TCI-state indicates a first correspondence between a first tracking reference signal and a demodulation reference signal, and the second TCI-state indicates a second correspondence between a second tracking reference signal and a demodulation reference signal; or the first TCI-state indicates a first correspondence between a first tracking reference signal and downlink data, and the second TCI-state indicates a second correspondence between a second tracking reference signal and downlink data; and the indication information is information indicating the first TCI-state or the second TCI-state.

In some embodiments, in terms of receiving, by the terminal device 800, the indication information from the first transmission reception apparatus or the second transmission reception apparatus, the transceiver unit 801 is configured to:

receive MAC CE signaling and/or DCI signaling from the first transmission reception apparatus or the second transmission reception apparatus, where the MAC CE signaling and/or the DCI signaling include/includes the indication information.

Figure 9:
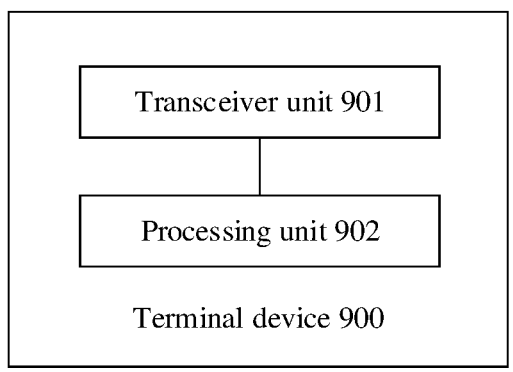
FIG. 9 is another schematic diagram of modules of a terminal device according to an embodiment.

FIG. 9 is another schematic diagram of modules of a terminal device 900 according to an embodiment. An embodiment further provides a terminal device 900, including a transceiver unit 901 and a processing unit 902.

The transceiver unit 901 is configured to:
- receive a first demodulation reference signal and first downlink data from a first transmission reception apparatus of a single frequency network cell; and
- receive a second demodulation reference signal and the first downlink data from a second transmission reception apparatus of the single frequency network cell, where the first demodulation reference signal and the second demodulation reference signal occupy a same time-frequency resource and are code-division-based or space-division-based.

The processing unit 902 is configured to demodulate the first downlink data based on the first demodulation reference signal and the second demodulation reference signal.

In this embodiment, the first transmission reception apparatus sends the first DM-RS and the first downlink data, and the second transmission reception apparatus sends the second DM-RS and the first downlink data. In this way, the terminal device 900 can demodulate the first downlink data based on a plurality of DM-RSs, to improve performance of demodulating the downlink data by the terminal device 900.

In some embodiments, the transceiver unit 901 is further configured to:
- receive first information from the first transmission reception apparatus or the second transmission reception apparatus, where the first information is for indicating to demodulate the first downlink data based on the first demodulation reference signal and the second demodulation reference signal.

In some embodiments, the first information is information indicating that the first downlink data is associated with the first demodulation reference signal and the second demodulation reference signal.

In some embodiments, the first information is information for indicating to receive the first downlink data at a layer at which the first demodulation reference signal is located and receive the first downlink data at a layer at which the second demodulation reference signal is located.

In some embodiments, in terms of receiving, by the terminal device 900, the first information from the first transmission reception apparatus or the second transmission reception apparatus, the transceiver unit 901 is configured to:
- receive, by the terminal device 900, radio resource control signaling, MAC CE signaling, or DCI signaling from the first transmission reception apparatus or the second transmission reception apparatus, where the radio resource control signaling, the MAC CE signaling, or the DCI signaling includes the first information.

In some embodiments, in terms of demodulating, by the terminal device 900, the first downlink data based on the first demodulation reference signal and the second demodulation reference signal, the processing unit 902 is configured to:
- obtain channel information based on the first demodulation reference signal and the second demodulation reference signal; and
- demodulate the first downlink data based on the channel information.

Figure 10:
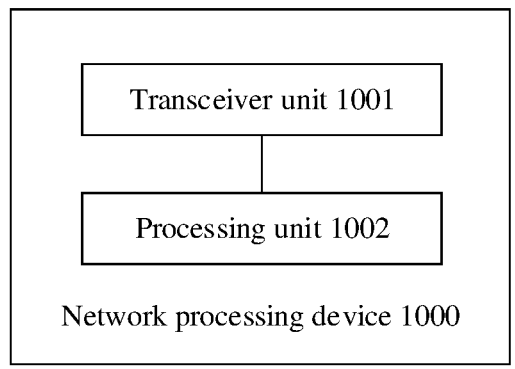
FIG. 10 is a schematic diagram of modules of a network processing device according to an embodiment.

FIG. 10 is a schematic diagram of modules of a network processing device according to an embodiment that further provides a network processing device 1000, including a transceiver unit 1001 and a processing unit 1002. The processing unit 1002 is configured to:
- control the transceiver unit 1001 to send a first tracking reference signal to a terminal device through a first transmission reception apparatus;
- control the transceiver unit 1001 to send a second tracking reference signal to the terminal device through a second transmission reception apparatus, where the first tracking reference signal and the second tracking reference signal occupy different time-frequency resources; and
- control the transceiver unit 1001 to send indication information to the terminal device, where the indication information indicates one or more tracking reference signals for receiving a downlink signal, the one or more tracking reference signals for receiving the downlink signal are at least one of the first tracking reference signal and the second tracking reference signal, the downlink signal includes a demodulation reference signal and downlink data, and the demodulation reference signal is for demodulating the downlink data.

In this way, the terminal device can obtain a plurality of received TRSs on different time-frequency resources. The terminal device can obtain, based on the one or more TRSs that are for demodulation and that are indicated by the indication information, an appropriate carrier frequency on which the downlink signal is to be received, and demodulate the downlink data in the downlink signal by using the DM-RS in the downlink signal. However, in a conventional technology, each TRP sends a TRS to UE on a same time-frequency resource. In other words, each TRP sends the same TRS to the UE. In this case, the UE can receive a DM-RS and a PDSCH based only on the TRS. It can be understood that, in the demodulation method in this embodiment, the terminal device can receive the plurality of TRSs, and obtain, based on the plurality of TRSs, one appropriate carrier frequency on which the downlink signal is to be received, but does not determine, based only on one TRS, a carrier frequency on which the downlink signal is to be received. This helps improve performance of receiving and demodulating the downlink data by the terminal device.

In some embodiments, the tracking reference signals for receiving the downlink signal are the first tracking reference signal and the second tracking reference signal. The processing unit 1002 is further configured to:
- control the transceiver unit 1001 to send a first transmission configuration indicator state TCI-state to the terminal device, where the first TCI-state indicates a first correspondence between a first tracking reference signal and a demodulation reference signal and a second correspondence between a second tracking reference signal and a demodulation reference signal, or the first TCI-state indicates a first correspondence between a first tracking reference signal and downlink data and a second correspondence between a second tracking reference signal and downlink data; and
- the indication information is information indicating the first TCI-state.

In some embodiments, the processing unit 1002 is further configured to:
- control the transceiver unit 1001 to send a first TCI-state and a second TCI-state to the terminal device, where the first TCI-state indicates a first correspondence between a first tracking reference signal and a demodulation reference signal, and the second TCI-state indicates a second correspondence between a second tracking reference signal and a demodulation reference signal; or the first TCI-state indicates a first correspondence between a first tracking reference signal and downlink data, and the second TCI-state indicates a second correspondence between a second tracking reference signal and downlink data; and the indication information is information indicating the first TCI-state and the second TCI-state.

In some embodiments, the tracking reference signal for receiving the downlink signal is either of the first tracking reference signal and the second tracking reference signal. The processing unit 1002 is further configured to:

control the transceiver unit 1001 to receive an uplink reference signal from the terminal device, where reference signal received power of the uplink reference signal at the first transmission reception apparatus and reference signal received power of the uplink reference signal at the second transmission reception apparatus are for determining the tracking reference signal for receiving the downlink signal.

In some embodiments, the tracking reference signal for receiving the downlink signal is either of the first tracking reference signal and the second tracking reference signal. The processing unit 1002 is further configured to:

control the transceiver unit 1001 to receive an uplink reference signal from the terminal device, where a frequency offset value of the uplink reference signal at the first transmission reception apparatus and a frequency offset value of the uplink reference signal at the second transmission reception apparatus are for determining the tracking reference signal for receiving the downlink signal.

In some embodiments, the tracking reference signal for receiving the downlink signal is either of the first tracking reference signal and the second tracking reference signal. A distance between the terminal device and the first transmission reception apparatus and a distance between the terminal device and the second transmission reception apparatus are for determining the tracking reference signal for receiving the downlink signal.

In some embodiments, the processing unit 1002 is further configured to:

control the transceiver unit 1001 to send a first TCI-state and a second TCI-state to the terminal device, where the first TCI-state indicates a first correspondence between a first tracking reference signal and a demodulation reference signal, and the second TCI-state indicates a second correspondence between a second tracking reference signal and a demodulation reference signal; or the first TCI-state indicates a first correspondence between a first tracking reference signal and downlink data, and the second TCI-state indicates a second correspondence between a second tracking reference signal and downlink data; and the indication information is information indicating the first TCI-state or the second TCI-state.

In some embodiments, in terms of controlling the transceiver unit 1001 to send the indication information to the terminal device, the processing unit 1002 is configured to:

control the transceiver unit 1001 to send MAC CE signaling and/or DCI signaling to the terminal device, where the MAC CE signaling and/or the DCI signaling include/includes the indication information.

Figure 11:
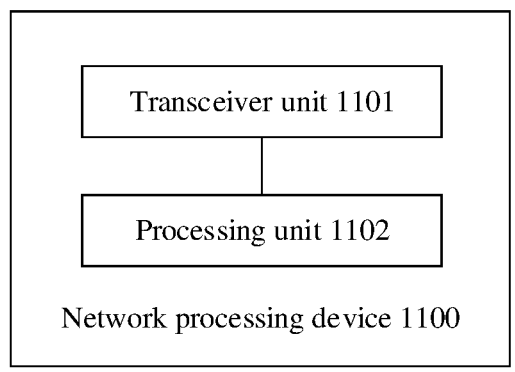
FIG. 11 is another schematic diagram of modules of a network processing device according to an embodiment.

As shown in FIG. 11, an embodiment further provides a network processing device 1100, including a transceiver unit 1101 and a processing unit 1102. The processing unit 1102 is configured to:

control the transceiver unit 1101 to send a first demodulation reference signal and first downlink data to a terminal device through a first transmission reception apparatus; and control the transceiver unit 1101 to send a second demodulation reference signal and the first downlink data to the terminal device through a second transmission reception apparatus, where the first demodulation reference signal and the second demodulation reference signal occupy a same time-frequency resource and are code-division-based or space-division-based; and the first demodulation reference signal and the second demodulation reference signal are for demodulating the first downlink data.

In this embodiment, the first transmission reception apparatus sends the first DM-RS and the first downlink data, and the second transmission reception apparatus sends the second DM-RS and the first downlink data. In this way, the terminal device can demodulate the first downlink data based on a plurality of DM-RSs, to improve performance of demodulating the downlink data by the terminal device.

In some embodiments, the processing unit 1102 is further configured to:

control the transceiver unit 1101 to send first information to the terminal device, where the first information is for indicating to demodulate the first downlink data based on the first demodulation reference signal and the second demodulation reference signal.

In some embodiments, the first information is information indicating that the first downlink data is associated with the first demodulation reference signal and the second demodulation reference signal.

In some embodiments, the first information is information for indicating to receive the first downlink data at a layer at which the first demodulation reference signal is located and receive the first downlink data at a layer at which the second demodulation reference signal is located.

In some embodiments, in terms of controlling the transceiver unit 1101 to send the first information to the terminal device, the processing unit 1102 is configured to:

control the transceiver unit 1101 to send radio resource control signaling, MAC CE signaling, or DCI signaling to the terminal device, where the radio resource control signaling, the MAC CE signaling, or the DCI signaling includes the first information.

Figure 12:
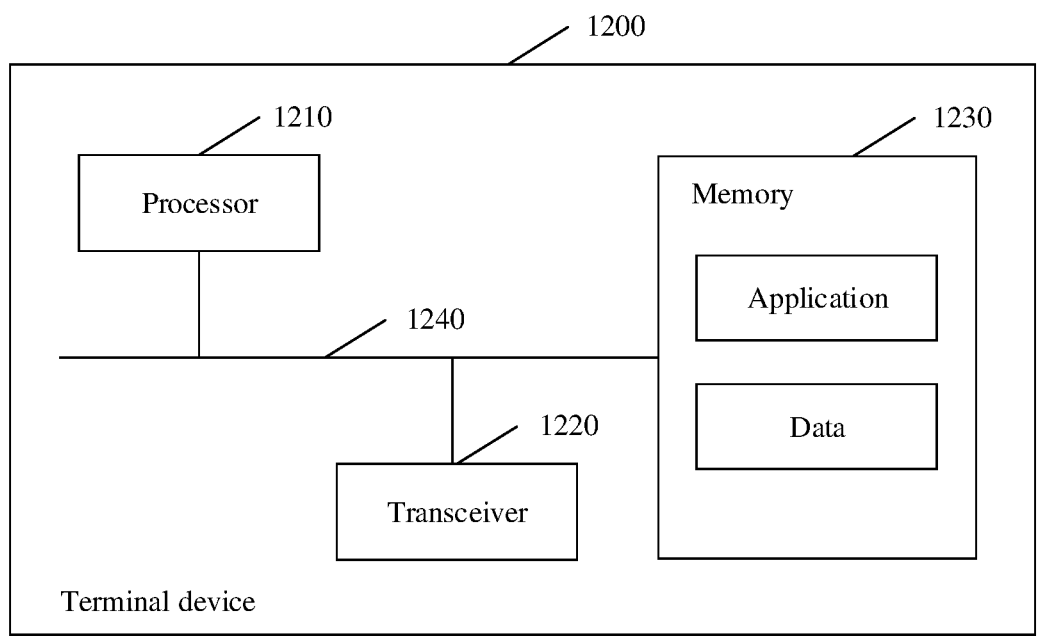
FIG. 12 is a schematic diagram of a structure of a terminal device according to an embodiment.

FIG. 12 is a schematic diagram of a structure of a terminal device 1200 according to an embodiment. The terminal device 1200 includes a processor 1210, a transceiver 1220, and a memory 1230. For example, the processor 1210, the transceiver 1220, and the memory 1230 may be connected to each other through a bus 1240.

The processor 1210 in the terminal device 1200 is configured to read related instructions from the memory 1230, to perform the following operations:

controlling the transceiver 1220 to receive a first tracking reference signal from a first transmission reception apparatus of a single frequency network cell;

controlling the transceiver 1220 to receive a second tracking reference signal from a second transmission reception apparatus of the single frequency network cell, where the first tracking reference signal and the second tracking reference signal occupy different time-frequency resources;

controlling the transceiver 1220 to receive indication information from the first transmission reception apparatus or the second transmission reception apparatus, where the indication information indicates one or more tracking reference signals for receiving a downlink signal, the one or more tracking reference signals for receiving the downlink signal are at least one of the first tracking reference signal and the second tracking reference signal, and the downlink signal includes a demodulation reference signal and downlink data;

determining, based on the one or more tracking reference signals for receiving the downlink signal, a first carrier frequency on which the downlink signal is to be received;

receiving the demodulation reference signal and the downlink data based on the first carrier frequency; and demodulating, by the terminal device, the downlink data based on the demodulation signal.

For implementations of various operations performed by the terminal device 1200, refer to operations in the embodiments of the foregoing signal demodulation method. Details are not described herein again.

The processor 1210 in this embodiment may correspond to the processing unit 802 of the terminal device 800 in the foregoing embodiment, or the processing unit 802 of the terminal device 800 in the foregoing embodiment may be deployed in the processor 1210 in this embodiment. The transceiver 1220 in this embodiment may correspond to the transceiver unit 801 of the terminal device 800 in the foregoing embodiment, or the transceiver unit 801 of the terminal device 800 in the foregoing embodiment may be deployed in the transceiver 1220 in this embodiment.

Figure 13:
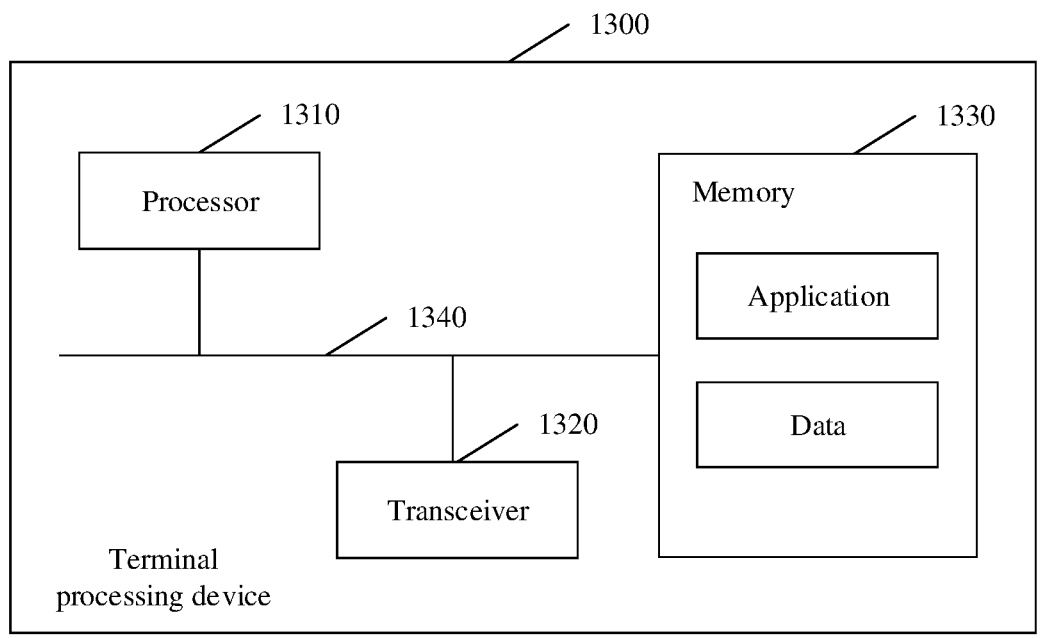
FIG. 13 is another schematic diagram of a structure of a terminal device according to an embodiment.

FIG. 13 is a schematic diagram of a structure of a terminal device 1300 according to an embodiment. The terminal device 1300 includes a processor 1310, a transceiver 1320, and a memory 1330. For example, the processor 1310, the transceiver 1320, and the memory 1330 may be connected to each other through a bus 1340.

The processor 1310 in the terminal device 1300 is configured to read related instructions from the memory 1330, to perform the following operations:

controlling the transceiver 1320 to receive a first demodulation reference signal and first downlink data from a first transmission reception apparatus of a single frequency network cell;

controlling the transceiver 1320 to receive a second demodulation reference signal and the first downlink data from a second transmission reception apparatus of the single frequency network cell, where the first demodulation reference signal and the second demodulation reference signal occupy a same time-frequency resource and are code-division-based or space-division-based;

demodulating the first downlink data based on the first demodulation reference signal and the second demodulation reference signal; determining, based on one or more tracking reference signals for receiving a downlink signal, a first carrier frequency on which the downlink signal is to be received;

receiving the demodulation reference signal and the downlink data based on the first carrier frequency; and demodulating the downlink data based on the demodulation signal.

For implementations of various operations performed by the terminal device 1300, refer to operations in the embodiments of the foregoing signal demodulation method. Details are not described herein again.

The processor 1310 in this embodiment may correspond to the processing unit 902 of the terminal device 900 in the foregoing embodiment, or the processing unit 902 of the terminal device 900 in the foregoing embodiment may be deployed in the processor 1310 in this embodiment. The transceiver 1320 in this embodiment may correspond to the transceiver unit 901 of the terminal device 900 in the foregoing embodiment, or the transceiver unit 901 of the terminal device 900 in the foregoing embodiment may be deployed in the transceiver 1320 in this embodiment.

Figure 14:
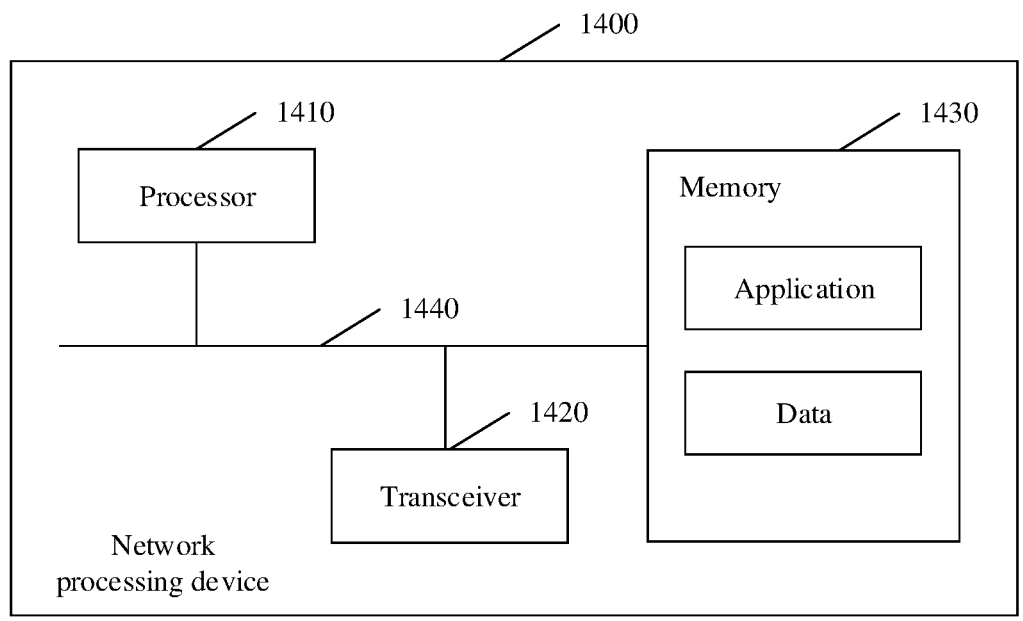
FIG. 14 is a schematic diagram of a structure of a network processing device according to an embodiment.

FIG. 14 is a schematic diagram of a structure of a network processing device 1400 according to an embodiment. The network processing device 1400 includes a processor 1410, a transceiver 1420, and a memory 1430. For example, the processor 1410, the transceiver 1420, and the memory 1430 may be connected to each other through a bus 1440.

The processor 1410 in the network processing device 1400 is configured to read related instructions from the memory 1430, to perform the following operations:

controlling the transceiver 1420 to send a first tracking reference signal to a terminal device through a first transmission reception apparatus;

controlling the transceiver 1420 to send a second tracking reference signal to the terminal device through a second transmission reception apparatus, where the first tracking reference signal and the second tracking reference signal occupy different time-frequency resources; and controlling the transceiver 1420 to send indication information to the terminal device, where the indication information indicates one or more tracking reference signals for receiving a downlink signal, the one or more tracking reference signals for receiving the downlink signal are at least one of the first tracking reference signal and the second tracking reference signal, the downlink signal includes a demodulation reference signal and downlink data, and the demodulation reference signal is for demodulating the downlink data.

For implementations of various operations performed by the network processing device 1400, refer to the network processing device in the foregoing method embodiments. Details are not described herein again.

The transceiver 1420 may include the first transmission reception apparatus and the second transmission reception apparatus, or the transceiver 1420 is connected to the first transmission reception apparatus and the transceiver 1420 is connected to the second transmission reception apparatus.

The processor 1410 in this embodiment may correspond to the processing unit 1002 of the network processing device 1000 in the foregoing embodiment, or the processing unit 902 of the network processing device 1000 in the foregoing embodiment may be deployed in the processor 1410 in this embodiment. The transceiver 1420 in this embodiment may correspond to the transceiver unit 1001 of the network processing device 1000 in the foregoing embodiment, or the transceiver unit 1001 of the network processing device 1000 in the foregoing embodiment may be deployed in the transceiver 1420 in this embodiment.

Figure 15:
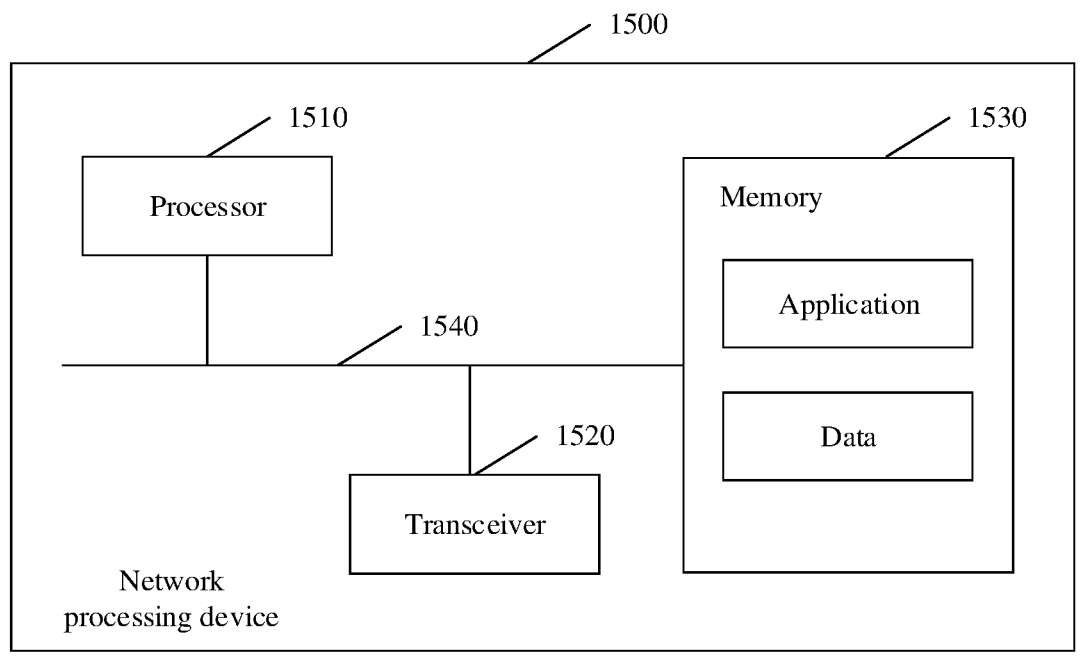
FIG. 15 is a schematic diagram of a structure of a network processing device according to an embodiment.

FIG. 15 is a schematic diagram of a structure of a network processing device 1500 according to an embodiment. The network processing device 1500 includes a processor 1510, a transceiver 1520, and a memory 1530. For example, the processor 1510, the transceiver 1520, and the memory 1530 may be connected to each other through a bus 1540.

The processor 1510 in the network processing device 1500 is configured to read related instructions from the memory 1530, to perform the following operations:

controlling the transceiver 1520 to send a first demodulation reference signal and first downlink data to a terminal device through a first transmission reception apparatus; and controlling the transceiver 1520 to send a second demodulation reference signal and the first downlink data to the terminal device through a second transmission reception apparatus, where the first demodulation reference signal and the second demodulation reference signal occupy a same time-frequency resource and are code-division-based or space-division-based; and the first demodulation reference signal and the second demodulation reference signal are for demodulating the first downlink data.

For implementations of various operations performed by the network processing device 1500, refer to the network processing device in the foregoing method embodiments. Details are not described herein again.

The transceiver 1520 may include the first transmission reception apparatus and the second transmission reception apparatus, or the transceiver 1520 is connected to the first transmission reception apparatus and the transceiver 1520 is connected to the second transmission reception apparatus.

The processor 1510 in this embodiment may correspond to the processing unit 1002 of the network processing device 1100 in the foregoing embodiment, or the processing unit 902 of the network processing device 1100 in the foregoing embodiment may be deployed in the processor 1510 in this embodiment. The transceiver 1520 in this embodiment may correspond to the transceiver unit 1101 of the network processing device 1100 in the foregoing embodiment, or the transceiver unit 1101 of the network processing device 1100 in the foregoing embodiment may be deployed in the transceiver 1520 in this embodiment.

Figure 16:
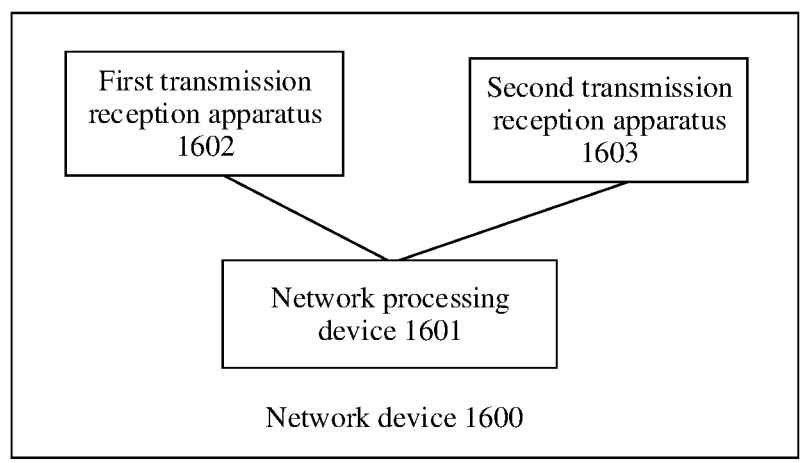
FIG. 16 is a schematic diagram of a structure of a network device according to an embodiment.

FIG. 16 is a schematic diagram of a structure of a network device according to an embodiment. The network device 1600 includes a network processing device 1601, a first transmission reception apparatus 1602, and a second transmission reception apparatus 1603. The network processing device 1601 may be the network processing device 1400 in the embodiment corresponding to FIG. 14 or the network processing device 1500 in the embodiment corresponding to FIG. 15. The first transmission reception apparatus 1602 and the second transmission reception apparatus 1603 may be one or more of a remote radio unit (RRU), a remote radio head (RRH), or a TRP. The first transmission reception apparatus 1602 and the second transmission reception apparatus 1603 are connected to the network processing device 1601. In an embodiment, the network processing device 1601, the first transmission reception apparatus 1602, and the second transmission reception apparatus 1603 belong to a same SFN cell.

The embodiments may provide a non-transitory computer-readable storage medium. The non-transitory computer-readable storage medium stores computer instructions. The computer instructions are for instructing a server to perform the information transmission method provided in any one of the foregoing implementations.

It should be further understood that "first", "second", "third", "fourth", and various numbers in the embodiments are merely used for differentiation for ease of description and are not construed as a limitation to the scope of the embodiments.

It should be noted that the term "and/or" describes an association relationship between associated objects and indicates that three relationships may exist. For example, A and/or B may indicate the following cases: only A exists, both A and B exist, and only B exists. In addition, the character "/" generally indicates an "or" relationship between the associated objects.

It should be understood that sequence numbers of the foregoing processes do not mean execution sequences in various embodiments. The execution sequences of the processes should be determined based on functions and internal logic of the processes but should not be construed as any limitation on the implementation processes in the embodiments.

A person of ordinary skill in the art may be aware that, in combination with the examples described in embodiments, units and algorithm steps may be implemented by electronic hardware or a combination of computer software and electronic hardware. Whether the functions are performed by hardware or software depends on particular applications and constraints of the solutions. A person skilled in the art may use different methods to implement the described functions for each particular application, but it should not be considered that the implementation goes beyond the scope of the embodiments.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments, it should be understood that the system, the apparatus, and the method may be implemented in other manners. For example, the described apparatus embodiments are merely examples. For example, division into the units is merely logical function division. During actual implementation, there may be another division manner. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, in other words, may be located in one position, or may be distributed on a plurality of network units. Some or all of the units may be selected based on actual requirements to achieve the objectives of the solutions of embodiments.

In addition, function units in the embodiments may be integrated into one processing unit, each of the units may exist alone physically, or two or more units may be integrated into one unit.

When functions are implemented in a form of a software function unit and sold or used as an independent product, the functions may be stored in a computer-readable storage medium. Based on such an understanding, the embodiments may be implemented in a form of a software product. The computer software product is stored in a storage medium and includes several instructions for instructing a computer device (which may be a personal computer, a server, a network device, or the like) to perform all or some of the steps of the methods described in embodiments. The foregoing storage medium includes any medium that can store program code, such as a USB flash drive, a removable hard disk, a read-only memory (ROM), a random access memory (RAM), a magnetic disk, or an optical disc.

A sequence of the steps of the method in the embodiments may be adjusted, combined, or deleted based on an actual requirement.

The modules in the apparatus in the embodiments may be combined, divided, or deleted based on an actual requirement.

The foregoing embodiments are merely intended to describe the embodiments, but are not limiting. Although described in detail with reference to the foregoing embodiments, persons of ordinary skill in the art should understand that they may still make modifications or make equivalent replacements without departing from the scope of the solutions of the foregoing embodiments.

What is claimed is:

1. A signal demodulation method, comprising:
receiving, by a terminal device, a first tracking reference signal from a first transmission reception apparatus of a single frequency network cell;
receiving, by the terminal device, a second tracking reference signal from a second transmission reception apparatus of the single frequency network cell, wherein the first tracking reference signal and the second tracking reference signal occupy different time-frequency resources;
receiving, by the terminal device, indication information from the first transmission reception apparatus or the second transmission reception apparatus, wherein the indication information indicates one or more tracking reference signals for receiving a downlink signal, the one or more tracking reference signals for receiving the downlink signal are at least one of the first tracking reference signal and the second tracking reference signal, and the downlink signal comprises a demodulation reference signal and downlink data;
determining, by the terminal device based on the one or more tracking reference signals for receiving the downlink signal, a first carrier frequency on which the downlink signal is to be received;
receiving, by the terminal device, the demodulation reference signal and the downlink data based on the first carrier frequency; and
demodulating, by the terminal device, the downlink data based on the demodulation signal.

2. The signal demodulation method according to claim 1, wherein the tracking reference signals for receiving the downlink signal are the first tracking reference signal and the second tracking reference signal; and determining, by the terminal device based on the one or more tracking reference signals for receiving the downlink signal, the first carrier frequency on which the downlink signal is to be received further comprises:
determining, by the terminal device, the first carrier frequency based on the first tracking reference signal and the second tracking reference signal.

3. The signal demodulation method according to claim 2, wherein determining, by the terminal device, the first carrier frequency based on the first tracking reference signal and the second tracking reference signal further comprises:
determining, by the terminal device, a second carrier frequency corresponding to the first tracking reference signal;
determining, by the terminal device, a third carrier frequency corresponding to the second tracking reference signal; and
determining, by the terminal device, the first carrier frequency based on the second carrier frequency and the third carrier frequency.

4. The signal demodulation method according to claim 3, wherein determining, by the terminal device, the first carrier frequency based on the second carrier frequency and the third carrier frequency further comprises:
when an absolute value of a difference between the second carrier frequency and the third carrier frequency is less than or equal to a frequency offset threshold, determining, by the terminal device, the first carrier frequency based on the second carrier frequency and the third carrier frequency.

5. The signal demodulation method according to claim 2, wherein determining, by the terminal device, the first carrier frequency based on the first tracking reference signal and the second tracking reference signal further comprises:
determining, by the terminal device, a first signal to interference plus noise ratio corresponding to the first tracking reference signal;
determining, by the terminal device, a second signal to interference plus noise ratio corresponding to the second tracking reference signal; and
determining, by the terminal device, the first carrier frequency based on the first signal to interference plus noise ratio and the second signal to interference plus noise ratio, wherein the first carrier frequency is a second carrier frequency corresponding to the first tracking reference signal or a third carrier frequency corresponding to the second tracking reference signal.

6. The signal demodulation method according to claim 5, wherein determining, by the terminal device, the first carrier frequency based on the first signal to interference plus noise ratio and the second signal to interference plus noise ratio further comprises:
determining, by the terminal device, the second carrier frequency corresponding to the first tracking reference signal;
determining, by the terminal device, the third carrier frequency corresponding to the second tracking reference signal; and
when an absolute value of a difference between the second carrier frequency and the third carrier frequency is greater than or equal to a frequency offset threshold, determining, by the terminal device, the first carrier frequency based on the first signal to interference plus noise ratio and the second signal to interference plus noise ratio.

7. A terminal device comprising:
a transceiver;
at least one processor; and
one or more memories coupled to the at least one processor and storing programming instructions for execution by the at least one processor to cause the terminal device to:
receive a first tracking reference signal from a first transmission reception apparatus of a single frequency network cell;
receive a second tracking reference signal from a second transmission reception apparatus of the single frequency network cell, wherein the first tracking reference signal and the second tracking reference signal occupy different time-frequency resources;
receive indication information from the first transmission reception apparatus or the second transmission reception apparatus, wherein the indication information indicates one or more tracking reference signals for receiving a downlink signal, the one or more tracking reference signals for receiving the downlink signal are at least one of the first tracking reference signal and the second tracking reference signal, and the downlink signal comprises a demodulation reference signal and downlink data;
determine based on the one or more tracking reference signals for receiving the downlink signal, a first carrier frequency on which the downlink signal is to be received;

receive the demodulation reference signal and the downlink data based on the first carrier frequency; and
demodulate the downlink data based on the demodulation signal.

8. The terminal device according to claim 7, wherein the tracking reference signals for receiving the downlink signal are the first tracking reference signal and the second tracking reference signal; and the programming instructions, when executed by the at least one processor, further cause the device to determine the first carrier frequency based on the first tracking reference signal and the second tracking reference signal.

9. The terminal device according to claim 8, wherein the programming instructions, when executed by the at least one processor, further cause the device to:
determine a second carrier frequency corresponding to the first tracking reference signal;
determine a third carrier frequency corresponding to the second tracking reference signal; and
determine the first carrier frequency based on the second carrier frequency and the third carrier frequency.

10. The terminal device according to claim 9, wherein the programming instructions, when executed by the at least one processor, further cause the device to:
when an absolute value of a difference between the second carrier frequency and the third carrier frequency is less than or equal to a frequency offset threshold, determine the first carrier frequency based on the second carrier frequency and the third carrier frequency.

11. The terminal device according to claim 8, wherein the programming instructions, when executed by the at least one processor, further cause the device to:
determine a first signal to interference plus noise ratio corresponding to the first tracking reference signal;
determine a second signal to interference plus noise ratio corresponding to the second tracking reference signal; and
determine the first carrier frequency based on the first signal to interference plus noise ratio and the second signal to interference plus noise ratio, wherein the first carrier frequency is a second carrier frequency corresponding to the first tracking reference signal or a third carrier frequency corresponding to the second tracking reference signal.

12. The terminal device according to claim 11, wherein the programming instructions, when executed by the at least one processor, further cause the device to:
determine the second carrier frequency corresponding to the first tracking reference signal;
determine the third carrier frequency corresponding to the second tracking reference signal; and
when an absolute value of a difference between the second carrier frequency and the third carrier frequency is greater than or equal to a frequency offset threshold, determine the first carrier frequency based on the first signal to interference plus noise ratio and the second signal to interference plus noise ratio.

13. The terminal device according to claim 12, wherein the programming instructions, when executed by the at least one processor, further cause the device to:
receive a first transmission configuration indicator (TCI) state from the first transmission reception apparatus or the second transmission reception apparatus, wherein the first TCI-state indicates a first correspondence between a first tracking reference signal and a demodulation reference signal and a second correspondence between a second tracking reference signal and a demodulation reference signal, or the first TCI-state indicates a first correspondence between a first tracking reference signal and downlink data and a second correspondence between a second tracking reference signal and downlink data; and
the indication information is information indicating the first TCI-state.

14. The terminal device according to claim 12, wherein the programming instructions, when executed by the at least one processor, further cause the device to:
receive a first transmission configuration indicator (TCI)-state and a second TCI-state from the first transmission reception apparatus or the second transmission reception apparatus, wherein the first TCI-state indicates a first correspondence between a first tracking reference signal and a demodulation reference signal, and the second TCI-state indicates a second correspondence between a second tracking reference signal and a demodulation reference signal; or the first TCI-state indicates a first correspondence between a first tracking reference signal and downlink data, and the second TCI-state indicates a second correspondence between a second tracking reference signal and downlink data; and
the indication information is information indicating the first TCI-state and the second TCI-state.

15. A communications device comprising:
a transceiver;
at least one processor; and
one or more memories coupled to the at least one processor and storing programming instructions for execution by the at least one processor to cause the communications device to:
send of a single frequency network cell, a first tracking reference signal to a terminal device through a first transmission reception apparatus;
send a second tracking reference signal to the terminal device through a second transmission reception apparatus, wherein the first tracking reference signal and the second tracking reference signal occupy different time-frequency resources; and
send indication information to the terminal device, wherein the indication information indicates one or more tracking reference signals for receiving a downlink signal, the one or more tracking reference signals for receiving the downlink signal are at least one of the first tracking reference signal and the second tracking reference signal, the downlink signal comprises a demodulation reference signal and downlink data, and the demodulation reference signal is for demodulating the downlink data.

16. The communications device according to claim 15, wherein the tracking reference signals for receiving the downlink signal are the first tracking reference signal and the second tracking reference signal; and the programming instructions, when executed by the at least one processor, further cause the device to:
send a first transmission configuration indicator (TCI)-state to the terminal device, wherein the first TCI-state indicates a first correspondence between a first tracking reference signal and a demodulation reference signal and a second correspondence between a second tracking reference signal and a demodulation reference signal, or the first TCI-state indicates a first correspondence between a first tracking reference signal and downlink data and a second correspondence between a second tracking reference signal and downlink data; and the indication information is information indicating the first TCI-state.

17. The communications device according to claim 15, wherein the programming instructions, when executed by the at least one processor, further cause the device to:

send a first transmission configuration indicator (TCI)-state and a second TCI-state to the terminal device, wherein the first TCI-state indicates a first correspondence between a first tracking reference signal and a demodulation reference signal, and the second TCI-state indicates a second correspondence between a second tracking reference signal and a demodulation reference signal; or the first TCI-state indicates a first correspondence between a first tracking reference signal and downlink data, and the second TCI-state indicates a second correspondence between a second tracking reference signal and downlink data; and the indication information is information indicating the first TCI-state and the second TCI-state.

18. The communications device according to claim 15, wherein the tracking reference signal for receiving the downlink signal is either of the first tracking reference signal and the second tracking reference signal; and the programming instructions, when executed by the at least one processor, further cause the device to:

receive an uplink reference signal from the terminal device, wherein reference signal received power of the uplink reference signal at the first transmission reception apparatus and reference signal received power of the uplink reference signal at the second transmission reception apparatus are for determining the tracking reference signal for receiving the downlink signal.

19. The communications device according to claim 15, wherein the tracking reference signal for receiving the downlink signal is either of the first tracking reference signal and the second tracking reference signal; and the programming instructions, when executed by the at least one processor, further cause the device to:

receive an uplink reference signal from the terminal device, wherein a frequency offset value of the uplink reference signal at the first transmission reception apparatus and a frequency offset value of the uplink reference signal at the second transmission reception apparatus are for determining the tracking reference signal for receiving the downlink signal.

20. The communications device according to claim 15, wherein the tracking reference signal for receiving the downlink signal is either of the first tracking reference signal and the second tracking reference signal; and a distance between the terminal device and the first transmission reception apparatus and a distance between the terminal device and the second transmission reception apparatus are for determining the tracking reference signal for receiving the downlink signal.

* * * * *